(12) United States Patent
Ito et al.

(10) Patent No.: US 7,701,501 B2
(45) Date of Patent: Apr. 20, 2010

(54) ELECTRONIC IMAGING APPARATUS WITH ANTI-DUST FUNCTION

(75) Inventors: Junichi Ito, Fuchu (JP); Sumio Kawai, Hachioji (JP); Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/204,188

(22) Filed: Sep. 4, 2008

(65) Prior Publication Data

US 2009/0002542 A1 Jan. 1, 2009

Related U.S. Application Data

(62) Division of application No. 10/438,756, filed on May 15, 2003, now Pat. No. 7,492,408.

(30) Foreign Application Priority Data

| | | |
|---|---|---|
| May 17, 2002 | (JP) | 2002-142703 |
| Jun. 12, 2002 | (JP) | 2002-171625 |
| Jun. 24, 2002 | (JP) | 2002-183269 |
| Jun. 25, 2002 | (JP) | 2002-184598 |
| Jun. 28, 2002 | (JP) | 2002-191112 |
| Jul. 18, 2002 | (JP) | 2002-209733 |
| Aug. 29, 2002 | (JP) | 2002-250826 |

(51) Int. Cl.
  *H04N 5/225* (2006.01)
  *G02B 7/02* (2006.01)
(52) U.S. Cl. ................ 348/335; 359/507
(58) Field of Classification Search ........... 396/529, 396/533; 348/335, 340; 359/507, 508
  See application file for complete search history.

(56) References Cited

U.S. PATENT DOCUMENTS

| | | | | |
|---|---|---|---|---|
| 4,387,973 A | * | 6/1983 | Martin | 359/507 |
| 4,737,812 A | * | 4/1988 | Hasegawa et al. | 396/535 |
| 4,833,359 A | * | 5/1989 | Tanoue et al. | 310/316.02 |
| 5,021,700 A | * | 6/1991 | Takahashi et al. | 310/316.02 |
| 6,229,402 B1 | * | 5/2001 | Kataoka et al. | 310/316.01 |
| 2001/0026112 A1 | * | 10/2001 | Yoshida et al. | 310/328 |
| 2001/0055072 A1 | * | 12/2001 | Mogamiya et al. | 348/335 |
| 2004/0017480 A1 | * | 1/2004 | Higashihara | 348/207.99 |

FOREIGN PATENT DOCUMENTS

| | | |
|---|---|---|
| JP | 7-151946 | 6/1995 |
| JP | 2000-312314 | 11/2000 |
| JP | 2001-265037 | 9/2001 |

OTHER PUBLICATIONS

Notice of Reasons for Rejection for Japanese Patent Application No. 2006-337059, mailed Mar. 3, 2009 (2 pgs.) with translation (2 pgs.).

* cited by examiner

*Primary Examiner*—Jason Whipkey
(74) *Attorney, Agent, or Firm*—Straub & Pokotylo; John C. Pokotylo

(57) ABSTRACT

An electronic imaging apparatus includes an imaging optical system which forms an optical image of an object. A photoelectric conversion element converts the optical image into an electric signal. The optical element is arranged between the imaging optical system and the photoelectric conversion element. An excitation unit vibrates the optical element at a set frequency, and vibrates the optical element at least in an imaging operation of the photoelectric conversion element.

5 Claims, 42 Drawing Sheets

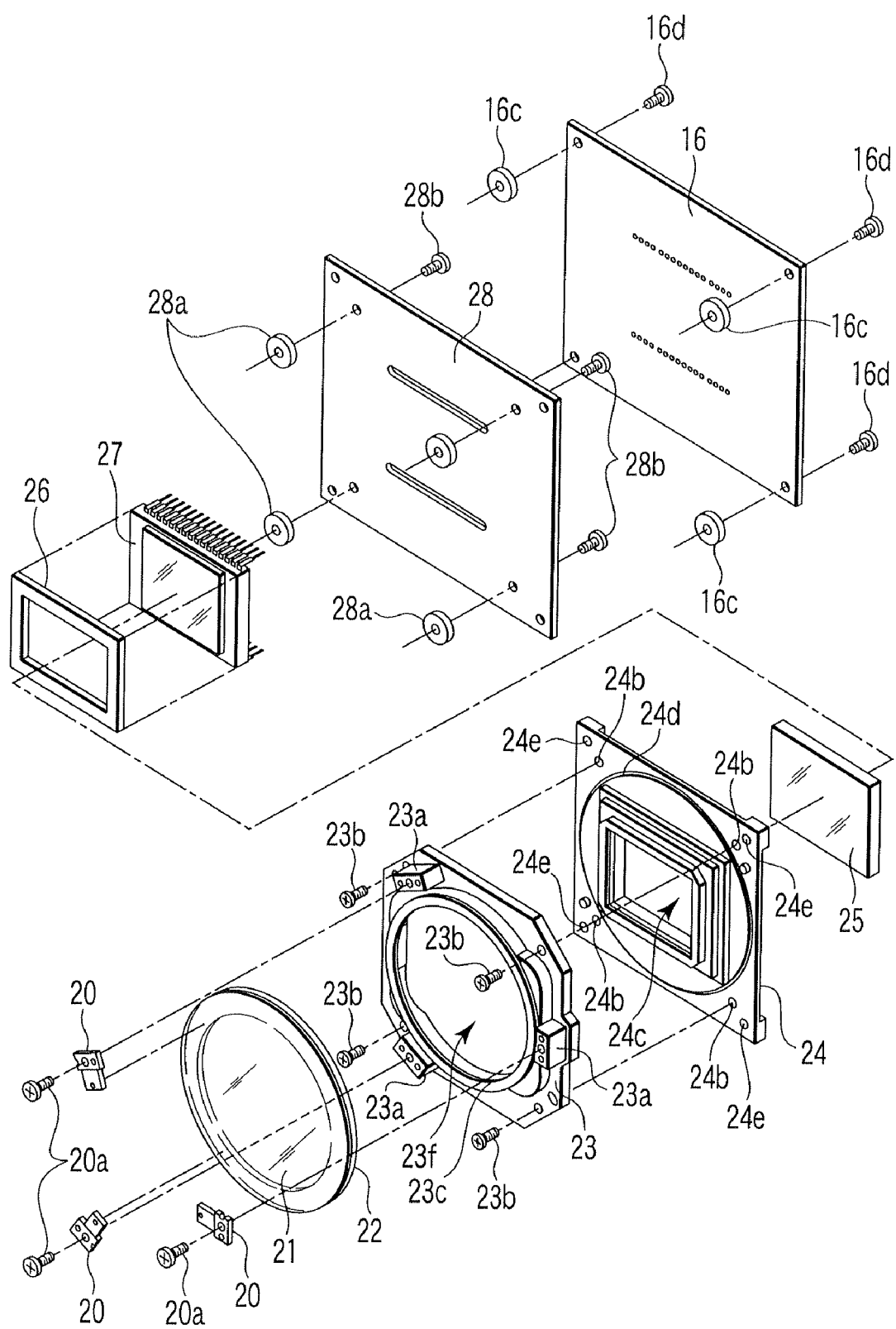
F I G. 3

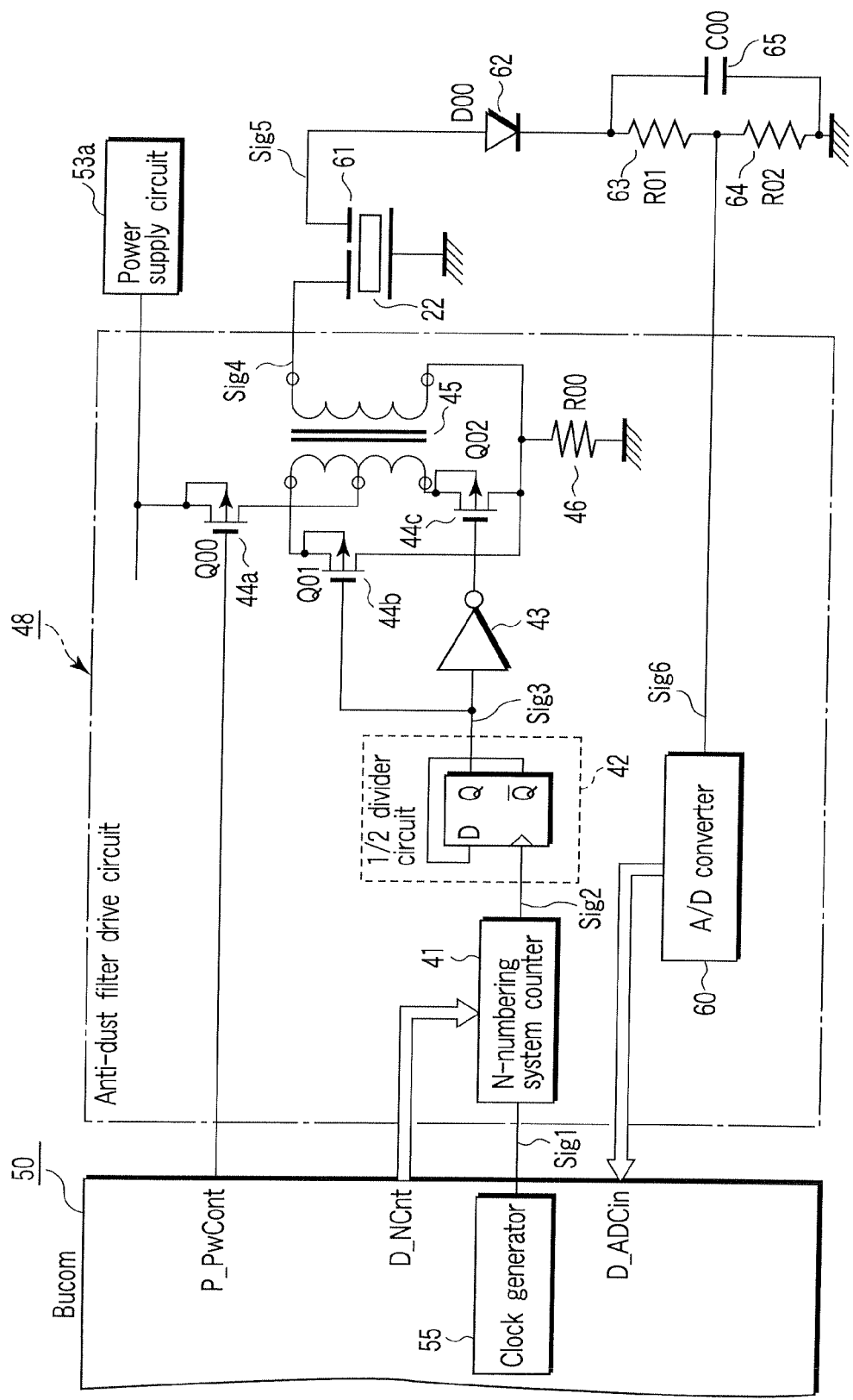
F I G. 16

| StartOffset | 3 |
|---|---|
| StopOffset | 9 |
| StepTime | 2(msec) |
| ADwait | 80(μsec) |
| M1OscTime | 200(msec) |

| StartOffset | 2 |
|---|---|
| StopOffset | 10 |
| StepTime | 1(msec) |
| ADwait | 40(μsec) |
| M2OscTime | 100(msec) |

|   | Preset value (N) | Drive frequency (KHz) |
|---|---|---|
| 0 | 493 | 40.57 |
| 1 | 494 | 40.49 |
| 2 | 495 | 40.40 |
| 3 | 496 | 40.32 |
| 4 | 497 | 40.24 |
| 5 | 498 | 40.16 |
| 6 | 499 | 40.08 |
| 7 | 500 | 40.00 |
| 8 | 501 | 39.92 |
| 9 | 502 | 39.84 |
| 10 | 503 | 39.76 |
| 11 | 504 | 39.68 |
| 12 | 505 | 39.60 |
| 13 | 506 | 39.53 |
| 14 | 507 | 39.45 |

*1 → row 3
*2 → row 9

→ f1
→ f2
→ f3
→ f4
→ f5
→ f6
→ f7

F I G. 25A

|   | Preset value (N) | Drive frequency (KHz) |
|---|---|---|
| 0 | 993 | 20.14 |
| 1 | 994 | 20.12 |
| 2 | 995 | 20.10 |
| 3 | 996 | 20.08 |
| 4 | 997 | 20.06 |
| 5 | 998 | 20.04 |
| 6 | 999 | 20.02 |
| 7 | 1000 | 20.00 |
| 8 | 1001 | 19.98 |
| 9 | 1002 | 19.96 |
| 10 | 1003 | 19.94 |
| 11 | 1004 | 19.92 |
| 12 | 1005 | 19.90 |
| 13 | 1006 | 19.88 |
| 14 | 1007 | 19.86 |

F I G. 25B

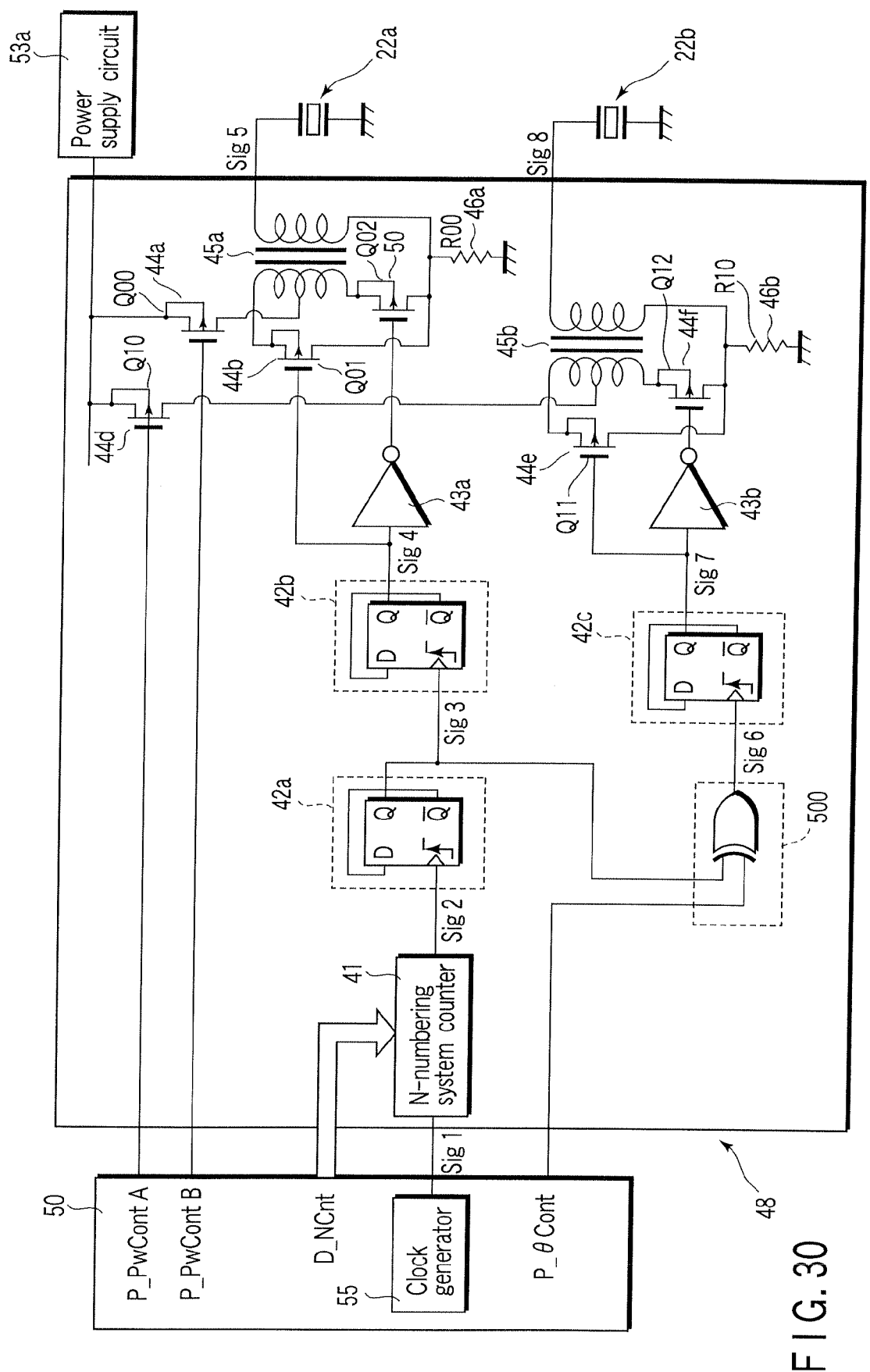
F I G. 30

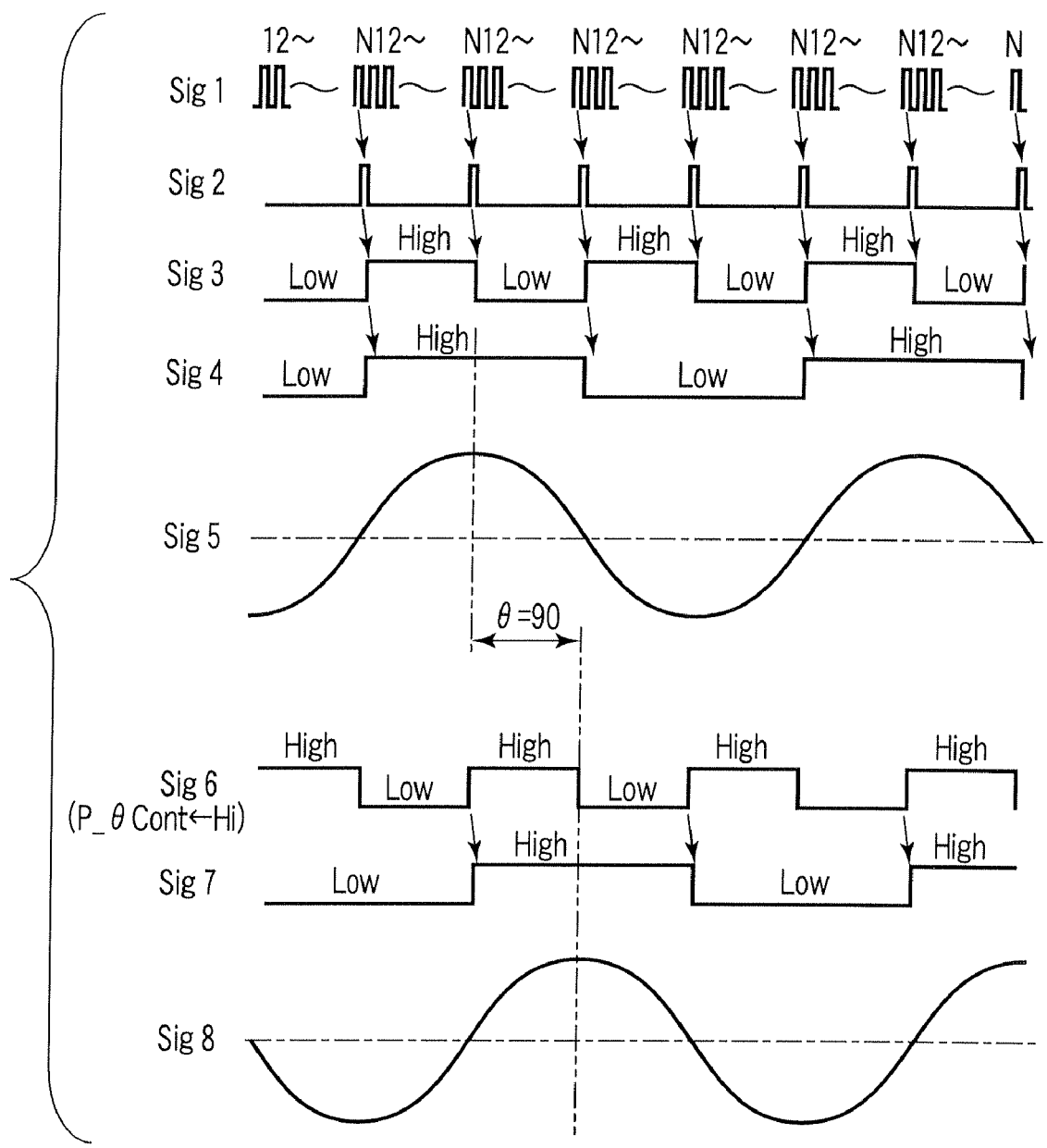
F I G. 31

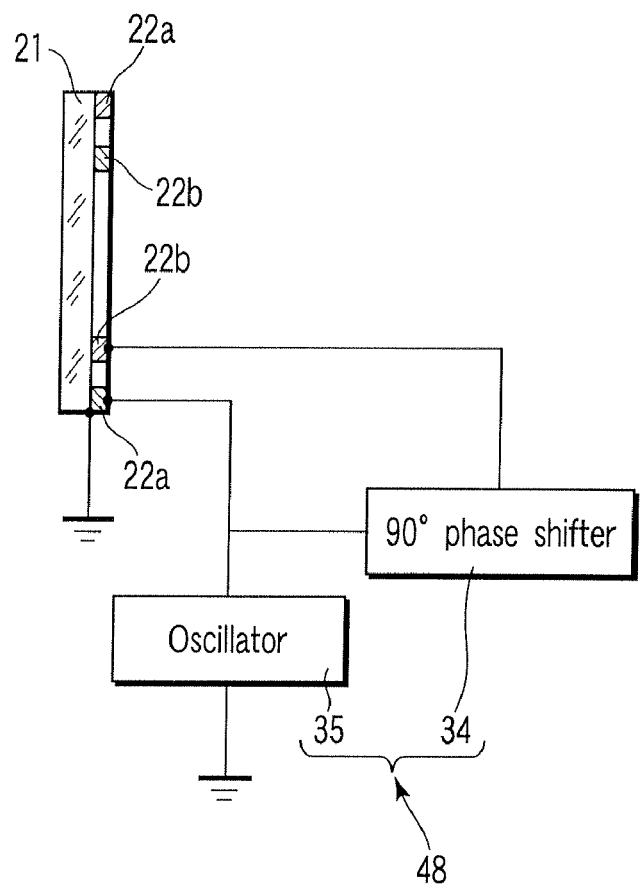
F I G. 38
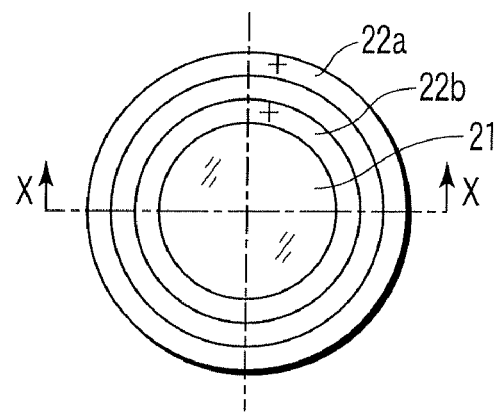
F I G. 39

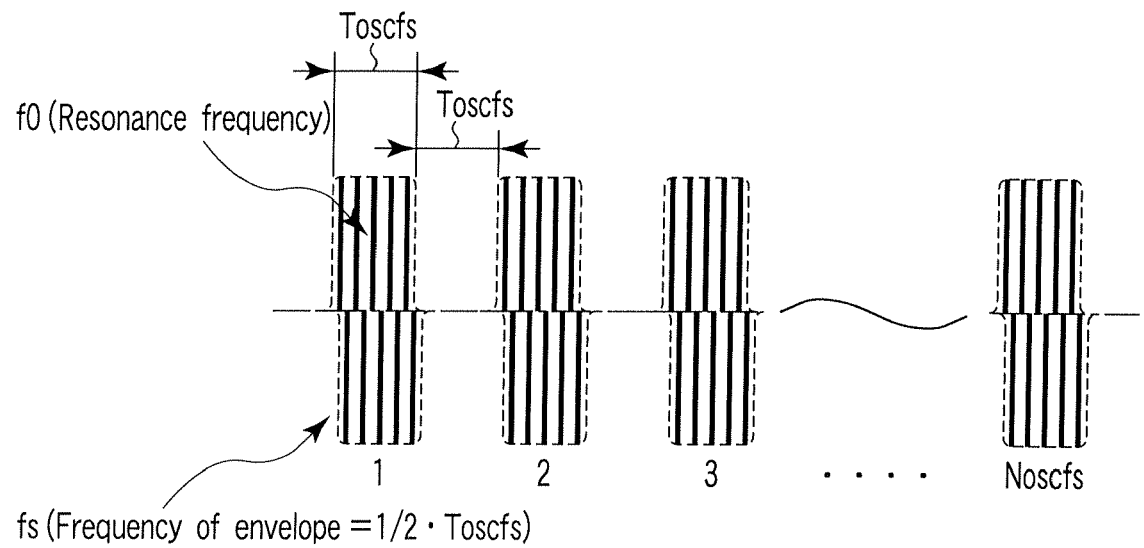
F I G. 49
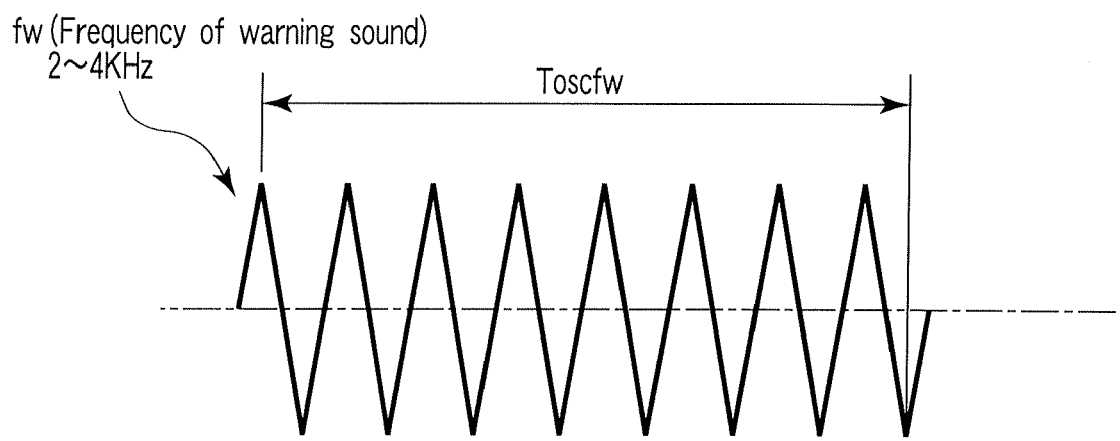
F I G. 50

| | Preset value N | Drive frequency (KHz) |
|---|---|---|
| F1 | 493 | 40.57 |
| F2 | 494 | 40.49 |
| F3 | 495 | 40.40 |
| F4 | 496 | 40.32 |
| F5 | 497 | 40.24 |
| F6 | 498 | 40.16 |
| F7 | 499 | 40.08 |
| F8 | 500 | 40.00 |
| F9 | 501 | 39.92 |
| F10 | 502 | 39.84 |
| F11 | 503 | 39.76 |
| F12 | 504 | 39.68 |
| F13 | 505 | 39.60 |
| F14 | 506 | 39.53 |
| F15 | 507 | 39.45 |

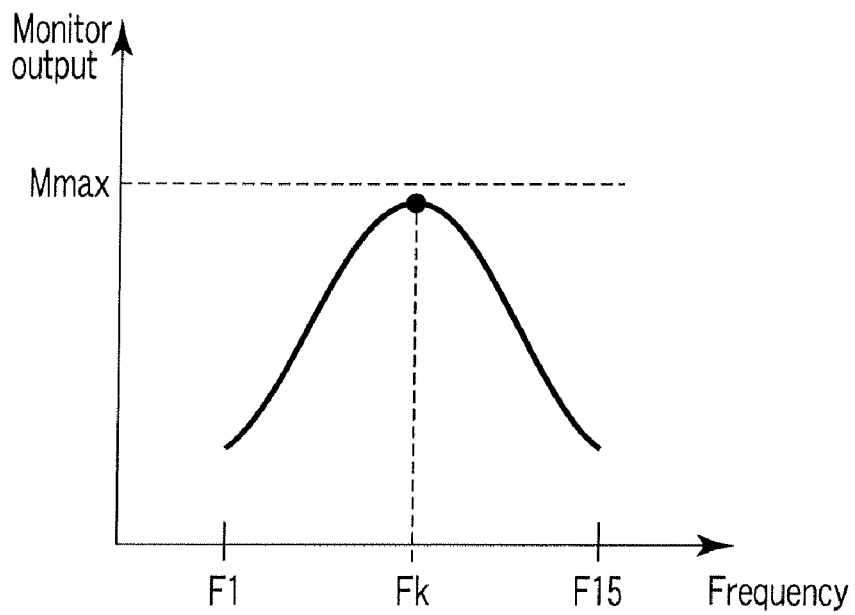
F I G. 54
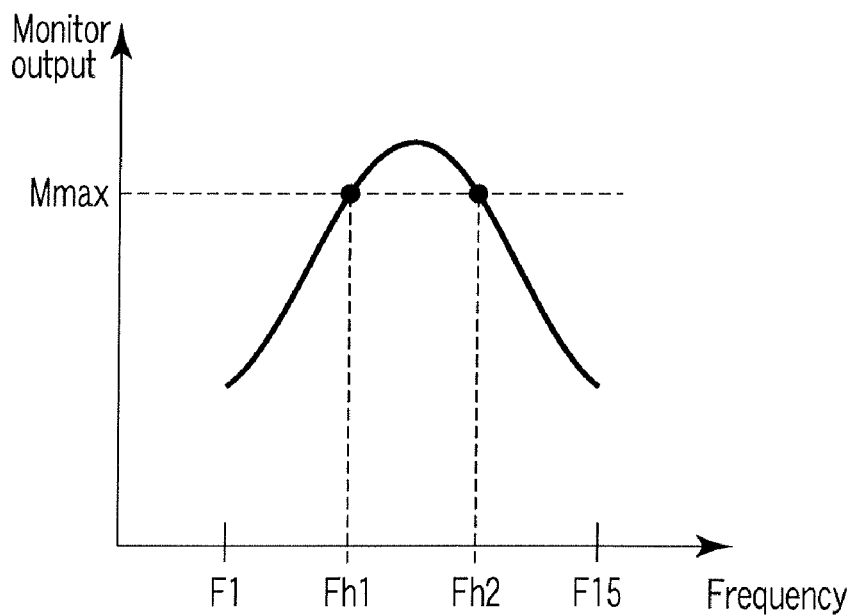
F I G. 55

| Preset value (N) | Drive frequency (KHz) |
|---|---|
| 493 | 40.57 |
| 494 | 40.49 |
| 495 | 40.40 |
| 496 | 40.32 |
| 497 | 40.24 |
| 498 | 40.16 |
| 499 | 40.08 |
| 500 | 40.00 |
| 501 | 39.92 |
| 502 | 39.84 |
| 503 | 39.76 |
| 504 | 39.68 |
| 505 | 39.60 |
| 506 | 39.53 |
| 507 | 39.45 |

F1 → (493)
F2 → (507)

ELECTRONIC IMAGING APPARATUS WITH ANTI-DUST FUNCTION

CROSS-REFERENCE TO RELATED APPLICATIONS

This application is a divisional application of U.S. patent application Ser. No. 10/438,756 (referred to as "the '756 application" and incorporated herein by reference) (titled "ELECTRONIC IMAGING APPARATUS WITH ANTI-DUST FUNCTION," filed on May 15, 2003, now U.S. Pat. No. 7,492,408 listing Junichi Ito, Sumio Kawai, and Hiroyuki Takizawa as the inventors), which is based upon and claims the benefit of priority from the prior Japanese Patent Application Nos.: 2002-142703, filed May 17, 2002; 2002-171625, filed Jun. 12, 2002; 2002-183269, filed Jun. 24, 2002; 2002-184598, filed Jun. 25, 2002; 2002-191112, filed Jun. 28, 2002; 2002-209733, filed Jul. 18, 2002; and 2002-250826, filed Aug. 29, 2002, the entire contents of which are incorporated herein by reference.

BACKGROUND OF THE INVENTION

1. Field of the Invention

The present invention relates to an anti-dust technique of an electronic imaging apparatus using an imaging element.

2. Description of the Related Art

In recent years, an electronic imaging apparatus, generally called an electronic camera or a digital camera has come into practical use, which forms an object image formed based a light flux transmitted from an object through an imaging optical system onto a photoelectric conversion surface of an imaging element and the like arranged at a predetermined position, and generates an electric image signal representing a desired object image by utilizing a photoelectric conversion effect of the imaging element and the like.

Among such electronic cameras, there is one constituted in such a manner that it comprises a single lens reflex type finder apparatus, an imaging optical system is detachably configured so as to be detachable with respect to a camera main body and a plurality of types of imaging optical systems can be selectively used in a single camera main body by arbitrarily attaching/detaching and replacing a desired imaging optical system on demand by a user.

In such an electronic camera in which a lens can be replaceable, dusts and the like floating in air may possibly enter the inside of the camera main body when the imaging optical system is removed from the camera main body. Further, since various kinds of mechanisms such as a shutter/diaphragm mechanism which mechanically operate are arranged in the camera main body, foreign particles and the like may be generated from these mechanism during their operation in some cases.

Furthermore, when the dusts, foreign particles and the like adhere to a protection glass surface arranged on a front surface of the imaging element, they are transferred into a picked-up image, which results in a visually undesirable image.

It is an object of the present invention to provide an electronic imaging apparatus with anti-dust function which can assuredly remove dusts or foreign particles which have adhered on the protection glass.

BRIEF SUMMARY OF THE INVENTION

To achieve this aim, according to a first aspect of the present invention, there is provided an electronic imaging apparatus comprising:

an imaging optical system which forms an optical image of an object;

a photoelectric conversion element which converts the optical image into an electrical signal;

an optical element arranged between the imaging optical system and the photoelectric conversion element;

exciting means for vibrating the optical element with a set frequency, wherein the exciting means vibrates the optical element at least in an imaging operation of the photoelectric conversion element.

According to a second aspect of the present invention, there is provided an electronic imaging apparatus having imaging means for converting an optical image of an object into an electrical signal, comprising:

an optical element arranged on a front surface of the imaging means;

exciting means for vibrating the optical element; and controlling means for vibrating the optical element by controlling the exciting means in execution of an imaging operation by the imaging means.

A third aspect of the present invention relates to an electronic imaging apparatus according to the second aspect of the present invention, in which the controlling means controls so as to start supply of a drive control signal to the exciting means with a timing before start of the imaging operation of the electronic imaging apparatus.

A fourth aspect of the present invention relates to an electronic imaging apparatus according to the third aspect of the present invention, in which the timing before start of the imaging operation of the electronic imaging apparatus is a timing before starting an imaging preparation operation.

A fifth aspect of the present invention relates to an electronic imaging apparatus according to a third aspect of the present invention, in which the timing before the imaging operation of the electronic imaging apparatus is a timing excluding a timing of a maximum power consumption in the imaging preparation operation by this electronic imaging apparatus.

According to a sixth aspect of the present invention, there is provided an electronic imaging apparatus including imaging means for converting an optical image of an object into an electrical signal, comprising:

an imaging optical system which leads an object light flux onto a photoelectric conversion surface of the imaging means;

anti-dust filtering means arranged in front of the photoelectric conversion surface of the imaging means; exciting means for vibrating the anti-dust filtering means; and controlling means for controlling so as to remove dusts which has adhered on the anti-dust filter by driving the exciting means at least in execution of an imaging operation by the imaging means.

A seventh aspect of the present invention relates to an electronic imaging apparatus according to the sixth aspect of the present invention, in which the electronic imaging apparatus includes preparing means for executing a preparation operation before the imaging operation by the imaging means, and the controlling means starts the dust removing operation before start of the preparation operation.

An eighth aspect of the present invention relates to an electronic imaging apparatus according to a seventh aspect of the present invention, in which the preparation operation is a retiring operation of a movable mirror provided in an imaging light path.

A ninth aspect of the present invention relates to an electronic imaging apparatus according to a seventh aspect of the present invention, in which the preparation operation is a closing operation of a diaphragm mechanism to a set position, provided in the imaging optical system.

A 10th aspect of the present invention relates to an electronic imaging apparatus according to the sixth aspect of the present invention, in which the electronic imaging apparatus comprises shutter means for adjusting an irradiation time of an object light flux to the photoelectric conversion surface, and the controlling means is set so as to start the dust removing operation before an opening operation of the shutter means.

An 11th aspect of the present invention relates to an electronic imaging apparatus according to the tenth aspect, in which the controlling means terminates the dust removing operation before a closing operation of the shutter means is executed if shutter seconds of the shutter means are longer a predetermined time.

A 12th aspect of the present invention relates to an electronic imaging apparatus according to a tenth aspect of the present invention, in which the controlling means stops the dust removing operation if the dust removing operation is continuously executed for a predetermined time before the closing operation of the shutter means is performed.

According to a 13th aspect of the present invention, there is provided an electronic imaging apparatus comprising:

an imaging optical system which forms an optical image of an object;

a photoelectric conversion element which converts the optical image into an electrical signal;

an optical element arranged between the imaging optical system and the photoelectric conversion element;

a piezoelectric element fixed to the optical element; and a control circuit which outputs a frequency signal at least in an imaging operation of the photoelectric conversion element; and a drive circuit which supplies a cyclic voltage signal to the piezoelectric element in accordance with the frequency signal.

According to a 14th aspect of the present invention, there is provided an electronic imaging apparatus in which an accessory device is attachable/detachable, comprising:

imaging means for converting an optical image of an object into an electrical signal;

an optical element arranged on a front surface of the imaging means; and dust removing means for removing dusts which have adhered to a surface of the optical element by vibrating the optical element, wherein the apparatus is controlled so as to perform a dust removing operation by the dust removing means in accordance with attachment of the accessory device.

A 15th aspect of the present invention relates to an electronic imaging apparatus according to the 14th aspect of the present invention, in which the accessory device is at least one of an replaceable imaging lens, an image recording medium which records an electronic image picked up by the imaging means, a strobe device and an external power supply.

According to a 16th aspect of the present invention, there is provided an electronic imaging apparatus having imaging means for converting an optical image of an object into an electrical signal, comprising:

an accessory device which is attachable/detachable to/from the electronic imaging apparatus;

an optical element arranged on a front surface of the imaging means;

exciting means for vibrating the optical element; and drive controlling means for driving the vibrating means by supplying a frequency signal to the exciting means, wherein the drive controlling means has a resonance frequency detection mode which drives the exciting means in order to detect a resonance frequency of the optical element and a dust removing mode which drives the exciting means in order to remove dusts which have adhered to the optical element, and the drive controlling means controls so as to continuously executes the resonance frequency detection mode and the dust removing mode in a timing that the accessory device is attached.

According to a 17th aspect of the present invention, there is provided an electronic imaging apparatus having imaging means for converting an optical image of an object into an electronic signal, comprising:

an imaging optical system which is attachable/detachable to/from the electronic imaging apparatus and forms the optical image on the imaging means;

an optical element arranged between the imaging optical system and imaging means;

exciting means for vibrating the optical element; and drive controlling means which drives the exciting means by supplying a frequency signal to the exciting means, wherein the drive controlling means controls so as to vibrate the optical element by driving the exciting means when the imaging optical system is attached to the electronic imaging apparatus.

An 18th aspect of the present invention relates to an electronic imaging apparatus according to the 17th aspect, in which the drive controlling means drives the exciting means with a resonance frequency detected by a resonance point detecting operation to detect a resonance frequency of the optical element after executing the resonance point detecting operation.

A 19th aspect of the present invention relates to an electronic imaging apparatus according to the 17th aspect of the present invention, in which the drive controlling means has a resonance frequency detection mode to drive the exciting means in order to detect a resonance frequency of the optical element and a dust removing mode to drive the exciting means in order to remove dusts which have adhered to the optical element, the drive controlling means controls so as to continuously execute the resonance frequency detection mode and the dust removing mode in a timing that the imaging optical mode is attached, and it controls so as to execute only the dust removing mode in a predetermined timing before the imaging operation.

According to a 20th aspect of the present invention, there is provided an electronic imaging apparatus comprising:

a detachable imaging optical system;

a photoelectric conversion element which converts an optical image of an object led by the imaging optical system into an electrical signal;

an optical element arranged between the imaging optical system and the photoelectric conversion element;

a piezoelectric element fixed to the optical element;

a control circuit which outputs a frequency signal in response to attachment of the imaging optical system; and a drive circuit which supplies a cyclic voltage signal to the piezoelectric element in accordance with the frequency signal.

According to a 21st aspect of the present invention, there is provided an electronic imaging apparatus comprising:

an optical system which forms an object image;

an imaging element which converts an object image formed by the optical system into an electric signal;

an anti-dust optical member arranged between the optical system and the imaging element; and exciting means for generating a flexural progressive wave in the anti-dust optical member by vibrating the anti-dust optical member.

A 22nd aspect of the present invention relates to an electronic imaging apparatus according to the 21st aspect of the present invention, in which the flexural progressive wave generated by the exciting means has a substantially symmetrical shape when seen from an optical axis of the optical system at an arbitrary time.

A 23rd aspect of the present invention relates to an electronic imaging apparatus according to the 21st aspect of the present invention, in which the exciting means comprises: a first exciting member which is arranged at a circumferential portion of an effective image area through which an object light flux of the anti-dust optical member passes; a second exciting member which is arranged at a position shifted from the first exciting member in a traveling direction of the flexural progressive wave by a distance of approximately ¼ of a wavelength of the flexural progressive wave; and driving means for applying a first cyclic voltage signal to the first exciting member, and applying a second cyclic voltage signal whose phase is shifted from the first cyclic voltage signal by approximately 90 degrees to the second exciting member.

A 24th aspect of the present invention relates to an electronic imaging apparatus according to the 23rd aspect of the present invention, in which the first exciting member is arranged on one surface of the anti-dust optical member, and the second exciting member is arranged on the other surface of the anti-dust optical member.

A 25th aspect according to the present invention relates to an electronic imaging apparatus according to the 23rd aspect of the present invention, in which the first exciting member and the second exciting member are arranged on one surface side of the anti-dust optical member, and the second exciting member is arranged so as to be laminated on the first exciting member.

A 26th aspect according to the present invention relates to an electronic imaging apparatus according to the 23rd aspect of the present invention, in which the first exciting member is arranged at an outer peripheral edge portion of one surface of the anti-dust optical member, and the second exciting member is arranged on the same level as an arrangement surface of the first exciting member and on the inner side away from the first exciting member.

A 27th aspect according to the present invention relates to an electronic imaging device according to the 23rd aspect of the present invention, in which the first exciting member and the second exciting member are arranged on one surface of the anti-dust optical member and generate a concentric bending vibration to the anti-dust optical member.

According to a 28th aspect of the present invention, there is provided an electronic imaging apparatus comprising:

an optical system which forms an image of an object;

an imaging element which converts the object image into an electrical signal;

an anti-dust optical member arranged between the optical system and the imaging element;

a first exciting member and a second exciting member arranged at a peripheral edge portion of the anti-dust optical member; and driving means for applying cyclic voltage signals having different phases to the first exciting member and the second exciting member so as to generate a flexural progressive wave to the anti-dust optical member.

A 29th aspect of the present invention relates to an electronic imaging apparatus according to a 28th aspect of the present invention, in which the driving means generates a standing wave to the anti-dust optical member by applying a cyclic voltage signal to one of the first exciting member and the second exciting member or applying cyclic voltage signals having the same phase to both of the first exciting member and the second exciting member.

A 30th aspect of the present invention relates to an electronic imaging apparatus according to the 29th aspect of the present invention, in which the driving means sequentially generates the flexural progressive wave and the standing wave to the anti-dust optical member.

According to a 31st aspect of the present invention, there is provided an electronic imaging apparatus comprising:

imaging means for converting an optical image of an object into an electrical signal;

an anti-dust filter arranged on a front surface of the imaging means;

exciting means for vibrating the anti-dust filter; and measuring means for measuring a power supply voltage, wherein the exciting means changes an oscillation frequency of the anti-dust filter in accordance with a power supply voltage measured by the measuring means.

A 32nd aspect according to the present invention relates to an electronic imaging apparatus according to the 31st aspect of the present invention, in which the exciting means vibrates the anti-dust filter with a first frequency close to a resonance frequency of the anti-dust filter when the power supply voltage is not more than a predetermined voltage, and vibrates it with a second frequency which deviates from the resonance frequency when the power supply voltage is higher than the predetermined voltage.

A 33rd aspect of the present invention relates to an electronic imaging apparatus according to the 32nd aspect of the present invention, in which the second frequency is a frequency with which the anti-dust filter is not destroyed even if the power supply voltage is higher than the predetermined voltage.

A 34th aspect of the present invention relates to an electronic imaging apparatus according to the 32nd aspect of the present invention, in which the first and second frequencies have values which are inherent to the anti-dust filter and set in an assembling step of the electronic imaging apparatus.

A 35th aspect of the present invention relates to an electronic imaging apparatus according to the 32nd aspect of the present invention, in which the predetermined voltage is a voltage with which the anti-dust filter may be possibly destroyed when the anti-dust filter is vibrated in the vicinity of a resonance frequency of the anti-dust filter.

According to a 36th aspect of the present invention, there is provided an electronic imaging apparatus comprising:

imaging means for converting an optical image of an object into an electrical signal;

an anti-dust filter arranged on a front surface of the imaging means;

exciting means for vibrating the anti-dust filter; and measuring means for measuring a power supply voltage, wherein the exciting means changes a time to vibrate the anti-dust filter in accordance with a power supply voltage measured by the measuring means.

A 37th aspect of the present invention relates to an electronic imaging apparatus according to the 36th aspect of the present invention, in which the exciting means vibrates the anti-dust filter only for a first predetermined time when the power supply voltage is higher than a predetermined voltage, and vibrates the anti-dust filter only for a second predetermined time longer than the first predetermined time when the power supply voltage is not more than the predetermined voltage.

A 38th aspect of the present invention relates to an electronic imaging apparatus according to the 37th aspect of the present invention, in which the first and second predetermined times have values determined by a characteristic of the anti-dust filter.

According to a 39th aspect of the present invention, there is provided an electronic imaging apparatus comprising:

an imaging element;

an anti-dust filter arranged on a front surface of the imaging element;

a piezoelectric element arranged at a peripheral edge portion of the anti-dust filter;

a drive circuit which vibrates the piezoelectric element;

a measurement circuit which outputs digital data by measuring a power supply voltage; and a control circuit which adjusts a frequency signal used to vibrate the piezoelectric element in accordance with a measurement result of the measurement circuit and supplies it to the drive circuit, wherein the electronic imaging apparatus further comprises a dust removing mechanism which removes dusts which have adhered to a surface of the anti-dust filter by vibrating the anti-dust filter with vibrations of the piezoelectric element.

A 40th aspect of the present invention relates to an electronic imaging apparatus according to the 39th aspect of the present invention, in which the control circuit adjusts a frequency of the frequency signal or a time to supply the frequency signal to the drive circuit in accordance with a power supply voltage measured by the measurement circuit.

A 41st aspect according to the present invention relates to an electronic imaging apparatus according to a 40th aspect of the present invention, in which the control circuit compares a power supply voltage measured by the measurement circuit with a predetermined value, supplies a signal having a frequency close to a resonance frequency of the anti-dust filter to the drive circuit when the power supply voltage is not more than the predetermined voltage, and supplies a signal having a frequency which deviates from the resonance frequency to the drive circuit when the power supply voltage is higher than the predetermined value.

A 42nd aspect of the present invention relates to an electronic imaging apparatus according to the 39th aspect of the present invention, in which the control circuit compares a power supply voltage measured by the measurement circuit with a predetermined value, supplies the frequency signal to the drive circuit only for a first predetermined time when the power supply voltage is higher than a predetermined value, and supplies the frequency signal to the drive circuit only for a second predetermined time longer than the first predetermined time when the power supply voltage is not more than the predetermined value.

According to a 43rd aspect of the present invention, there is provided an electronic imaging apparatus which has imaging means for photo-electrically converting an object image and has a function which selectively enables sound production in and out of a audible range, comprising:

a member which is arranged on a front surface of the imaging means and has a transmittance capable of vibrating;

exciting means for vibrating the member; and controlling means for generating at least vibrations and a sound for status annunciation by supplying driving by selectively changing a vibration conformation by the exciting means.

A 44th aspect of the present invention relates to an electronic imaging apparatus according to the 43rd aspect of the present invention, in which the vibration conformation is controlled by adjusting an ON/OFF timing of a signal power supplied to the exciting means or adjusting a resonance frequency supplied to the exciting means.

According to a 45th aspect of the present invention, there is provided an electronic imaging apparatus having imaging means for converting an optical image of an object into an electrical signal, comprising:

an optical element arranged on a front surface of the imaging means;

exciting means for vibrating the optical element; and controlling means for supplying a frequency signal used to vibrate the optical element to the exciting means, wherein the controlling means can cause sound vibration of the optical element by adjusting the frequency.

A 46th aspect of the present invention relates to an electronic imaging apparatus according to the 45th aspect of the present invention, in which the sound vibration has a first sound vibration state used for notifying a state of the electronic imaging apparatus.

A 47th aspect of the present invention relates to an electronic imaging apparatus according to the 46th aspect of the present invention, in which the sound vibration has a second sound vibration state used to perform both a removing operation of dusts which have adhered to the optical element and a notifying operation.

A 48th aspect according to the present invention relates to an electronic imaging apparatus according to the 47th aspect of the present invention, in which the sound vibration is executed before an imaging operation of the imaging means.

According to a 49th aspect of the present invention, there is provided an electronic imaging apparatus including imaging means for converting an optical image of an object into an electrical signal, comprising:

an imaging optical system which leads an object light flux onto a photoelectric conversion surface of the imaging means;

anti-dust filter means arranged in front of the photoelectric conversion surface of the imaging means; exciting means for vibrating the anti-dust filter means; and controlling means for supplying a frequency signal used to vibrate the anti-dust filter to the exciting means, in which the controlling means has a first vibration mode which causes soundless vibration of the anti-dust filter and a second vibration mode which causes sound vibration of the anti-dust filter, and the second vibration mode is executed when performing phonetic representation of a state of the electronic imaging apparatus.

A 50th aspect according to the present invention relates to an electronic imaging apparatus according to the 49th aspect of the present invention, in which the electronic imaging apparatus includes means for detecting a focusing state of the imaging optical system and adjusting a focusing state of the imaging optical system in accordance with its result, and the controlling means executes the second vibration mode in accordance with a focusing adjustment state of the imaging optical system.

A 51st aspect according to the present invention relates to an electronic imaging apparatus according to the 49th aspect of the present invention, in which the second vibration mode is used for focusing display of the imaging optical system.

A 52nd aspect according to the present invention relates to an electronic imaging apparatus according to the 49th aspect of the present invention, in which the electronic imaging apparatus can attach/detach recording means for recording an output from the imaging means, and the controlling means executes the second vibration mode when the recording means is not attached.

According to a 53rd aspect of the present invention, there is provided an electronic imaging apparatus with an anti-dust mechanism, comprising:

a photoelectric conversion element which converts an optical image of an object into an electrical signal;

an anti-dust member arranged on a front surface of the photoelectric conversion element;

exciting means for causing a dust removing operation by vibrating the anti-dust member;

frequency varying means for sequentially varying an oscillation frequency of the anti-dust member vibrated by the exciting means; and monitor means for monitoring an amplitude value when the anti-dust member vibrates and controlling the dust removing operation in accordance with the monitored amplitude value.

A 54th aspect according to the present invention relates to an electronic imaging apparatus according to the 53rd aspect of the present invention, in which the exciting means vibrates the anti-dust member in accordance with a frequency signal supplied from the frequency varying means.

A 55th aspect according to the present invention relates to an electronic imaging apparatus according to the 54th aspect of the present invention, in which the exciting means vibrates the anti-dust member in accordance with a plurality of frequency signals in a predetermined frequency range sequentially supplied from the frequency varying means.

A 56th aspect according to the present invention relates to an electronic imaging apparatus according to a 55th aspect of the present invention, in which the predetermined frequency range is a range including a resonance frequency of the anti-dust member.

A 57th aspect according to the present invention relates to an electronic imaging apparatus according to the 53rd aspect of the present invention, in which the monitor means monitors an amplitude value with which the anti-dust member may be possibly destroyed, and stops the dust removing operation when exceeding this amplitude value.

According to a 58th aspect of the present invention, there is provided an electronic imaging apparatus comprising:

an imaging optical system which forms an optical image of an object;

a photoelectric conversion element which converts the optical image into an electrical signal;

an anti-dust filter arranged between the imaging optical system and the photoelectric conversion element;

a piezoelectric element integrally arranged at a part of the anti-dust filter;

a drive circuit which drives the piezoelectric element by applying a voltage signal to the piezoelectric element;

a control circuit which supplies a drive signal to the drive circuit so as to vibrate the anti-dust filter by vibrating the piezoelectric element; and a monitor circuit which monitors a vibration state of the piezoelectric element and outputs a monitor signal to the control circuit, wherein the control circuit sequentially changes a drive signal to be supplied to the drive circuit in such a manner that an oscillation frequency of the anti-dust filter sequentially varies, and stops supply of the drive signal when a level of the monitor signal supplied from the monitor circuit during this changing exceeds a predetermined value.

A 59th aspect according to the present invention relates to an electronic imaging apparatus according to the 58th aspect of the present invention, in which the control circuit stops supply of the drive signal when a predetermined time elapses after a level of the monitor signal from the monitor circuit exceeds a predetermined value.

A 60th aspect according to the present invention relates to an electronic imaging apparatus according to the 58th aspect of the present invention, in which the drive circuit changes a frequency of a voltage signal to be applied to the piezoelectric element in accordance with a drive signal from the control circuit.

According to a 61st aspect of the present invention, there is provided an electronic imaging apparatus with an anti-dust mechanism which removes dusts which have adhered to a surface of an anti-dust filter arranged on a front surface of a photoelectric conversion element which converts an optical image of an object into an electrical signal by vibrating the anti-dust filter, comprising:

monitor means for detecting an amplitude value of the anti-dust filter;

storing means for previously storing an output value of the monitor means when the anti-dust filter is vibrated in the vicinity of a resonance frequency of the anti-dust filter; and judging means for comparing an output value of the monitor means with a stored value of the storing means in execution of a dust removing operation by the anti-dust filter, and judging whether foreign matters exist on the anti-dust filter depending on whether the both values have a predetermined relationship.

A 62nd aspect of the present invention relates to an electronic imaging apparatus according to the 61st aspect of the present invention, in which the judging means determines that foreign particles exist on the anti-dust filter when the output value of the monitor means is less than a predetermined ratio with respect to the stored value.

A 63rd aspect of the present invention relates to an electronic imaging apparatus according to the 61st aspect, in which when the judging means judges that foreign particles exist on the anti-dust filter, the subsequent imaging operation is stopped.

A 64th aspect according to the present invention relates to an electronic imaging apparatus according to the 61st aspect, in which the electronic imaging apparatus comprises warning means which performs warning display when the judging means determines that foreign particles exist on the anti-dust filter.

A 65th aspect according to the present invention relates to an electronic imaging apparatus according to the 61st aspect of the present invention, in which the subsequent imaging operation is stopped when the judging means determines that foreign particles exist on the anti-dust filter.

According to a 66th aspect of the present invention, there is provided an electronic imaging apparatus comprising:

an imaging optical system which forms an optical image of an object;

a photoelectric conversion element which converts the optical image of the object formed by the imaging optical system into an electrical signal;

an anti-dust filter provided between the imaging optical system and the photoelectric conversion element;

a piezoelectric element integrally provided at a part of the anti-dust filter;

a drive circuit which vibrates the piezoelectric element;

a control circuit which supplies drive control data to the drive circuit so as to vibrate the anti-dust filter by vibrating the piezoelectric element;

a monitor circuit which monitors a vibration state of the piezoelectric element and supplies its monitor output to the control circuit;

resonance frequency detecting means which detects a resonance frequency of an anti-dust mechanism including the anti-dust filter from a change in level of the monitor output from the monitor circuit while the drive control data supplied to the drive circuit is sequentially varied by the control circuit in such a manner that an oscillation frequency of the anti-dust filter is sequentially changed, storing means for storing the resonance frequency and a monitor output value of the monitor circuit in the resonance frequency;

dust removing means for vibrating the anti-dust filter based on the resonance frequency information in connection with an imaging operation;

judging means for comparing a monitor output value of the monitor circuit with a stored value of the storing means in a dust removing operation by the dust removing means, and judging whether the both values have a predetermined relationship; and determining means for determining whether the imaging operation should be continued in accordance with a judgment result of the judging means.

A 67th aspect according to the present invention relates to an electronic imaging apparatus according to the 66th aspect of the present invention, in which the judging means determines that foreign particles exist on the anti-dust filter when the monitor output value of the monitor circuit is smaller than the stored value of the storing means.

A 68th aspect according to the present invention relates to an electronic imaging apparatus according to the 66th aspect of the present invention, in which the judging means determines that foreign particles exist on the anti-dust filter when the monitor output value of the monitor circuit is less than a predetermined ratio with respect to the stored value of the storing means.

A 69th aspect according to the present invention relates to an electronic imaging apparatus according to the 66th aspect of the present invention, in which the electronic imaging apparatus comprises a display circuit which performs warning display when the judging means determines that foreign particles exist on the anti-dust filter.

A 70th aspect according to the present invention relates to an electronic imaging apparatus according to the 66th aspect of the present invention, in which the imaging operation is stopped when the judging means determines that foreign particles exist on the anti-dust filter.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a primary part exploded perspective view showing an imaging unit in the camera in the exploded manner;

FIG. 16 is a circuit diagram of exciting means (anti-dust glass drive circuit) as a second embodiment according to the present invention;

FIG. 23 is a memory map showing a table area concerning frequency correction occupied in an EEPROM;

FIGS. 24A and 24B show control parameters concerning frequency correction of the vibration modes, in which FIG. 24A is a list showing a detail of a vibration mode 1 compatible control parameter table and FIG. 24B is a list showing a detail of a vibration mode 2 compatible control parameter table;

FIGS. 25A and 25B show correction values corresponding to the vibration modes, in which FIG. 25A is a detailed table of the vibration mode 1 compatible frequency correction table and FIG. 25B is a detailed table of the vibration mode 2 compatible frequency correction table;

FIG. 30 is a circuit diagram schematically showing a structure of an anti-dust filter drive circuit in the camera;

FIG. 31 is a time chart showing respective signal conformations outputted from respective constituent members in the anti-dust filter drive circuit depicted in FIG. 30;

FIG. 38 is a view showing an arrangement of an anti-dust filter and a piezoelectric element according to a third modification according to the third embodiment of the present invention;

FIG. 39 is a view showing an arrangement and polarization of the piezoelectric element depicted in FIG. 38;

FIG. 49 is a graph showing a waveform of the resonance frequency intermittently supplied to the exciting means and its intermittent frequency;

FIG. 50 is a graph showing a waveform of a frequency as a warning sound to be produced;

FIG. 54 is a view showing a change in a monitor output relative to a frequency scan operation;

FIG. 55 is a view illustrating a method of controlling a vibration state in accordance with whether the monitor output exceeds the Mmax in the dust removing operation;

DETAILED DESCRIPTION OF THE INVENTION

First Embodiment

Figure 1:
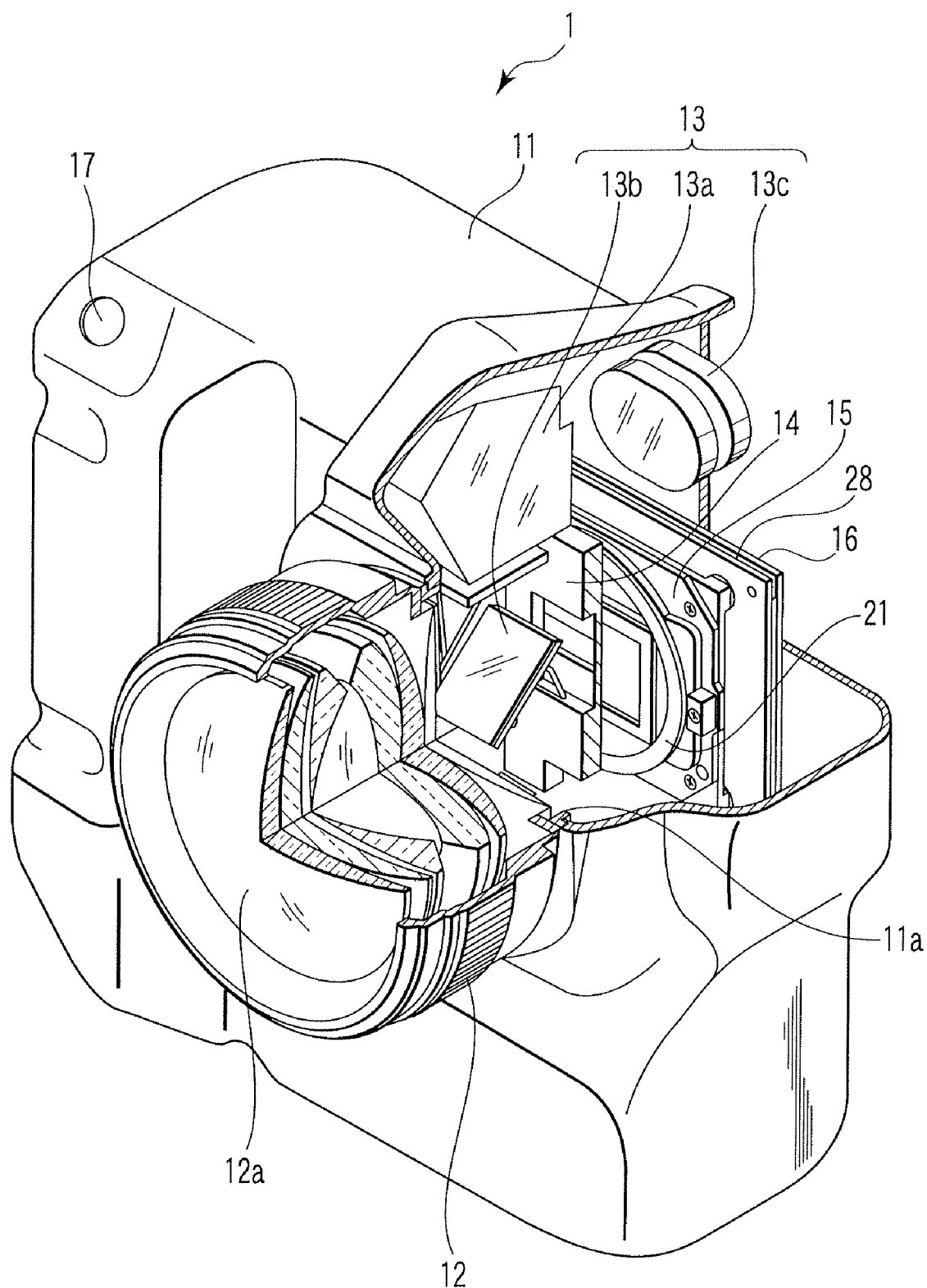
FIG. 1 is a perspective view schematically showing a mechanical structure in a camera according to a first aspect of the present invention by partially cutting the camera.
Figure 2:
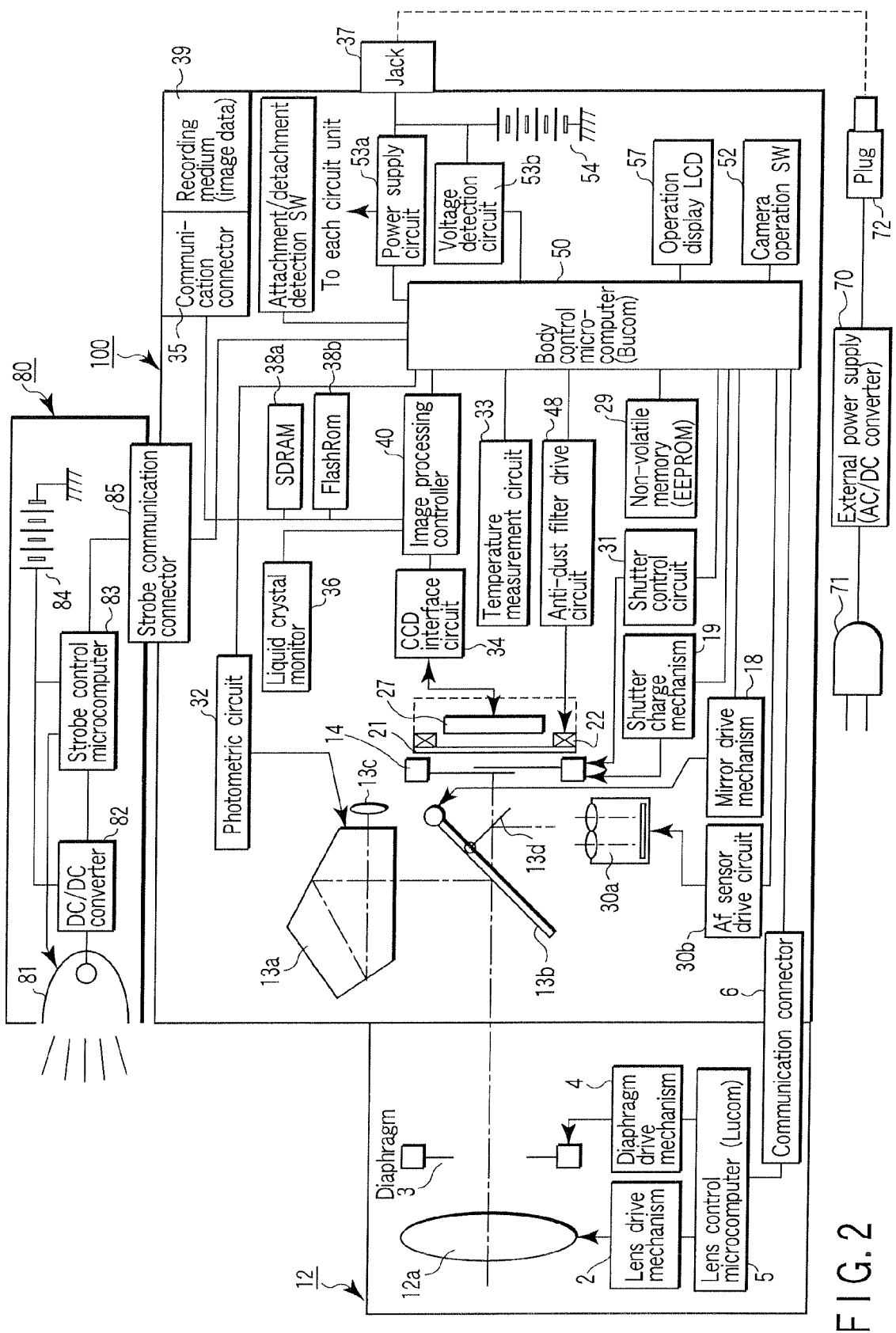
FIG. 2 is a block diagram schematically mainly showing an electrical structure of the camera.

A first embodiment according to the present invention will first be described. FIGS. 1 and 2 show a schematic structure of a camera according to the first embodiment of the present invention. FIG. 1 is a perspective view schematically showing a mechanical internal structure by partially cutting the camera, and FIG. 2 is a block diagram mainly schematically showing an electrical structure of the camera. First, the mechanical structure will be explained.

The camera 1 according to this embodiment consists of a camera main body portion 11 and a lens unit 12 which are constituted as different bodies, and these members are detachably configured.

The lens unit 12 is configured to hold an imaging optical system 12a consisting of a plurality of lenses, their drive mechanism or the like therein, and this imaging optical system 12a is constituted by, e.g., a plurality of optical lenses in such a manner that an image of an object formed by an object light flux by transmitting a light flux from an object can be formed at a predetermined position (on a photoelectric conversion surface (light receiving surface) of an imaging element 27 which will be described later). Further, this lens unit 12 is arranged so as to protrude toward a front surface of the camera main body portion 11.

It is to be noted that, as the lens unit 12, one equal to those generally utilized in a conventional camera and the like is applied. Therefore, description of its detailed structure will be eliminated.

The camera main body portion 11 is configured so as to include various kinds of constituent members and the like therein, and this is a so-called "single lens reflex type" camera constituted to include on its front surface a lens body tube attachment portion 11a which is a coupling member used to detachably arrange the lens unit 12 which holds the imaging optical system 12a.

That is, an exposure opening having a predetermined aperture which can lead the object light flux into the camera main body portion 11 is formed at the substantially central portion on the front surface side of the camera main body portion 11, and the lens body tube attachment portion 11a is formed at the peripheral edge portion of this exposure aperture.

On the outer surface side of the camera main body portion 11 are arranged the lens body tube attachment portion on the front surface, as well as various kinds of operation members used to operate the camera main body portion 11 at predetermined positions, e.g., an upper surface portion or a rear surface portion, a release button 17 used to generate direction signals and the like used to start, e.g., an imaging operation, and others. Since these operation members do not directly concern the present invention, drawings and description of the operation members other than the release button 17 will be eliminated in order to avoid complication of the drawings.

In the camera main body portion 11, there are arranged at predetermined positions various kinds of constituent members as shown in FIG. 1, e.g., a finder device 13 which is provided in order to form a desired object image formed by, e.g., an imaging optical system 12a at a predetermined position different from a photoelectric conversion surface of an imaging element 27 and which constitutes a so-called "observation optical system", a shutter portion 14 including a shutter mechanism or the like which controls an irradiation time and the like of an object light flux to the photoelectric conversion surface of the imaging element 27, an imaging unit which is imaging means including the shutter portion 14 to obtain an image signal corresponding to the object image formed based on the object light flux which has transmitted through the imaging optical system 12a, which is an optical element and also an anti-dust member which is arranged at a predetermined position of the imaging element 27 as a photoelectric conversion element and on a front surface side of the photoelectric conversion surface of the imaging element 27 and prevents dusts and the like from adhering to the photoelectric conversion surface and which consists of an anti-dust filter 21 (which will be described later) or the like as filtering means, a main circuit substrate 16 having mounted thereon various kinds of electric members constituting an electric circuit such as an image signal processing circuit or the like which perform various kinds of signal processing with respect to an imaging signal acquired by the imaging element 27, and others.

The finder device 13 is constituted by a quick return mirror 13b configured so as to bend an optical axis of an object light flux which has transmitted through the imaging optical system 12a and lead it to the observation optical system side, a pentaprism 13a forming an erecting normal image upon receiving a light flux outgoing from the quick return mirror 13b, an eyepiece 13c which forms an image which is optimum for being observed by enlarging an image formed by the pentaprism 13a, and others.

The quick return mirror 13b is constituted so as to be movable between a position retired from an optical axis of the imaging optical system 12a and a predetermined position on the optical system, and it is arranged at a predetermined angle, e.g., an angle of 45° relative to the optical axis on the optical axis of the imaging optical system in the normal state. As a result, when the camera is in the normal state, the optical axis of the object light flux which has transmitted through the imaging optical system 12a is bent by the quick return mirror 13b and reflected to the pentaprism 13a side arranged above the quick return mirror 13b.

On the other hand, when the camera 1 is executing an imaging operation, in an actual exposure operation, the quick return mirror 13b moves to a predetermined position retired from the optical axis of the imaging optical axis 12a. As a result, the object light flux is led to the imaging element 27 side, the its photoelectric conversion surface is irradiated with this object light flux.

As the shutter portion 14, there is applied, e.g., a shutter mechanism adopting a focal plane mode, a drive circuit or the like which controls an operation of the shutter mechanism, or one equal to those which are generally used in the conventional cameras. Therefore, description on its detailed structure will be eliminated.

The electrical description based on FIG. 2 will be given later. The detailed structure of the imaging unit 15 in the camera 1 according to this embodiment will now be described hereinafter.

Figure 4:
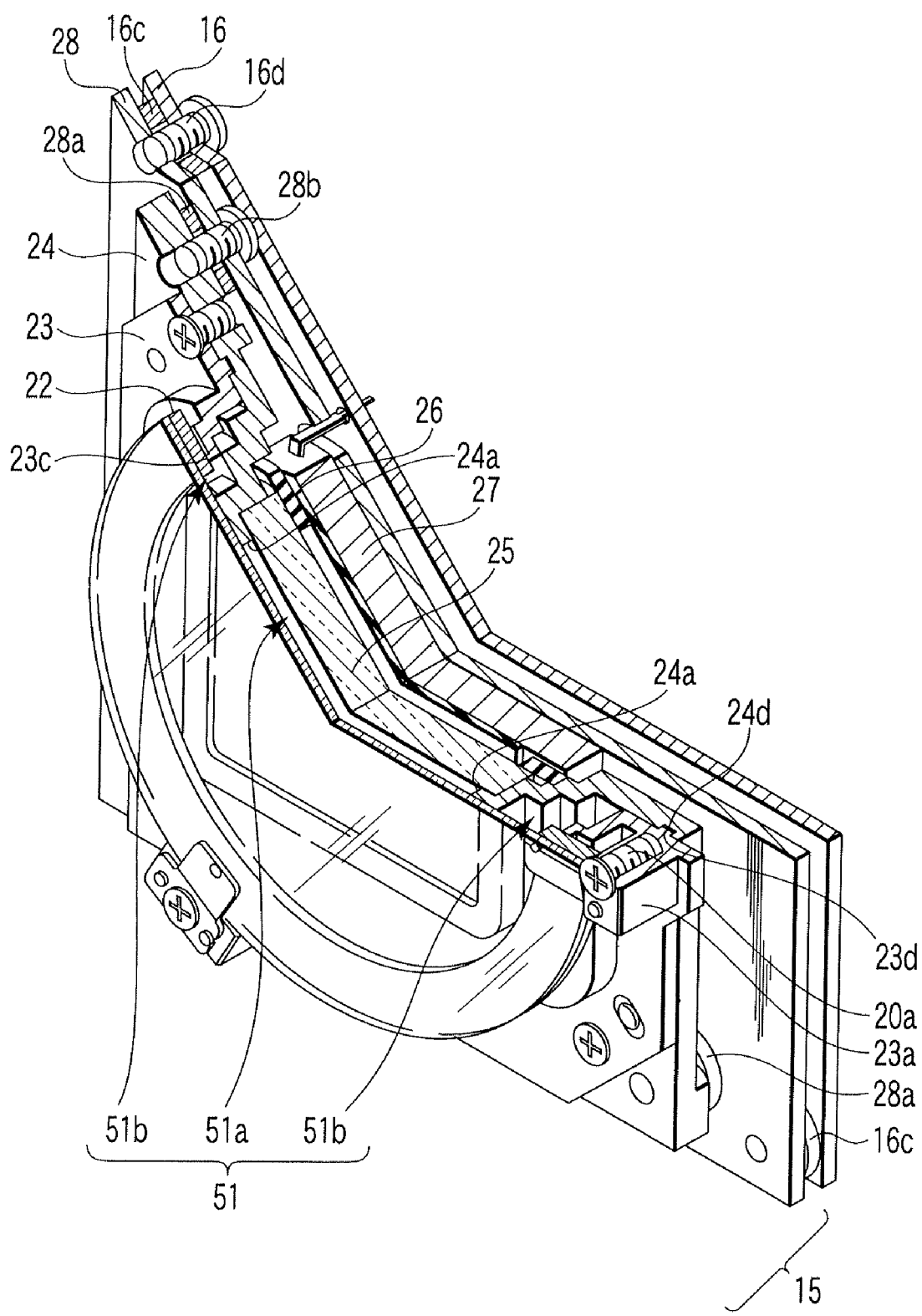
FIG. 4 is a perspective view showing the imaging in the assembled state by partially cutting this unit.
Figure 5:
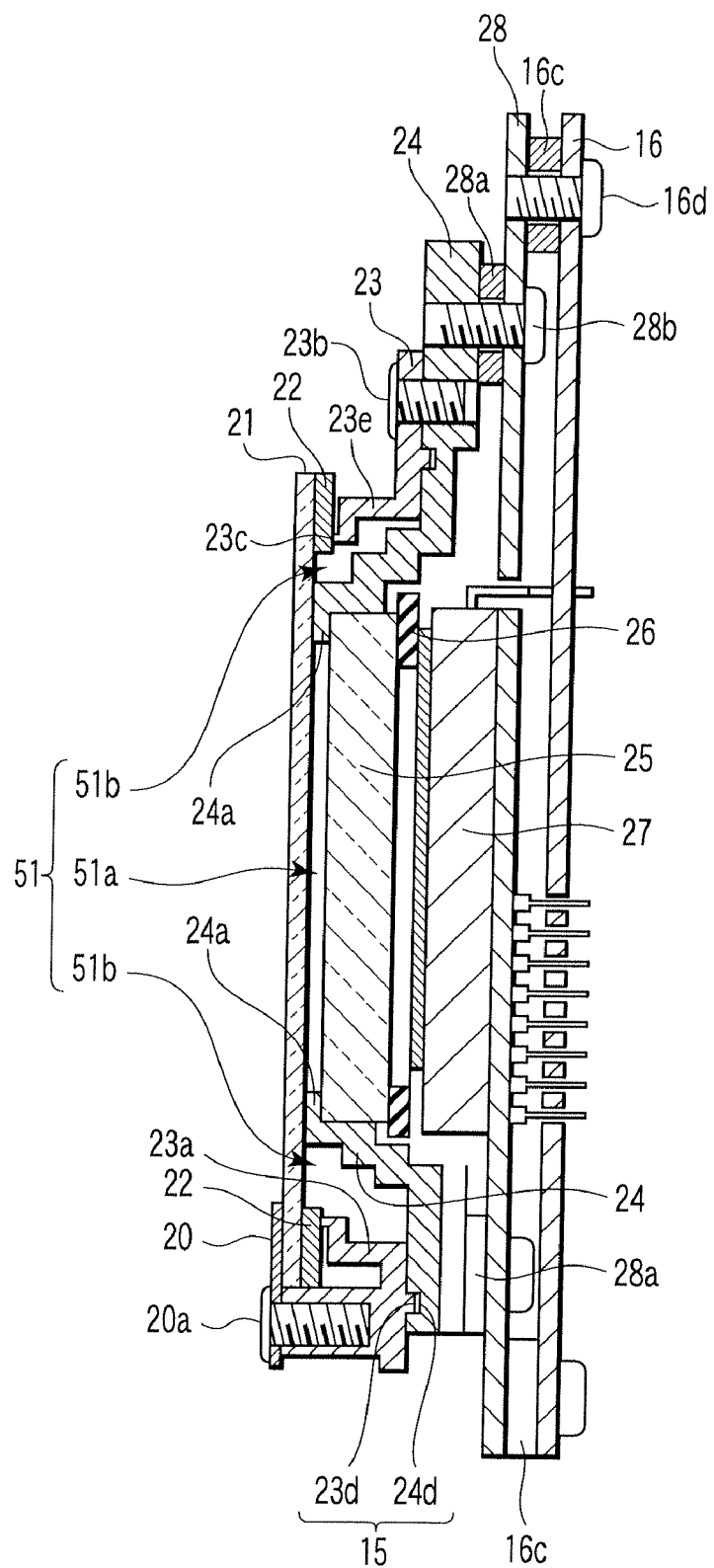
FIG. 5 is a cross-sectional view taken along a cut cross section of the camera in FIG. 4.

FIGS. 3, 4 and 5 show only a part of the imaging unit in the camera 1 according to this embodiment, in which FIG. 3 is a primary part exploded perspective view showing the imaging unit in the exploded manner, FIG. 4 is a perspective view showing a part of the imaging unit in the assembling state by cutting it and FIG. 5 is a cross-sectional view taken along the cut plane in FIG. 4.

It is to be noted that the imaging unit 15 of the camera 1 according to this embodiment is a unit constituted by a plurality of members including the shutter portion 14, but FIGS. 3 to 5 show only its primary part, and illustration of the shutter portion 14 is eliminated. Further, in order to illustrate a positional relationship between respective constituent members, FIGS. 3 to 5 also show a main circuit board 16 which is provided in the vicinity of the imaging unit 15 and has mounted thereon the imaging element 27 and also has mounted thereon an imaging system electric circuit consisting of an image signal processing circuit, a work memory and others. Incidentally, as to the main circuit board 16 and its detail, one generally utilized in the conventional cameras is applied, and its description will be eliminated.

The imaging unit 15 consists of a CCD and others, and is constituted by: an imaging element 27 which obtains an image signal corresponding to the light which has been transmitted through the imaging optical system 12a and with which its photoelectric conversion surface is irradiated; an imaging element fixing plate consisting of a thin-plate type member which firmly supports the imaging element 27, an optical low pass filter (which will be referred to as an "optical LPF" hereinafter) 25 formed so as to remove a high-frequency component from an object light flux which is transmitted through the imaging optical system 12a and radiated; a low pass filter receiving member 26 which is arranged at a peripheral edge portion between the optical LPF 25 and an imaging element 27 and formed by an elastic member or the like having a substantially frame shape; an imaging element accommodating case member 24 (later-described second member; which will be referred to as a "CCD case 24" hereinafter) which accommodates and firmly holds the imaging element 27, supports the optical LPF 25 while being appressed against its peripheral edge part or its adjacent part, and is arranged so as to bring a predetermined part into close contact with a later-described anti-dust filter receiving member 23 (later-described first member); an anti-dust filter receiving member (first member) which is arranged on the front surface side of the CCD case 24 and supports the anti-dust filter 21 (anti-dust member) while being appressed against its peripheral edge part or its adjacent part; an anti-dust filter 21 as an anti-dust member which is supported by the anti-dust filter receiving member 23 and arranged so as to be opposed to the optical LPF 25 with a predetermined gap therebetween on the photoelectric conversion surface side of the imaging element 27 and the front surface side of the optical LPF 25; a piezoelectric element 22 which is exciting means and also an excitation member which is arranged at a peripheral edge portion of the anti-dust filter 21 and used to give a predetermined vibration to the anti-dust filter 21, and which consists of, e.g., an electromechanical transducer element; an anti-dust filter drive portion 48 (not shown in FIGS. 3 to 5. See FIG. 2) as a drive circuit which drives the piezoelectric element 22; and a pushing member 20 consisting of an elastic body which air-tightly joins the anti-dust filter 21 to the anti-dust filter receiving member 23 and firmly supports it, and others.

The imaging element 27 as imaging means obtains an image signal corresponding to an object image formed on its photoelectric conversion surface by performing photoelectric conversion processing upon receiving the object light flux transmitted through the imaging optical system 12a on its photoelectric conversion surface and, e.g., a charge coupled device (CCD) is applied.

The imaging element 27 is mounted at a predetermined position on the main circuit board 16 through the imaging element fixing plate 28. On the main circuit board 16 (not shown) are mounted an image signal processing circuit, a work memory and others, and an output signal from the imaging element 27, i.e., an image signal obtained by the photoelectric conversion processing is processed.

The optical LPF 25 holding the low pass filter receiving member 26 is arranged on the front surface side of the imaging element 27. Furthermore, the CCD case 24 is arranged so as to cover the optical LPF 25.

That is, an opening 24c consisting of a rectangular shape is formed to the CCD case 24 at a substantially central part, and the optical LPF 25 and the imaging element 27 are arranged in the opening 24c from the rear side. A step portion 24a having a substantially L-shaped cross section such as shown in FIGS. 4 and 5 is formed at an inner peripheral edge portion of the opening 24c on the rear side.

As described above, the low pass filter receiving member 26 consisting of an elastic member or the like is arranged between the optical LPF 25 and the imaging element 27. This low pass filter receiving member 26 is arranged at a position away from an effective range of the photoelectric conversion surface at the peripheral edge portion on the front surface side of the imaging element 27, and comes into contact with the vicinity of the peripheral edge portion on the rear surface side of the optical LPF 25. Moreover, it is configured so as to hold the substantial air-tightness between the optical LPF 25 and the imaging element 27. As a result, the elasticity obtained by the low pass filter member in the optical axis direction acts on the optical LPF 25.

Thus, arranging the peripheral edge portion of the optical LPF 25 on the front surface side so as to be in substantially air-tightly contact with the step portion 24a of the CCD case 24 restricts a position of the optical LPF 25 in the optical axis direction against the elasticity of the low pass filter receiving member 26 which tends to displace the optical LPF 25 in its optical axis direction. In other words, the optical LPF 25 inserted into the opening 24c of the CCD case 24 from the rear surface side is restricted in its position in the optical axis direction by the step portion 24a. As a result, the optical LPF 25 does not slide out of the inside of the CCD case 24 to the outside toward the front surface side.

After the optical LPF 25 is inserted into the opening 24c of the CCD case 24 from the rear surface side in this manner, the imaging element 27 is arranged on the rear surface side of the optical LPF 25. In this case, the low pass filter receiving member 26 is held between the optical LPF 25 and the imaging element 27 at the peripheral edge portion.

Additionally, the imaging element 27 is mounted on the main circuit board 16 with the imaging element fixing plate 28 sandwiched therebetween as described above. Further, the imaging element fixing plate 28 is fixed to screw holes 24e from the rear surface side of the CCD case 24 through spacers 28a by screws 28b. Furthermore, the main circuit board 16 is fixed to the imaging element fixing plate 28 through spacers 16c by screws 16d.

On the front surface side of the CCD case 24, the anti-dust filter receiving member 23 is fixed to screw holes 24b of the CCD case 24 by screws 23b. In this case, as shown in FIGS. 4 and 5 in detail, a circumferential groove 24d is formed in the substantially annular form at a predetermined position on the peripheral edge side which is also the front surface side of the CCD case 24. On the other hand, an annular convex portion 23d (not shown in FIG. 3) corresponding to the circumferential groove 24d of the CCD case 24 is formed in the substantially annular shape along the circumference at a predetermined position on the peripheral edge side which is also the rear surface side of the anti-dust filter receiving member 23. Therefore, when the annular convex portion 23d and the circumferential groove 24d are fitted to each other, the CCD case 24 and the anti-dust filter receiving member 23 are substantially air-tightly fitted to each other in an annular area, i.e., an area where the circumferential groove 24d and the annular convex portion 23d are formed.

The anti-dust filter 21 forms a circular or polygonal tabular shape as a whole, at least an area having a predetermined spread in the radial direction from its own center forms a transparent portion, and this transparent portion is arranged so as to be opposed to the front surface side of the optical LPF 25 with a predetermined gap therebetween.

Furthermore, at the peripheral edge portion on one surface (rear surface side in this embodiment) of the anti-dust filter 21, the piezoelectric element 22 which is a predetermined excitation member used to give a vibration to the anti-dust filter 21 and formed by an electromechanical transducer element and the like is arranged so as to be integral by means such as attachment using, e.g., an adhesive. This piezoelectric element 22 is configure so as to be capable of generating a predetermined vibration, i.e., a standing wave vibration to the anti-dust filter 21 by applying a drive voltage having a predetermined cycle by using a non-illustrated anti-dust filter drive portion. Moreover, the anti-dust filter 21 is fixed and held by a pushing member 20 consisting of an elastic body such as a leaf spring so as to be air-tightly joined to the anti-dust filter receiving member 23.

An opening 23f consisting of a circular shape or a polygonal shape is provided in the vicinity of a substantially central portion of the anti-dust filter receiving member 23. This opening 23f transmits therethrough the object light flux which has passed through the imaging optical system 12 and it is set to a dimension which allows the photoelectric conversion surface of the imaging element 27 arranged at the rear side to be irradiated with the light flux.

A wall portion 23e (see FIGS. 4 and 5) which protrudes to the front surface side is formed into the substantially annular shape at the peripheral edge portion of the opening 23f, and a receiving portion 23c is formed on the end side of the wall portion 23e so as to further protrude to the front surface side.

On the other hand, a plurality of (three in this embodiment) convex portions 23a are formed at predetermined positions in the vicinity of the outer peripheral edge portion of the anti-dust filter receiving member 23 on the front surface side so as to protrude toward the front surface side. The convex portion 23a is formed to fix the pushing member 20 which fixes and holds the anti-filter 21, and the pushing member 20 is fixedly provided at the end portion of the convex portion 23a by a screw 20a or the like.

The pushing member 20 is a member formed by an elastic body such as a leaf spring or the like and has a base end portion fixed to the convex portion 23a and a free end portion coming into contact with the outer peripheral edge portion of the anti-dust filter 21. As a result, the pushing member 20 pushes the anti-dust filter 21 toward the anti-dust filter receiving member 23 side, i.e., the optical axis side.

In this case, when a predetermined part of the piezoelectric element 22 arranged at the outer peripheral edge portion of the anti-dust filter 21 on the rear surface side comes into contact with the receiving portion 23c, positions of the anti-dust filter 21 and the piezoelectric element 22 in the optical axis direction are restricted. Therefore, the anti-dust filter 21 is consequently fixed and held so as to be air-tightly joined to the anti-dust filter receiving member 23 through the piezoelectric element 22.

In other words, the anti-dust filter receiving member 23 is configured so as to be air-tightly joined to the anti-dust filter 21 through the piezoelectric element 2 by an impetus of the pushing member 20.

Meanwhile, as described above, the anti-dust filter receiving member 23 and the CCD case 24 are set in such a manner that the circumferential groove 24d and the annular convex portion 23d (see FIGS. 4 and 5) are air-tightly fitted to each other. At the same time, the anti-dust filter receiving member 23 and the anti-dust filter 21 are set so as to be air-tightly joined to each other through the piezoelectric element 22 by an impetus of the pushing member 20. Moreover, the optical LPF 25 arranged in the CCD case 24 is substantially air-tightly arranged between the peripheral edge portion of the optical LPF 25 on the front surface side and the step portion 24a of the CCD case 24. Additionally, the imaging element 27 is arranged on the rear surface side of the optical LPF 25 through the low pass filter receiving member 26 so that the air-tightness can be held between the optical LPF 25 and the imaging element 27.

Therefore, a predetermined air gap portion 51a is formed in a space in which the optical LPF 25 and the anti-dust filter 21 are opposed to each other. Further, a space portion 51b is formed by the peripheral portion of the optical LPF 25, i.e., the CCD case 24, the anti-dust filter receiving member 23 and the anti-dust filter 21. This space portion 51b is a sealed space formed so as to protrude toward the outer side of the optical LPF 25 (see FIGS. 4 and 5). Furthermore, this space portion 51b is set so as to be a larger space than the air gap portion 51a. Moreover, a space constituted by the air gap portion 51a and the space portion 51b is a sealed space 51 which is air-tightly sealed by the CCE case 24, the anti-dust filter receiving member 23, the anti-dust filter 21 and the optical LPF 25 as described above.

As mentioned above, in the imaging unit 15 in the camera 1 according to the first embodiment, there is constituted a sealing structure portion which forms the substantially air-tightly sealed space 51 which is provided at the peripheries of the optical LPF 25 and the anti-dust filter 21 and includes the air gap portion 51a. Additionally, this sealing structure portion is provided at a position extending from the periphery of the optical LPF 25 or its vicinity to the outer side.

Furthermore, in the first embodiment, the sealing structure portion is constituted by the anti-dust filter receiving member 23 as a first member which supports the anti-dust filter 21 by being appressed against its peripheral edge part or its adjacent part and the CCD case 24 or the like as a second member which supports the optical LPF 25 by being appressed against its peripheral edge part or its adjacent position and is arranged so as to be tightly in contact with the anti-dust filter receiving member 23 at a predetermined part thereof.

In the camera 1 according to the first embodiment having the above-described structure, the anti-dust filter 21 is oppositely arranged at a predetermined position of the imaging element 27 on the front surface side, and the sealed space 51 formed at the peripheral edges of the photoelectric conversion surface of the imaging element 27 and the anti-dust filter 21 is constituted so as to be sealed, thereby preventing dust and the like from adhering to the photoelectric conversion surface of the imaging element 27.

Moreover, in this case, the dust or the like adhering to an exposure surface of the anti-dust filter 21 on the front surface side can be removed by applying a cyclic voltage to the piezoelectric element 22 arranged integrally with the peripheral edge portion of the anti-dust filter 21 and giving a predetermined vibration to the anti-dust filter 21.

The vibration as a dust removing operation of the anti-dust filter 21 will now be described.

Figure 6:
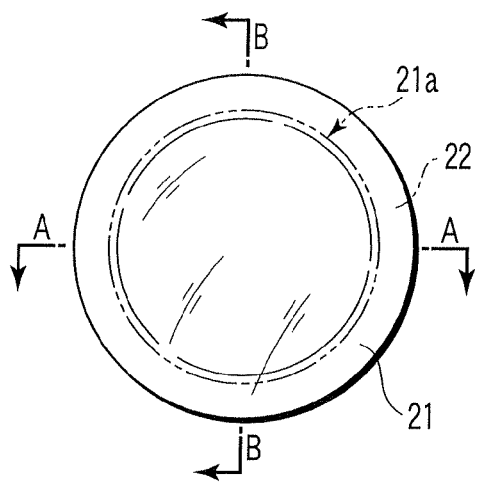
FIG. 6 is a front view showing only an anti-dust filter and a piezoelectric element integrally provided thereto in the imaging unit in the camera.

FIG. 6 is a front view showing only the anti-dust filter 21 and the piezoelectric element 22 integrally provided to the anti-dust filter 21 in the imaging unit 15 in the camera 1.

Figure 7:
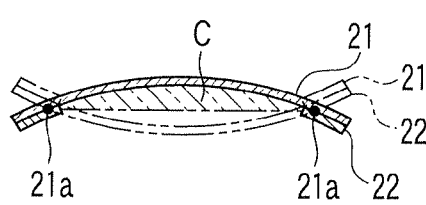
FIG. 7 is a cross-sectional view showing a change in state of the anti-dust filter and the piezoelectric element when a cyclic drive voltage is applied, taken along the line A-A of the piezoelectric element in FIG. 6.
Figure 8:
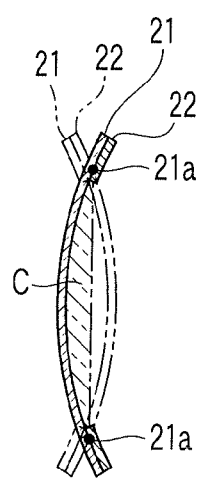
FIG. 8 is a cross-sectional view of the piezoelectric element taken along the line B-B in FIG. 6.

Additionally, FIGS. 7 and 8 show a change in state of the anti-dust filter 21 and the piezoelectric element 22 when a cyclic drive voltage is applied to the piezoelectric element 22 depicted in FIG. 6, in which FIG. 7 is a cross-sectional view taken along the line A-A in FIG. 6 and FIG. 8 is a cross-sectional view taken along the line B-B.

For example, when a negative (minus; −) voltage is applied to the piezoelectric element 22, the anti-dust filter 21 is deformed as shown by solid lines in FIGS. 7 and 8. On the other hand, when a positive (plus; +) voltage is applied to the piezoelectric element 22, the anti-dust filter 21 is deformed as shown by dotted lines in the same drawings.

In this case, at positions of nodes of the vibration such as indicated by reference numeral 21a in FIGS. 6 to 8, since the amplitude is substantially zero, the receiving portion 23c of the anti-dust filter receiving member 23 is set so as to be in contact with parts corresponding to the nodes 21a. As a result, the anti-dust filter 21 can be efficiently supported without inhibiting the vibration. Further, in this state, when a cyclic voltage is applied to the piezoelectric element 22, the anti-dust filter 21 vibrates, and the dust or the like which has adhered to the surface of the anti-dust filter 21 can be removed.

It is to be noted that a resonance frequency at this moment can be determined by a shape, a plate thickness, a material and others of the anti-dust filter 21. The example shown in FIGS. 6 to 8 indicates a case that the primary vibration is generated.

Figure 9:
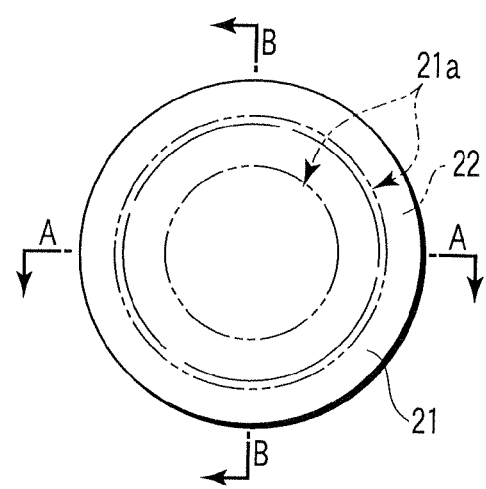
FIG. 9 is a front view showing a state when a secondary vibration is generated with respect to the anti-dust filter having the same structure as that depicted in FIG. 6, in which only the anti-dust filter and the piezoelectric element integrally provided thereto in the imaging unit in the camera are shown like FIG. 6.
Figure 10:
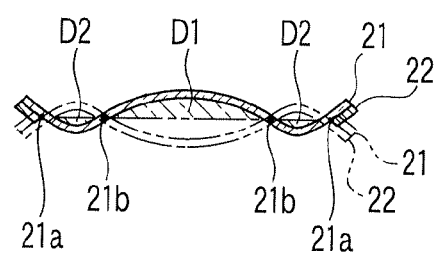
FIG. 10 is a cross-sectional view taken along the line A-A of the piezoelectric element in FIG. 9, showing a change in state of the anti-dust filter and the piezoelectric element when a cyclic voltage is applied in order to generate the secondary vibration.
Figure 11:
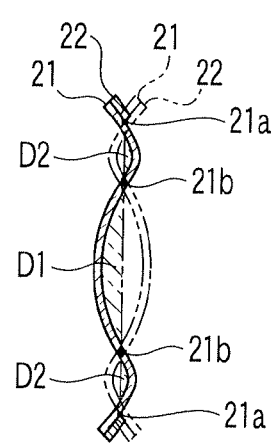
FIG. 11 is a cross-sectional view taken along the line B-B in FIG. 9.

Furthermore, another example shown in FIGS. 9 to 11 shows a state when the secondary vibration is generated to the anti-dust filter having completely the same structure as that in the example shown in FIGS. 6 to 8. In this case, FIG. 9 is likewise a front view showing only the anti-dust filter 21 and the piezoelectric element 22 integrally provided thereto in the imaging unit 15 in the camera 1.

FIGS. 10 and 11 show a change in state of the anti-dust filter 21 and the piezoelectric element 22 when a cyclic voltage is applied to the piezoelectric element 22 depicted in FIG. 9 in order to generate the secondary vibration, in which FIG. 10 is a cross-sectional view taken along the line A-A and FIG. 11 is a cross-sectional view taken along the line B-B in FIG. 9.

For example, when a negative (minus; −) voltage is applied to the piezoelectric element 22, the anti-dust filter 21 is deformed as indicated by solid lines in FIGS. 10 and 11. On the other hand, when a positive (plus; +) voltage is applied to the piezoelectric element 22, the anti-dust filter 21 is deformed as indicated by dotted lines in the same drawings.

In this case, although two pairs of nodes exist in this vibration as denoted by indicated by reference numerals 21a and 21b shown in FIGS. 9 to 11, the anti-dust filter 21 can be efficiently supported without inhibiting the vibration by setting the receiving portion 23c of the anti-dust filter receiving member 23 so as to come into contact with parts corresponding to the nodes 21a like the example shown in FIGS. 6 to 8.

Therefore, in such an anti-dust mechanism, the anti-dust filter 21 vibrates by applying a cyclic voltage to the piezoelectric element 22 with a predetermined timing, and the dust or the like which has adhered to the surface of the anti-dust filter 21 can be removed.

A system structure of the camera according to the first embodiment will now be described in detail. As shown in the block diagram of FIG. 2, the system of this camera is mainly constituted by: a body unit 100 as a camera main body; a lens unit (i.e., a lens body tube) 12 as an accessory device (which will be referred to as an "accessory" hereinafter), e.g., an interchangeable lens; a recording medium 39 used to record picked-up image data; an external power supply 70; and an external strobe unit 80; and others.

The lens unit 12 that a user is willing to use is detachably set through a lens mount (not shown) provided on a front surface of the body unit 100.

The recording medium 39 is an external recording medium such as various kinds of memory cards, an external HDD and others, and it is attached to the camera main body through a communication connector 35 so as to be capable of communicating or replaceable.

The external power supply 70 includes an AC/DC converter function, and it can supply a necessary power from, e.g., a domestic power supply outlet to a jack 37 on the camera main body side through an attached connector 71 and a plug 72 by putting in the plug 72.

Moreover, the strobe unit 80 consists of a flash lamp 81, a DC/DC converter 82, a strobe control microcomputer 83 and a battery 84, and it can be attached to the camera main body through a strobe communication connector 85 so as to be capable of communicating.

The lens unit 12 is controlled by a lens control microcomputer (which will be referred to as a "Lucom" hereinafter) 5. The body unit 100 is controlled by a body control microcomputer (which will be referred to as a "Bucom" hereinafter) 50. It is to be noted that the Lucom 5 and the Bucom 50 are electrically connected to each other so as to be capable of communicating through a communication connector 6 when incorporated. Furthermore, the Lucom 5 operates as a camera system in cooperation with the Bucom 5 secondarily.

An imaging lens 12a and a diaphragm 3 are provided in the lens unit 12. The imaging lens 12a is driven by a non-illustrated DC motor existing in a lens drive mechanism 2. The diaphragm 3 is driven by a non-illustrated stepping motor existing in a diaphragm drive mechanism 4. The Lucom 5 controls each motor in accordance with a command from the Bucom 50.

The following constituent members are arranged in the body unit 100 as shown in the drawing. For example, there are provided single lens reflex type constituent members (a pentaprism 13a, a quick return mirror 13b, an eyepiece 13c, a sub-mirror 13d), a focus plane type shutter portion 14 on the optical axis, and an AF sensor unit 30a used to perform automatic ranging upon receiving a reflected light flux from the sub-mirror 13d.

Moreover, there are provided an AF sensor drive circuit which controls to drive the AF sensor unit 30a, a mirror drive mechanism 18 which controls to drive the quick return mirror 13b, a shutter charge mechanism 19 which charges a spring which drives a front curtain and a back curtain of the shutter portion 14, a shutter control circuit 31 which controls movements of the front curtain and the back curtain, and a photometric circuit 32 which performs photometric processing based on a light flux from the pentaprism 13a.

An imaging element 27 which photo-electrically converts an object image which has passed through the optical system is provided as a photoelectric conversion element on the optical axis, it is protected by an anti-dust filter 21 as an optical element arranged between the imaging element 27 and the imaging lens 12a. Additionally, as a part of exciting means which vibrates the anti-dust filter 21 with a predetermined frequency, for example, a piezoelectric element 22 is attached at the peripheral edge portion of the anti-dust filter 21.

Further, the piezoelectric element 22 has two electrodes (which will be described later in detail), and the piezoelectric element 22 vibrates the anti-dust filter 21 by using an anti-dust filter drive circuit 48 as a part of the exciting means so that the dust which has adhered to the filter surface can be removed. Therefore, this camera system is an electronic camera having a basic structure belonging to a so-called "camera with an anti-dust function".

It is to be noted that a temperature measurement circuit 33 is provided in the vicinity of the anti-dust filter 21 in order to measure a temperature around the imaging element 27.

Furthermore, to the camera system are provided a CCD interface circuit 34 connected to the imaging element 27, a liquid crystal monitor 36, an SDRAM 38a provided as a storage area, a flash ROM 38b, and an image processing controller 40 which performs image processing by utilizing a recording medium 39 and the like, and the camera system is configured so as to be capable of providing an electronic imaging function as well as an electronic recording and displaying function.

In regard to another storage area, a non-volatile memory 29 consisting of, e.g., an EEPROM is provided so as to be capable of being accessed from the Bucom 50 as non-volatile storing means which stores predetermined control parameters required for camera control.

To the Bucom 50 are provided an operation display LCD 57 which informs a user of an operation state of the camera by a display output and a camera operation SW 52. The camera operation SW 52 is a switch group including operation buttons required to operate the camera, e.g., a release SW, a mode change SW, a power SW and others. Further, there are provided a battery 54 as a power supply and a power supply circuit 53a which converts a voltage of this power supply into a voltage required by each circuit unit constituting the camera system and supplies, and a voltage detection circuit 53b which detects a change in voltage when a current is supplied from an external power supply 70 through a jack 71 is also provided.

Each part in the camera system constituted as described above operates as follows. First, an image processing controller 40 fetches image data from the imaging element 27 by controlling a CCD interface circuit 34 in accordance with a command from the Bucom 50. This image data is converted into a video signal by the image processing controller 40, and outputted and displayed by a liquid crystal monitor 36. A user can confirm a picked-up video image from a display image in the liquid crystal monitor 36.

An SDRAM 38a is a memory which temporarily stores image data, and it is used as a work area when the image data is converted. Further, this image data is set to be stored in a recording medium 39 after being converted into JPEG data. The imaging element 27 is protected by a transparent anti-dust filter 21. The piezoelectric element 22 used to excite a filter surface of the anti-dust filter 21 is arranged at the peripheral edge portion of the anti-dust filter 21, and the piezoelectric element 22 is driven by an anti-dust filter drive circuit 48 which also functions as driving means as described above.

Although the CCD unit 34 and the piezoelectric element 22 are integrally accommodated in a case which has the anti-dust filter 21 as one surface and is surrounded by a frame body indicated by a broken line, it is preferable for dust prevention.

Usually, since a temperature affects an elastic coefficient of a material consisting of glass and it is one factor which changes a vibration frequency inherent thereto, a temperature must be measured during operation and a change in its inherent vibration frequency must be taken into consideration. It is preferable to prefigure an inherent vibration frequency at that time by measuring a change in temperature of the anti-dust filter 21 provided in order to protect the front surface of the imaging element 27 whose increase in temperature is considerable during movement.

Therefore, in this case, a sensor connected to the temperature measurement circuit 33 is provided in order to measure an ambient temperature of the imaging element 27. It is to e noted that it is preferable to set a temperature measurement point of the sensor is set in the close vicinity of a vibration surface of the anti-dust filter 21.

A mirror drive mechanism 18 is a mechanism which drives the quick return mirror 13b to an UP position and a DOWN position. When this quick return mirror 13b is at the DOWN position, a light flux from the imaging lens 12a is divided and led to an AF sensor unit 30a side and the pentaprism 13a side.

An output from the AF sensor in the AF sensor unit 30a is transmitted to the Bucom 50 through an AF sensor drive circuit 30b, and known ranging processing is carried out.

Furthermore, a user can visually confirm an object from the eyepiece 13c adjacent to the pentaprism 13a and, on the other hand, a part of the light flux which has passed through the pentaprism 13a is led to a photo sensor (not shown) in a ranging circuit 32, and known ranging processing is carried out based on a light quantity detected here.

Description will now be given as to driving and an operation of the anti-dust filter 21 of the camera with the anti-dust function in the first embodiment in connection with a circuit diagram of the anti-dust filter drive circuit 48 shown in FIG. 12 and a time chart depicted in FIG. 13.

Figure 12:
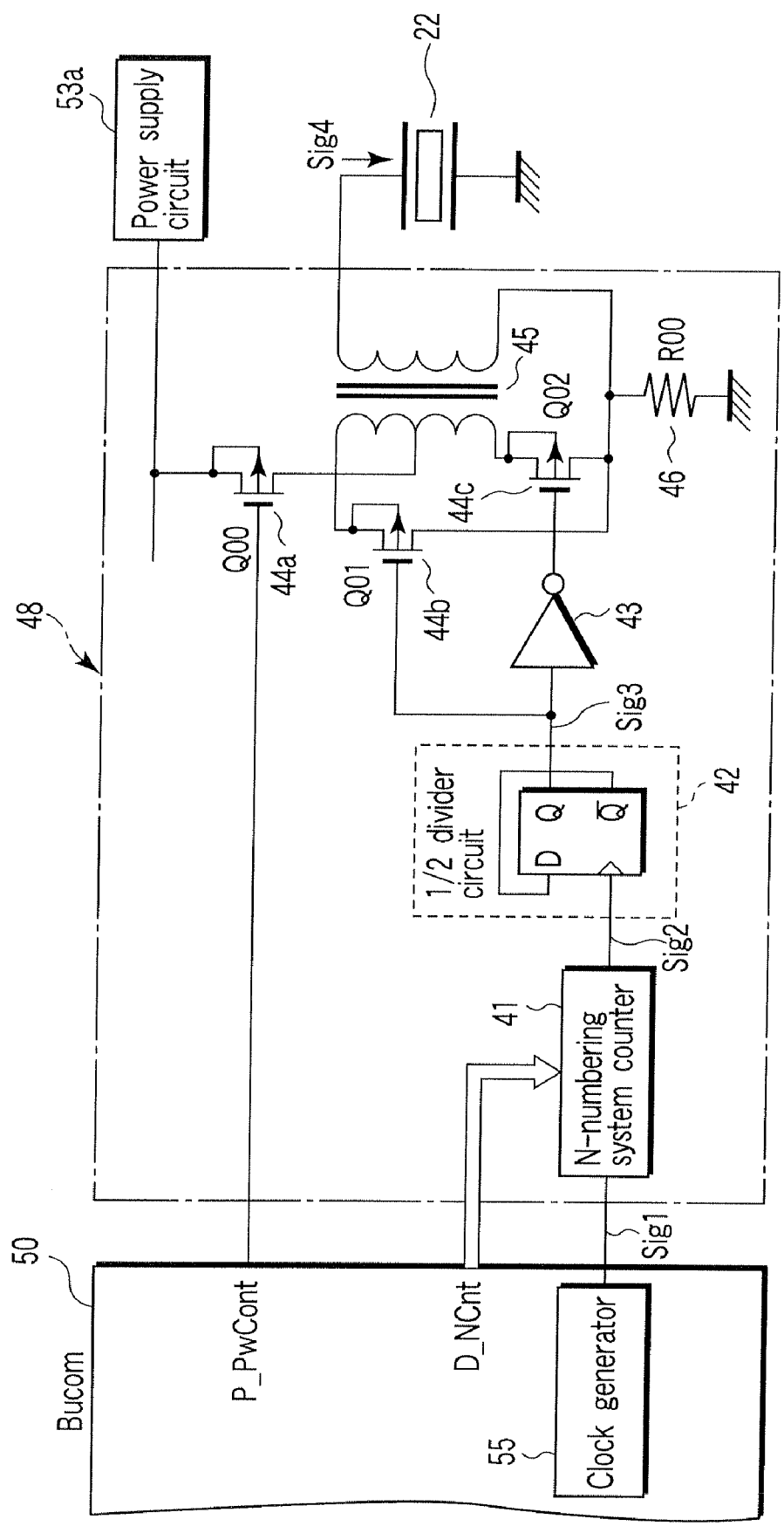
FIG. 12 is a circuit diagram showing a structure of an anti-dust filter drive circuit.
Figure 13:
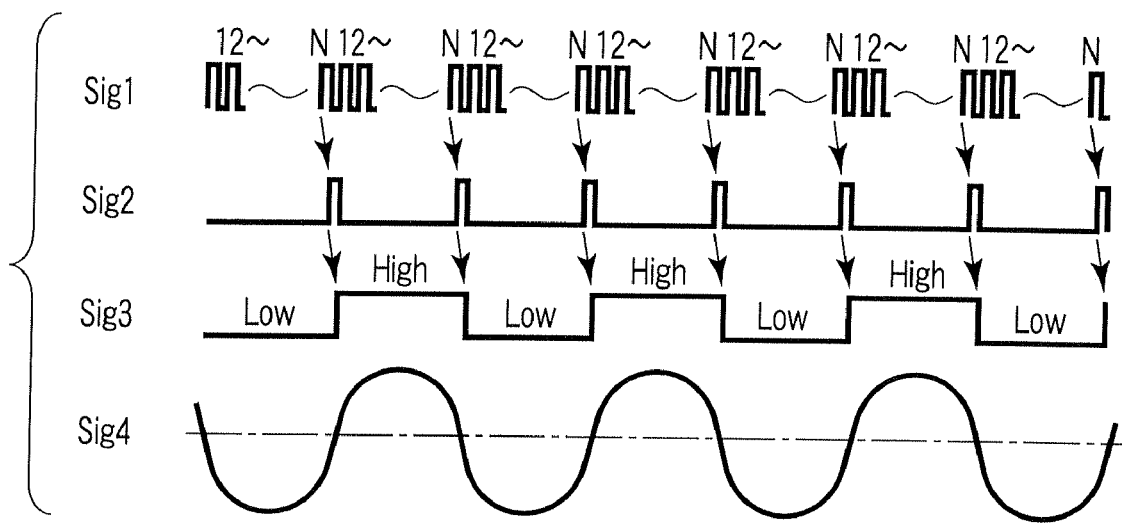
FIG. 13 is a time chart showing driving of the anti-dust filter and waveform signals concerning that operation.

The anti-dust filter drive circuit 48 illustrated here has a circuit configuration as shown in FIG. 12, signals (Sig1 to Sig4) having waveforms represented in the time chart in FIG. 13 are generated, and this circuit is controlled as follow based on these signals.

As shown in FIG. 12, the anti-dust filter drive circuit 48 is constituted by an N-numbering system counter 41, a ½ division circuit 42, an inverter 43, a plurality of MOS transistors (Q00, Q01, Q02) 44a, 44b and 44c, and a transformer 45 and a resistance (R00) 46.

A signal (Sig4) having a predetermined cycle is generated on a secondary side of the transformer 45 by the ON/OFF changeover operation of the transistor (Q01) 44b and the transistor (Q02) 44c connected to the primary side of the transformer 45. The piezoelectric element 22 is driven based on a signal with a predetermined cycle, and the anti-dust filter 21 is subjected to resonance.

The Bucom 50 controls the anti-dust filter drive circuit 48 through two ports, i.e., an IO port P_PwCont and an IO port D_NCnt provided as control ports and a clock generator 55 existing in the Bucom 50. The clock generator 55 outputs a pulse signal (basic clock signal) to the N-numbering system counter 41 with a frequency sufficiently faster than a signal frequency applied to the piezoelectric element 22. This output signal is a signal Sig1 having a waveform represented in the time chart in FIG. 13. Moreover, this basic clock signal is inputted to the N-numbering system counter 41.

The N-numbering system counter 41 counts the pulse signal and outputs a count end pulse signal every time it reaches a predetermined value "N". That is, the basic clock signal is divided to 1/N. This output signal is a signal Sig2 having a waveform represented by a time chart in FIG. 13.

This divided pulse signal does not have a duty ratio of High and Low being 1:1. Thus, the duty ratio is converted into 1:1 through the ½ division circuit 42. It is to be noted that the converted pulse signal corresponds to a signal Sig3 having a waveform represented by a time chart in FIG. 13.

In the High state of the converted pulse signal, the MOS transistor (Q01) 44b to which this signal is inputted is turned on. On the other hand, this pulse signal is applied to the transistor (Q02) 44c through the inverter 43. Therefore, in the Low state of the pulse signal, the transistor (Q02) 44c to which this signal is inputted is turned on. When the transistor (Q01) 44b and the transistor (Q02) 44c connected to a primary side of the transformer 45 are alternately turned on, a signal having a cycle like a signal Sig4 in FIG. 13 is generated on the secondary side.

A winding ratio of the transformer 45 is determined by an output voltage of the unit of the power supply circuit 53 and a voltage required to drive the piezoelectric element 22. It is to be noted that a resistance (R00) is provided in order to restrict an excessive current to flow through the transformer 45.

When driving the piezoelectric element 22, the transistor (Q00) 44*a* must be in the ON state, and a voltage must be applied from the unit of the power supply circuit 53 to a center tap of the transformer 45. The ON/OFF control of the transistor (Q00) in the drawing is carried out through the IO port P_PwCont. A set value "N" of the N-numbering system counter 41 can be set from the IO port D_NCnt. Therefore, the Bucom 50 can arbitrarily change a drive frequency of the piezoelectric element 22 by appropriately controlling the set value "N".

At this time, the frequency can be calculated by using the following expression.

N: a set value for the counter fpls: a frequency of an output pulse of the clock generator fdrv: a frequency of a signal applied to the piezoelectric element $$fdrv=fpls/2N \quad \text{(Expression)}$$

It is to be noted that the arithmetic operation based on this expression is carried out by a CPU (controlling means) of the Bucom 50.

An electrode B61 is an electrode of the piezoelectric element used to detect a vibration state of the glass plate. An alternating voltage (monitor signal) according to a vibration state of the glass plate is generated from this electrode B61. This is Sig5 in the time chart of FIG. 13.

A diode (D00) 62 connected to the electrode B61 is provided in order to subject the monitor signal to half-wave rectification. Moreover, an envelope line of the monitor signal is formed by resistances (R01, R02) following the diode (D00) 62 and a capacitor (C00) 65. An optimum value of a time constant determined by a detection circuit consisting of the resistances (R01, R02) 63 and 64 and the capacitor (C00) 65 varies depending on a vibration frequency of the glass. The glass plate in the first embodiment is driven in two resonance modes (first and second drive modes). When the drive frequency greatly varies depending on the two resonance modes, a circuit configuration must be adopted so that the time constant can be changed. The monitor signal is reduced to a level on which input to the A/D converter 60 is possible by the resistances (R01, R02) 63 and 64. This signal is Sig6 in the time chart of FIG. 3.

This signal is converted into digital data by the A/D converter 60 and read from the IO port D_DACin of the Bucom 50. It is good enough that the Bucom 50 changes a value to be set in the N-numbering system counter 41 so that the monitor signal changes to the maximum level. When the glass is driven by using a value (resonance frequency) of the N-numbering system counter 41 indicative of the maximum level, the dust can be efficiently removed.

The control executed by the Bucom 50 will now be concretely described in order.

Figure 14:
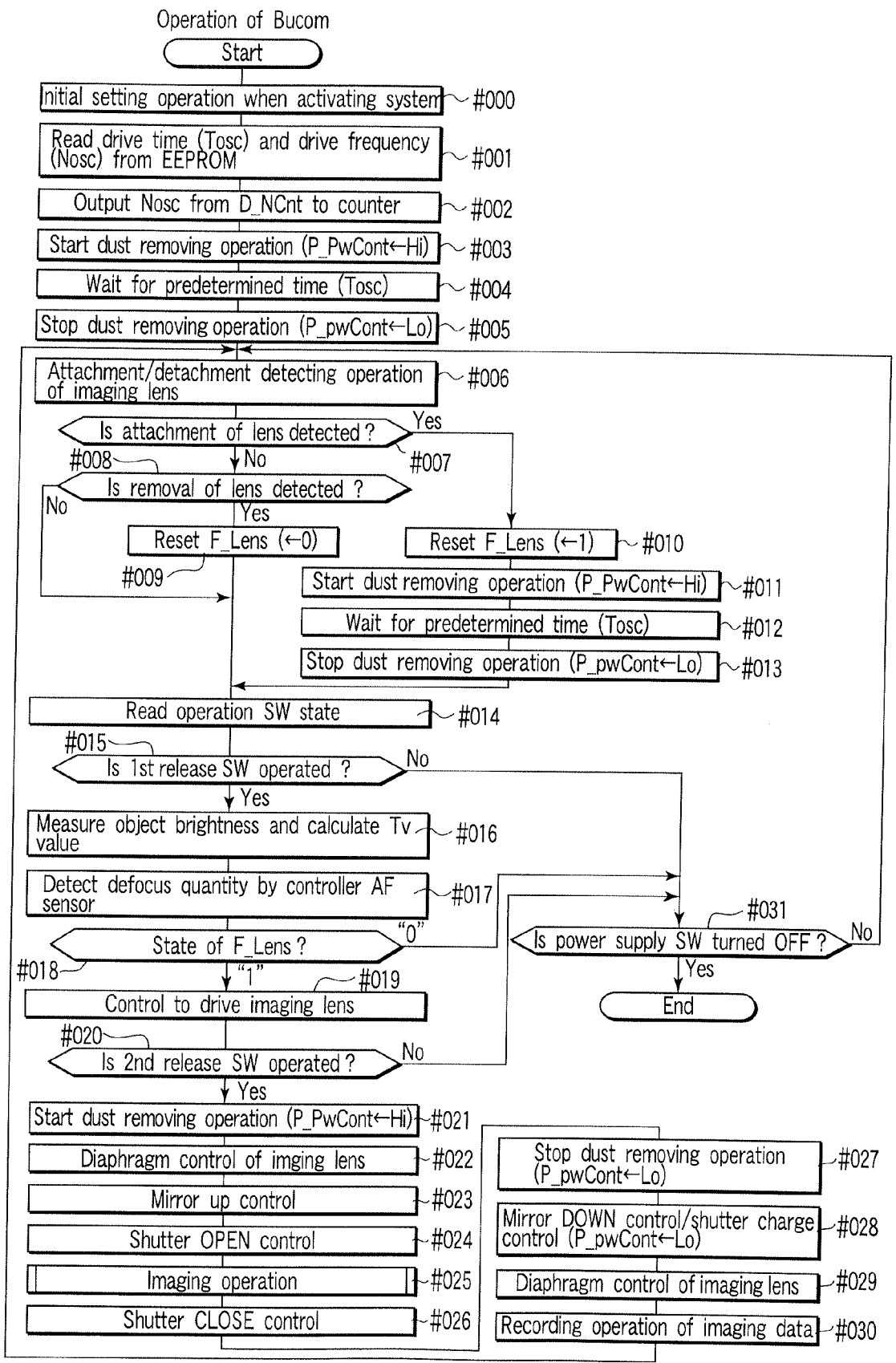
FIG. 14 is a flowchart showing a timing control of dust removal in a camera sequence executed by a control microcomputer of the camera.

FIG. 14 shows an operation control of the camera according to the first embodiment and a procedure of a camera sequence executed by the Bucom 50 in the form of a flowchart.

A control program which can be executed by the Bucom 50 starts its operation when a power supply SW (not shown) of the camera 1 is turned on. First, at #000, processing to activate the camera system is executed. The power is supplied to each circuit unit constituting the camera system by controlling the power supply circuit 53*a*. Further, initial setting of each circuit is carried out.

At #001, data concerning a drive time (Tosc) and a drive frequency (resonance frequency: Nosc) used to vibrate the anti-dust filter 21 characteristic of the present invention is read from information stored in a predetermined area in the EEPROM 29.

Subsequently, at #002, the drive frequency Nosc is outputted to the N-numbering system counter 41 of the anti-dust filter drive circuit 48 from an output port D_NCnt of the Bucom 50.

Then, at #003 to #005, a dust removing operation is carried out as follows. That is, the dust removing operation is first started and executed. Therefore, when a control flag P_pwCont is set to Hi (High value), the piezoelectric element 22 excites the anti-dust filter 21 with a predetermined drive frequency (Nosc), and shakes off the dust which has adhered to the filter surface (#003). As a result, in a period that the camera 1 is yet to used for imaging, a user can unintentionally remove the attached dust.

A standby mode is effected in the state that the anti-dust filter 21 is vibrated for a predetermined drive time (Tosc) (#004). After elapse of the predetermined drive time (Tosc), the control flag P_pwCont is set to Lo (Low value), thereby stopping the dust removing operation (#005).

The following #006 to #030 are a step group which is cyclically executed. #006 is an attachment/detachment detection operation step to detect a state of the lens unit 12 by performing the communication operation with the Lucom 5.

Then, at #007, when it is detected that the lens unit 12 is attached to the body unit 50, the processing advances to #010. On the other hand, when it is detected that the lens unit 12 is removed from the body unit 50 at #008, the processing advances to #009, and a control flag F_Lens is set to "0". It is to be noted that this control flag indicates "1" in a period that the lens unit 12 is attached to the body unit 100 of the camera and indicates "0" when the lens unit 12 is removed.

Here, since the lens unit 12 is attached, the dust removing operation is carried out like the above at #011 to #013. That is, when the control flag P_pwCont is set to Hi (High value), the dust removing operation is started and executed. The piezoelectric element 22 shake off the dust which has adhered to the filter surface by exciting the anti-dust filter 21 at a predetermined frequency (Nosc).

The standby mode is effected with the anti-dust filter 21 being vibrated for a predetermined drive time (Tosc) (#012). After elapse of the predetermined drive time (Tsc), the control flag P_pwCont is set to Lo (Low value), thereby stopping the dust removing operation (#013). In this manner, a user can unintentionally remove the attached dust in a period that the camera is not used for imaging.

As described above, in a period that the lens unit 12 is not attached to the body unit 100 as the camera main body, usually, a possibility that the dust adheres to each lens or the anti-dust filter 21 or the like is high. Therefore, it is desirable to execute the operation to remove the dust with a timing that attachment of the lens unit 12 is detected. Further, since a possibility that outside air circulates in the camera when the lens is replaced and the dust adheres is high, it is meaningful to remove the dust when replacing the lens.

At #014, whether the 1st. release SW (not shown) which is one of the camera operation switches is operated is judged based on the ON/OFF state of the switch. That state is read. If the 1st. release SW is not subjected to the ON operation for a predetermined time or more, the processing advances to #031 and end processing (sleep or the like) is started.

If the 1st. release SW is subjected to ON operation, brightness information of the object is obtained from the ranging circuit 32 at #016. Then, an exposure time (Tv value of the imaging element 27 and a diaphragm set value (Av value) of the lens unit 12 are calculated from this information.

At #017, detection data of the AF sensor unit 30*a* is obtained through the AF sensor drive circuit 30*b*. A quantity of blur is calculated based on this data.

Here, at #018, the state of the control flag F_Lens is judged. If it is "0", this means that the lens unit 12 does not exist, the imaging operation at the next #019 and the following steps cannot be executed. Thus, in this case, the processing advances to #031, thereby performing the end processing.

At #019, the quantity of blur is transmitted to the Lucom 5, and driving of the imaging lens 12*a* based on this quantity of blur is instructed.

At #020, whether a 2nd. release SW (not shown) which is one of the camera operation switches is operated is judged. The processing advances to the next #021 and a predetermined imaging operation is carried out when the 2nd. release SW is ON. However, when it is OFF, the processing advances to #031 and the end processing is carried out.

At #021, as a characteristic of the present invention, the dust removing operation to remove the dust is executed with the same procedure as that described above before the imaging operation. That is, when the control flag P_pwCont is set to Hi (High value), the dust removing operation is executed and started. The piezoelectric element 22 excites the anti-dust filter 21 with a predetermined frequency (Nosc), and shakes off the dust which has adhered to the filter surface.

At #022 immediately after this operation, the Av value is first transmitted to the Lucom 5, driving of the diaphragm 3 is instructed, and the quick return mirror 13*b* is moved to the UP position at #023. At #024, traveling of the front curtain of the shutter portion 14 is started and the OPEN control is carried out. At #025, execution of the "imaging operation" is instructed to the image processing controller 40 (the detail is realized as the sub-routine). When exposure (imaging) to the imaging element 27 for a time indicated by the Tv value is terminated, traveling of the back curtain of the shutter portion 14 is started and the CLOSE control is executed at #026.

Here, at #027, setting the control flag P_pwCont to Lo (Low value) stops the dust removing operation.

It is to be noted that, in the sub-routine "imaging operation", an electronic imaging operation for a time corresponding to seconds (exposure seconds) set for exposure is usually controlled (detailed is omitted).

As described above, even in the imaging operation, a user can unintentionally, remove the attached dust. Thereafter, the quick return mirror 13*b* is driven to the Down position and a charge operation of the shutter portion 14 is carried out at #028.

Moreover, at #029, a command is transmitted to the Lucom 5 so as to return the diaphragm 3 to the fully open position. At #030, a command is transmitted to the image processing controller 40 so as to record the picked-up image data is recorded in the recording medium 39. When the recording operation of the image data is terminated, the processing again advances to #006 mentioned above, and the same series of processing is repeated.

At the last #031, the camera 1 enters, e.g., a sleep state as the end processing. Then, the operating state is paused.

As described above, the camera 1 (electronic imaging apparatus) according to the first embodiment of the present invention is an electronic camera having a structure that the anti-dust filter 21 is arranged in front of the imaging means (imaging element) so as to be capable of vibrating by the piezoelectric element (exciting means), and the diaphragm 3 as the diaphragm mechanism and the shutter portion 14 (shutter means) adjust the irradiation time of the object light flux onto the photoelectric element surface, it is controlled so as to remove the dust which has adhered to the anti-dust filter 21 by driving the piezoelectric element 22 even in execution of at least the imaging operation as described above based on the control of the Bucom 50 of the camera 1.

In detail, control of the timing to remove the dust is characteristic, and the Bucom 50 starts the dust removing operation at the early stage in the preparation operation of the preparing means which perform the operations (e.g., photometry, ranging, shutter driving, the retiring operation of the quick return mirror 13*b*, the closing operation of the diaphragm 3 to a set position, and others) before the imaging operation.

It is to be noted that the "preparing means" collectively means a part which executes various kinds of processing before the imaging operation.

As described above, according to the camera 1 of the first embodiment which is an example of the electronic imaging apparatus, there is adopted a timing control that the dust removing operation is carried out even in the imaging operation as well as starting of the power supply of the camera 1 or replacement of the lens. Additionally, even if a very short exposure second, e.g., $1/1000$ second is set, since the dust removing operation is started in the imaging preparation before the exposure (imaging) operation, the necessary dust removing time can be readily assured. As a result, as compared with the conventional dust removing mode, the dust which has adhered to the surface of the anti-dust member can be further assuredly and rapidly removed.

Further, the dust removing operation is carried out with a timing before preceding the imaging operation of the camera 1, i.e., a timing before starting the imaging operation as described above because a timing excluding a timing of the maximum power consumption in the imaging preparing operation avoids overlapping with respect to start of the shutter operation that the power consumption usually tends to reach the peak or start of driving the quick return mirror.

Incidentally, in case of removing the dust by vibrating the optical element (anti-dust filter 21) arranged on the front surface of the photoelectric conversion element in the imaging operation (imaging) of the photoelectric conversion element described above, the picked-up image is not affected as long as the exemplified frequency is applied. Therefore, it is confirmed that the adverse effect to the image itself due to vibration of the anti-dust filter 21 is not substantially generated from a result of an experiment conducted by the present applicant.

Furthermore, the contrivance to assuredly remove the dust, e.g., processing to measure a change in temperature of the anti-dust filter 21 or a change in resonance frequency of the filter surface involved by this change in temperature is not carried out in the first embodiment since a possibility that deviation of the imaging timing is generated due to long time is taken into consideration, and it is carried out in a mode which performs the dust removing operation by using a predetermined frequency (Nosc) which is considered to be effective on the front stage in the imaging operation.

Thus, for example, at the start of activating the power supply of the camera or replacing the lens that deviation in the imaging timing is not generated, or in a pixel defect detection operation of the CCD, it is desirable to further improve the dust removing effect by measuring these changes.

(First Modification)

Description will now be given as to a camera as a first modification of the first embodiment according to the present invention. However, the same matters as those in the first embodiment are eliminated, and only the characteristic matters will be mainly described hereinafter.

When the imaging operation is set to the "long seconds" such as two to three seconds, as to the time to drive the piezoelectric element 22, the dust removing operation of the camera 1 according to the first modification is controlled to be effected for a predetermined time (e.g., 200 ms) set for the dust removal in advance, and then it is not carried out but terminated.

That is, in the sub-routine "imaging operation", the seconds (exposure seconds) set for exposure is compared with the limited predetermined time (200 ms), and the dust removing time is appropriately controlled by judging the predetermined time by in favor. Therefore, even if the exposure seconds longer than this predetermined time are set, the control is executed so that the dust removing operation is stopped during this time.

Figure 15:
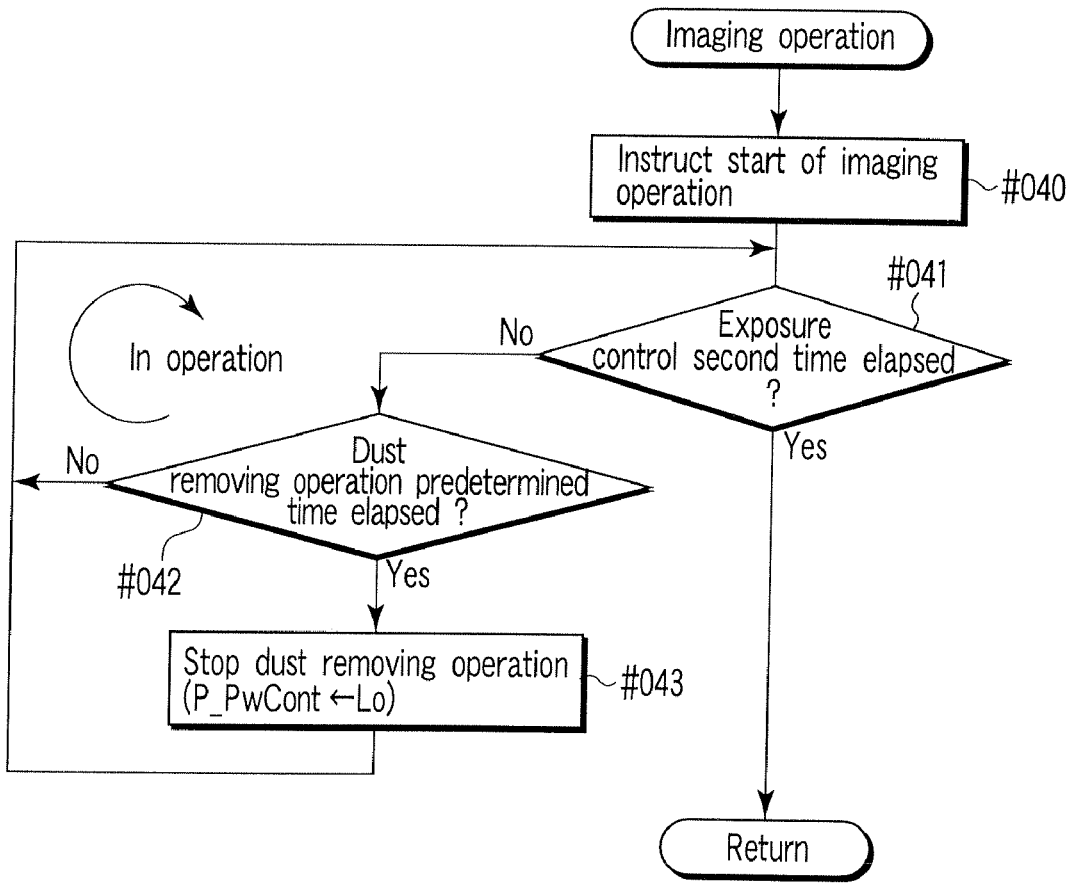
FIG. 15 is a flowchart showing an "imaging operation" routine as an operation control of a camera according to a modification of the first embodiment of the present invention.

FIG. 15 shows an "imaging operation" routine as a first modification with respect to the characteristic operation control in the form of a flowchart. However, this routine is the sub-routine "imaging operation" of the main routine of the camera sequence shown in FIG. 14. Further, it is determined that the dust removing operation has been already started before executing this sub-routine and it is in progress. That is, the Bucom 50 sends a command to the anti-dust filter drive circuit 48 and drives the piezoelectric element 22 to perform the dust removing operation, and the control flag P_pwCont is set to Hi (High value) (see FIG. 14).

At #040 in FIG. 15, the Bucom 50 as the controlling means instructs start of the imaging operation of the set exposure seconds (including long second time) to the shutter control circuit 31, the CCD interface circuit 34 or the like.

At #041, the Bucom 50 judges elapse of the exposure second time concerning the imaging operation. Here, if the exposure second time elapses fast, the processing returns to the main routine.

On the other hand, when the exposure second time is yet to elapse since it is the long second time, since the dust removing operation is in progress at this point in time, the Bucom 50 judges whether the predetermined time (200 ms) has elapsed since the dust removing operation was effected. If it is yet to elapse, the processing returns to #041, and the dust removing operation is continued. If the predetermined time has elapsed, the Bucom 50 transmits a command to the anti-dust filter drive circuit 48 in order to stop the dust removing operation even if the exposure second time (long second time) is yet to be reached. That is, the dust removing operation is stopped by setting the control flag P_pwCont to Lo (Low value). Then, the processing returns to #041.

In the electronic imaging apparatus (camera 1) as the first modification according to the present invention, the Bucom 50 as the controlling means controls in such a manner that the dust removing operation is terminated before the closing operation of the shutter portion 14 is executed when the shutter second time (exposure time) set to the shutter control circuit 31 as the shutter means is longer (long second time) than the predetermined time.

Then, the Bucom 50 controls so as to stop the dust removing operation when the dust removing operation is continuously carried out for a predetermined time before the closing operation of the shutter control circuit 31 is effected.

Specifically, at the time of imaging, when a user sets the "long second time" of exposure, e.g., two to three seconds for imaging, the piezoelectric element 22 of the camera 1 continuously performs vibration for dust removal for a time which is a relatively short predetermined time, e.g., 20 ms set in advance but sufficient for dust removal, and the vibration is then stopped.

As described above, according to this first modification, by adopting the timing control that the dust removing operation is carried out for only a predetermined time set in advance, even if the long second time mode concerning the shutter open state is set, the dust removing operation is not performed for a long time more than necessary, and the electrical energy is not wasted due to the dust removing operation. Furthermore, it is possible to apply the timing control which does not increase the peak of the power consumed for mirror up or the shutter opening operation in the imaging operation.

(Second Modification)

The above-described first modification may be modified as follows. For example, this is particularly effective in a camera having a so-called "open mode" or "valve imaging mode" which can be called extension of the long second time.

That is, when the valve imaging mode is set, when a predetermined time (drive time Tosc) elapses before the 2nd. release SW is subjected to the OFF operation, the dust removing operation is stopped.

In more detail, the sub-routine "imaging operation" is the same as that in the first embodiment, and it is good enough that the dust removing operation is controlled by only monitoring elapse of a predetermined time (e.g., 200 ms) based on the fact that the valve imaging mode is set without performing comparison and judgment between the exposure second time and the predetermined time like the first modification.

It is to be noted that the exemplified drive time Tosc for the dust removal does not affect the imaging timing and it is set to a time value (e.g., 200 to 250 ms) which is most effective for the dust removal. However, this value varies depending on the specification of the anti-dust filter 21 and the environmental condition during use.

According to this modification, in case of the valve imaging mode, since the dust removing operation only for the required minimum time can suffice, which contributes to saving of the electrical energy required for the dust removing operation.

(Another Modification)

Although the first and its modifications have been described above, the present invention is not restricted to these examples, and it can be likewise applied to an electronic imaging apparatus other than the electronic camera exemplified herein.

Besides, various kinds of modifications can be carried out without departing from the scope of the present invention.

Second Embodiment

A second embodiment according to the present invention will now be described. Description will now be given as to the driving and operation of the anti-dust filter 130 of the camera with the anti-dust function in the second embodiment based on a circuit diagram of the anti-dust filter drive circuit 140 illustrated in FIG. 16 and a time chart of FIG. 17. In this case, reference is made to the drawings used in the first embodiment.

Figure 17:
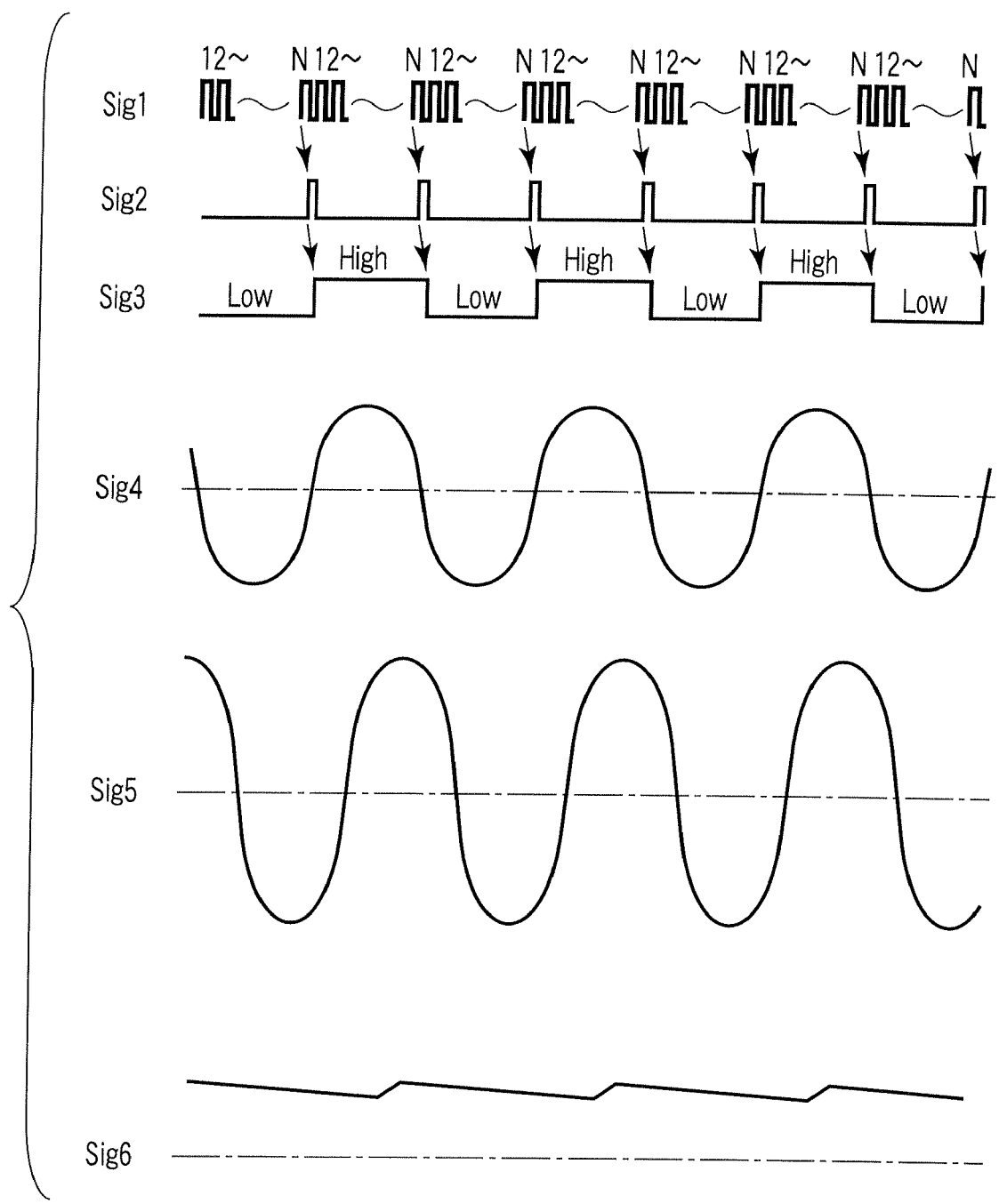
FIG. 17 is a time chart showing signal waveforms in respective portions in FIG. 16 in order to explain the operation of the anti-dust glass drive circuit.

The anti-dust filter drive circuit 48 exemplified herein has a circuit configuration such as shown in FIG. 16. In each part of this circuit, waveform signals (Sig1 to Sig6) represented in the time chart of FIG. 17 are generated, and the following control is carried out based on these signals. That is, as shown in FIG. 16, the anti-dust filter drive circuit 48 is constituted by an N-numbering system counter 41, a ½ division circuit 42, an inverter 43, a plurality of MOS transistors (Q00, Q01, A02) 44a, 44b and 44c, a transformer 45, a resistance (R00) 46, an A/D converter 60, a first electrode A of the piezoelectric element 22 and a second electrode B61 aligned in parallel therewith, a diode (D00) 62, resistances (R01, R02) 63 and 64, and a capacitor (C00) 65.

A signal (Sig4) having a predetermined cycle is generated on the secondary side of the transformer 45 by the ON/OFF switching operation of the transistor (A01) 44b and the transistor (Q02) 44c connected to the primary side of the transformer 45, and the effective resonance frequency is searched and the anti-dust filter 21 is effectively subjected to resonance while diversely driving the piezoelectric element 22 having the two electrodes A and B based on this signal with a predetermined cycle (the detail will be described later).

The Bucom 50 controls the anti-dust filter drive circuit 48 as follow through two ports, i.e., an IO port P_PwCont and an IO port D_NCnt provided as control ports and a clock generator 55 existing in the Bucom 50. The clock generator 55 outputs a pulse signal (basic clock signal) to the N-numbering system counter 41 with a frequency sufficiently faster than a signal frequency applied to the piezoelectric element 22. This output signal is a signal Sig1 having a waveform represented in the time chart of FIG. 17. Moreover, this basic clock signal is inputted to the N-numbering system counter 41.

The N-numbering system counter 41 counts the pulse signal and outputs a count end pulse signal every time it reaches a predetermined value "N". That is, the basic clock signal is divided to 1/N. This output signal is a signal Sig2 having a waveform represented in a time chart of FIG. 17.

This divided pulse signal does not have a duty ratio of High and Low being 1:1. Thus, the duty ratio is converted into 1:1 through the ½ division circuit 42.

It is to be noted that this converted pulse signal corresponds to a signal Sig3 having a waveform represented in a time chart in FIG. 17. In the High state of the converted pulse signal, the MOS transistor (Q01) 44b to which this signal is inputted is turned on. On the other hand, to the transistor (Q02) 44c is applied this pulse signal through the inverter 43. Therefore, in the Low state of the pulse signal, the transistor (Q02) 44c to which this signal is inputted is turned on. When the transistor (Q01) 44b and the transistor (Q02) 44c connected to the primary side of the transformer 45 are alternately turned on, a signal having a cycle like the signal Sig4 in FIG. 17 is generated on the secondary side.

A winding ratio of the transformer 45 is determined by an output voltage of the unit of the power supply circuit 53a and a voltage required to drive the piezoelectric element 22. It is to be noted that the resistance (R00) 46 is provided in order to restrict an excessive current to flow through the transformer 45.

When driving the piezoelectric element 22, the transistor (Q00) 44a must be in the ON state and the voltage must be applied to a center tap of the transformer 45 from the unit of the power supply circuit 53a. The ON/OFF control of the transistor (Q00) 44a in the drawing is carried out through the IO port P_PwCont. A set value "N" of the N-numbering system counter 41 can be set from the IO port D_NCnt.

Therefore, the Bucom 50 can arbitrarily change a drive frequency of the piezoelectric element 22 by appropriately controlling the set value "N".

At this moment, a frequency can be calculated by using the following expression.

N: a set value to the N-numbering system counter 41 fpls: a frequency of an output pulse of the clock generator 55 fdrv: a frequency of a signal applied to the piezoelectric element 22

$$fdrv=fpls/2N \quad \text{(Expression 1)}$$

It is to be noted that the arithmetic operation based on this expression is carried out by a CPU (controlling means) of the Bucom 50.

The electrode B61 is an electrode of the piezoelectric element 22 used to detect a vibration state of the glass plate. An alternating voltage (monitor signal) according to a drive state of the glass plate is generated from this electrode B61. This is Sig5 in the time chart of FIG. 17. The diode (D00) 62 connected to the electrode B61 is provided to subject its monitor signal to half-wave rectification. Additionally, an envelope line of the monitor signal is formed by the resistances (R01, R02) 63 and 64 and the capacitor (C00) 65 following the diode (D00) 62. An appropriate value of a time constant determined by a detection circuit consisting of the resistances (R01, R02) 63 and 64 and the capacitor (C00) 65 varies depending on an oscillation frequency of the glass. The glass plate in this embodiment is driven in two resonance modes (first and second drive modes). When the drive frequency greatly varies depending on the two resonance modes, a circuit configuration must be adopted so that the time constant can be changed. The monitor signal is decreased to a level which enables input to the A/D converter 60 by the resistances (R01, R02) 63 and 64. This signal is Sig6 in the time chart of FIG. 17.

This signal is converted into digital data by the A/D converter 60, and read from the IO port D_DACin of the Bucom 50. It is good enough that the Bucom 50 changes a value to be set in the N-numbering system counter 41 in such a manner that the monitor signal is changed to a maximum level. When driving the glass with a value (resonance frequency) of the N-numbering system counter 41 indicative of the maximum level, the dust can be efficiently removed.

Figure 18:
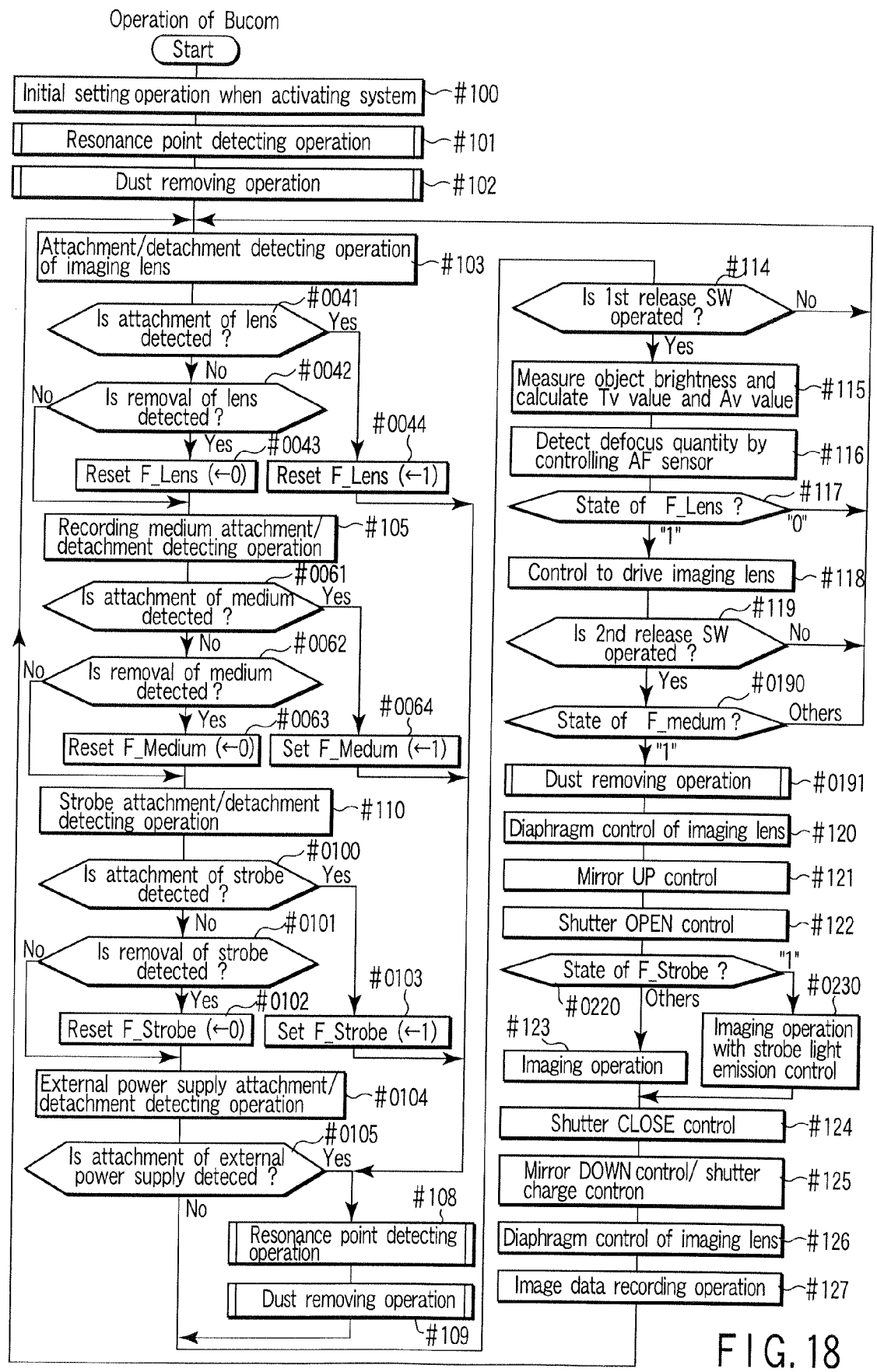
FIG. 18 is a flowchart showing a procedure of a camera sequence of a camera body control microcomputer.

The control carried out by the Bucom 50 will now be concretely described based on a main routine of a control program depicted in FIG. 18.

When a power supply (not shown) of the camera is turned on, the Bucom 50 starts operation. First, at #100, processing to activate the camera system is executed. The power is supplied to each circuit unit constituting this camera system by controlling the power supply circuit 53a. Further, initial setting of each circuit unit is effected.

At #101, a sub-routine "resonance point detection operation" is called and executed. In this sub-routine, a drive frequency (resonance frequency) suitable for efficiently vibrating the anti-dust filter 21 is detected (the detail will be described later). Frequency data used for this detection is stored in a memory area at a predetermined address in the Bucom 50.

Subsequently, at #102, the sub-routine "dust removing operation" is called and executed. In this sub-routine, the anti-dust filter 21 is vibrated with a resonance frequency detected at #101, and the dust which has adhered to the glass surface is shaken off. As a result, a user can unintentionally remove the attached dust in a period that this camera is not used for imaging.

At processing steps #103 to #0105 which are one of the characteristics of the present invention, presence/absence of attachment of various accessories and its state are sequentially checked.

First, #103 is a step which is cyclically executed, and it is an operation step used to detect a state of the lens unit 12 by performing the communication operation with the Lucom 5. Then, at #0041, when it is detected that the lens unit 12 is attached to the body unit 100, the processing advances to #0044. On the other hand, when it is detected that the lens unit 12 is removed from the body unit 100, the processing advances from #0042 to #0043, and a control flag F_Lens is rest. Then, the processing advances to #105.

At #0044, the control flag F_Lens is set. This control flag indicates "1" in a period that the lens unit 12 is attached to the body unit 100 of the camera, and indicates "0" in a period that the lens unit 12 is removed.

105 is a step which is cyclically executed, and it is a step which can detect the state that the recording medium 39 is attached in the body unit 100 by performing the state judgment of the communication connector 35.

At #0061, when it is detected that the recording medium 39 is attached in the body unit 100, the processing advances to #0064. On the other hand, when it is detected that the recording medium 39 is taken out of the body unit 100, the processing advances from #0062 to #0063, and the control flag F_Medum is reset. Then, the processing advances to #110.

At #0004, the control flag F_Medum is set. Then, the processing advances to "108. This control flag indicates "1" when the recording medium 39 is attached in the body unit 100 of the camera, and indicates "0" when it is removed from the same.

Likewise, the strobe unit 80 as an accessory or the external power supply 70 can be judged by the following processing procedure. That is, "110 is a step which is cyclically executed, and detects whether the strobe unit 80 is attached to the body unit 100 by judging the state of the strobe communication connector 85.

0100, when it is detected that the strobe unit 80 is attached to the body unit 100, the processing advances to "0103, and a control flag F_Strobe is set. Thereafter, the processing advance to #108. On the other hand, when it is detected that the strobe unit 80 is removed from the body unit 100, the processing advances from #0101 to #0102, and the control flag F_Strobe is reset. Then, the processing advances to #0104.

It is to be noted that this control flag likewise indicates "1" when the strobe unit 80 is attached, and indicates "0" when it is detached.

Subsequently, #0104 is also a step which is periodically executed, and it detects whether the plug 72 is inserted into the jack 37 of the body unit 100 by judging the state of the jack 37.

Although the processing advances to #108 when connection of the external power supply 70 is confirmed by insertion of the plug 72 into the jack 37 at #0105, the processing proceeds to #114 when there is no connection of the external power supply 70. In detail, when a current is supplied to a power supply circuit 53a and a voltage detection circuit 53b through the external power supply 70, a change is voltage is generation, which enables detection. Therefore, the connection state can be aware without setting a dedicated control flag here.

When any of the above-described accessories is attached, a sub-routine "resonance point detection operation" is called like the above at #108. At #109 immediately after this step, a sub-routine "dust removing operation" to remove the dust of the anti-dust filter 21 is likewise called and executed.

Usually, in a period that the lens unit 12 is not attached to the body unit 100 which is a camera main body, a possibility that the dust adheres to the lens, the anti-dust filter 21 or the like is high. Therefore, it is desirable to execute the operation to remove the dust with a timing that attachment of the lens unit 12 is detected. Further, when the lens is replaced or the accessory is attached, the outside air circulates in the camera, and a temperature in the camera may vary in some cases. Thus, a resonance frequency of the glass also varies due to this change in temperature. Thus, at #008 mentioned above, the "resonance point detection operation" is executed in order to determine a new drive frequency (resonance frequency). Subsequently, at #109 immediately after this step, the "dust removing operation" is executed with the determined frequency.

At #114, a judgment is made upon whether the 1st. release SW (not shown) which is one camera operation SW is operated. If the 1st. release SW is ON, the processing advances to #115. If it is OFF, the processing returns to #103.

At #115, brightness information of the object is obtained from the photometric circuit 32. An exposure time (Tv value) of the imaging element 27 and a diaphragm set value (Av value) of the imaging lens 1 are calculated from this information.

At #016, detection data of the AF sensor unit 30a is obtained through the AF sensor drive circuit 30b. A quantity of blur is calculated based on this data.

Here, at #117, a state of F_Lens is judged. If it is "0", it means that the lens unit 12 does not exist, and hence the imaging operation at #118 and subsequent steps is cannot be executed. Thus, in this case, the processing returns to #103.

At #118, a quantity of blur is transmitted to the Lucom 5, and driving of the imaging lens 1 based on this quantity of blue is instructed.

At #119, a judgment is made upon whether the 2nd. release button SW (not shown) which one of the camera operation SWs 52 is operated. When the 2nd. release SW is ON, the processing advances to #0190. However, when it is OFF, the processing returns to #103.

At #0190, presence/absence of the recording medium is judged based on a value of the control flag F_Medum. If it is other than "1", the processing returns to #103. On the other hand, when it is "1", the routine "dust removing operation" is executed in order to remove the dust before the imaging operation. However, in order to avoid occurrence of a time lag by this operation, the routine "resonance point detection operation" is not executed here.

In order to assuredly remove the dust, although it is desirable to perform both of these two routines, the routine "resonance point detection operation" may be eliminated if there is no possibility that the resonance frequency varies.

It is to be noted that elimination of execution of this routine is not restricted thereto in case of replacement of the lens, activation of the power supply of the camera system, cancellation of the sleep state and others. However, in a serial imaging mode, execution of this routine may be eliminated after the second imaging operation. As the imaging operation, the Av value is first transmitted to the Lucom 5 and driving of the diaphragm 3 is instructed at #120, and the quick return mirror 13b is moved to the UP position at #121. At #122, traveling of the front curtain of the shutter portion 14 is started and the shutter portion 14 is opened at #122. If the control flag F_Strobe is set to "1" at #0220, the strobe light emission is carried out at #0230. If the flag is set to any other value, the strobe light emission is not carried out, and execution of the imaging operation is instructed to the image processing controller 40 at #023.

When imaging by the imaging element 27 is terminated at the time indicated by the Tv value, traveling of the back curtain of the shutter portion 14 is started at #124, and the quick return mirror 13b is driven to the Down position at #125.

Furthermore, the charge operation of the shutter portion 14 is effected concurrently with the above operation. Then, a command is issued to the Lucom 5 so as to return the diaphragm to the fully open position at #126, and the image processing controller 40 is instructed to record the picked-up image data in the recording medium 39 at #127. Upon completion of recording of the image data, the processing returns to #103, and the same series of the processing steps is repeated.

The sub-routine "resonance point detection operation" will now be described in detail with reference to the flowchart shown in FIG. 19 and FIGS. 21A to 25B. Before description of this operation, a support structure and a vibration conformation of the anti-dust filter 21 as a resonance target will be roughly explained with reference to FIGS. 21A to 22B.

Figure 21A:
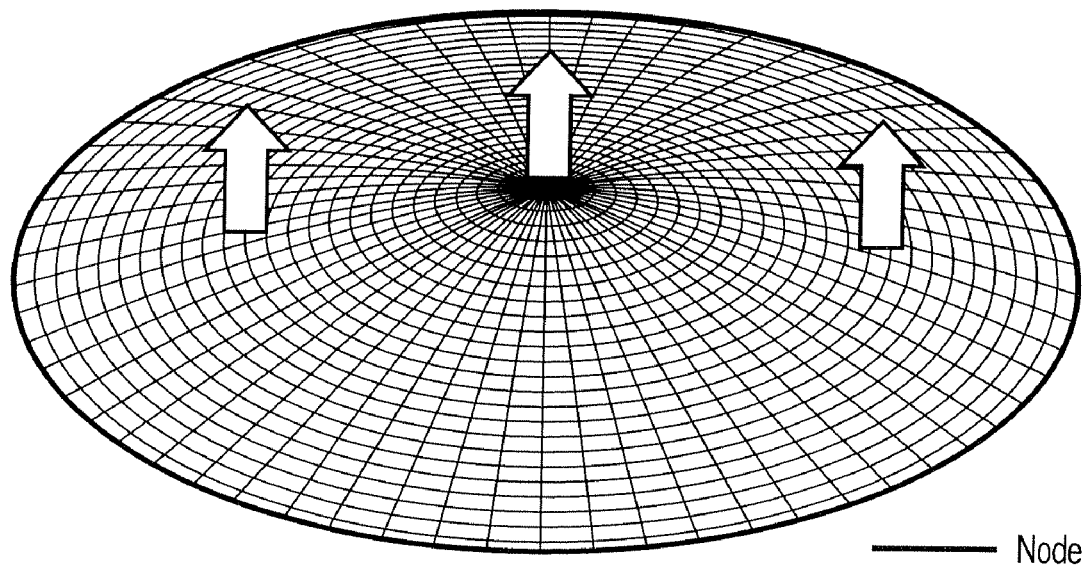
FIGS. 21A and 21B show a vibration conformation of an anti-dust glass according to the present embodiment, and are explanatory views of a conformation (vibration mode 1) that nodes are generated around a glass plate and the entire surface vibrates in the same phase.

In the electronic imaging apparatus according to the present invention, it is assumed that the anti-dust filter 21 has a discoid shape. Moreover, when the excitation piezoelectric element 22 is arranged along the circumference of the glass plate of the anti-dust filter 21, the glass plate is supported at the circumference. At this moment, this glass plate excites in a plurality of vibration modes (vibration conformations). In the present invention, two modes are selected from the vibration modes and used according to circumstances. FIGS. 21A and B and FIGS. 22A and 22B show states of vibration of the glass plate in the selected vibration modes.

Figure 21B:
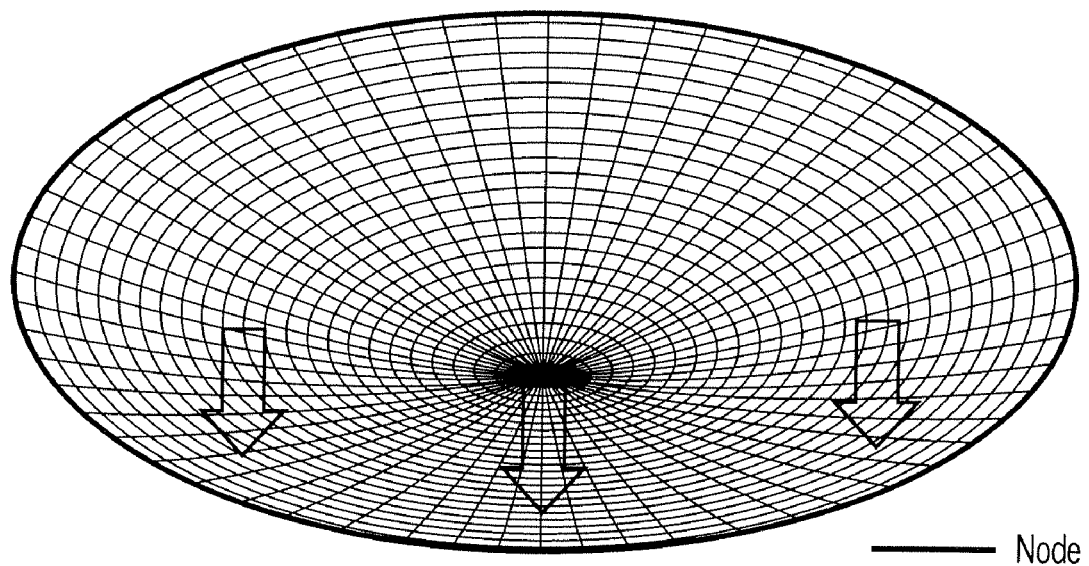

The anti-dust filter 21 according to this embodiment demonstrates the vibration modes illustrated in FIGS. 21A and 21B, respectively. That is, when the vibration is applied to the piezoelectric element 22 which functions as exciting means, although "nodes" which do not vibrate are generated around this glass plate, the entire glass plate generally alternately repeats the state shown in FIGS. 21A and 21B and vibrates as indicated by solid arrows. Such a vibration conformation will be referred to as a "vibration mode 1" hereinafter.

Figure 22A:
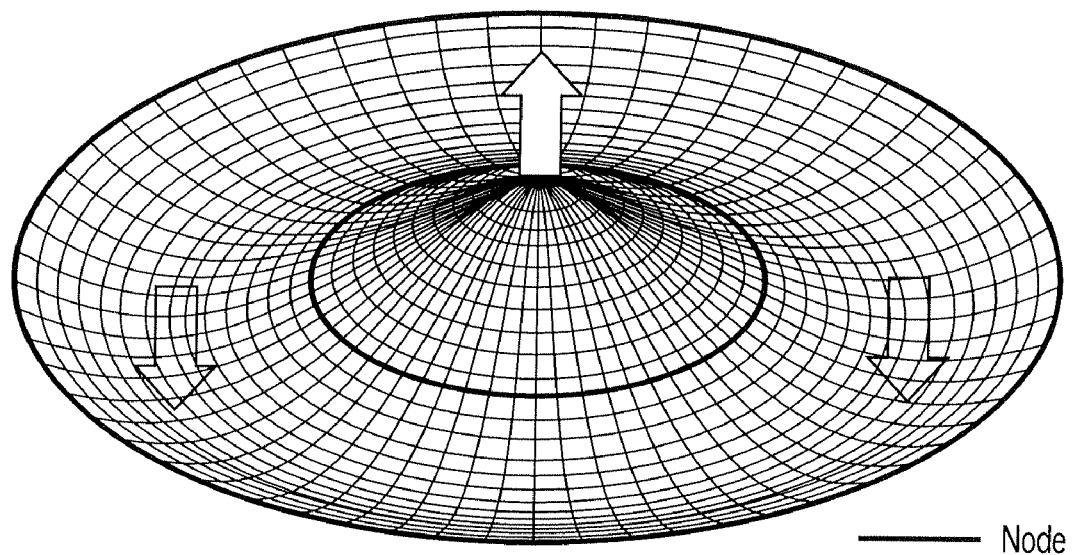
FIGS. 22A and 22B show a vibration conformation of the anti-dust glass according to this embodiment, and are explanatory views of a conformation (vibration mode 2) that the inside and the outside of the glass plate vibrate in phases different from each other by 180°.
Figure 22B:
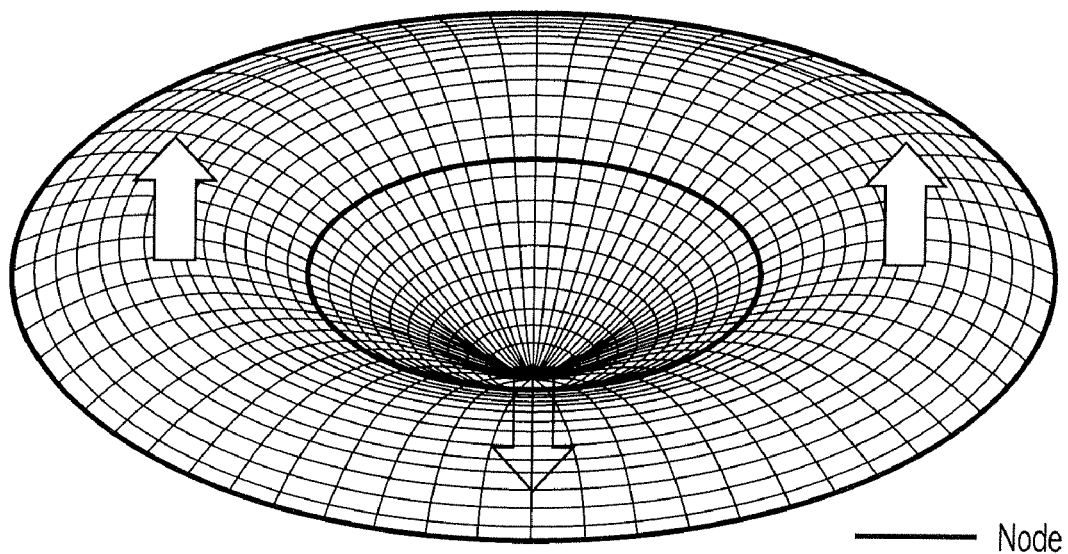

Likewise, the anti-dust filter 21 can also vibrate in the state shown in FIGS. 22A and 22B depending on a frequency of the vibration to be applied. That is, the vibration conformation of the anti-dust filter 21 shown in FIGS. 22A and 22B is that the inside and the outside of the glass plate vibrate in the phases shifted from each other by 180 degrees. In detail, the illustrated vibration conformation is a mode that the nodes are generated around and inside of the glass plate and, as shown in the drawings, the vibration in an area surrounded by the inner nodes and the vibration in the outer area (donut-shaped area) of the inner nodes have the phases shifted from each other by 180 degrees. This will be referred to as a "vibration mode 2" hereinafter.

Figure 19:
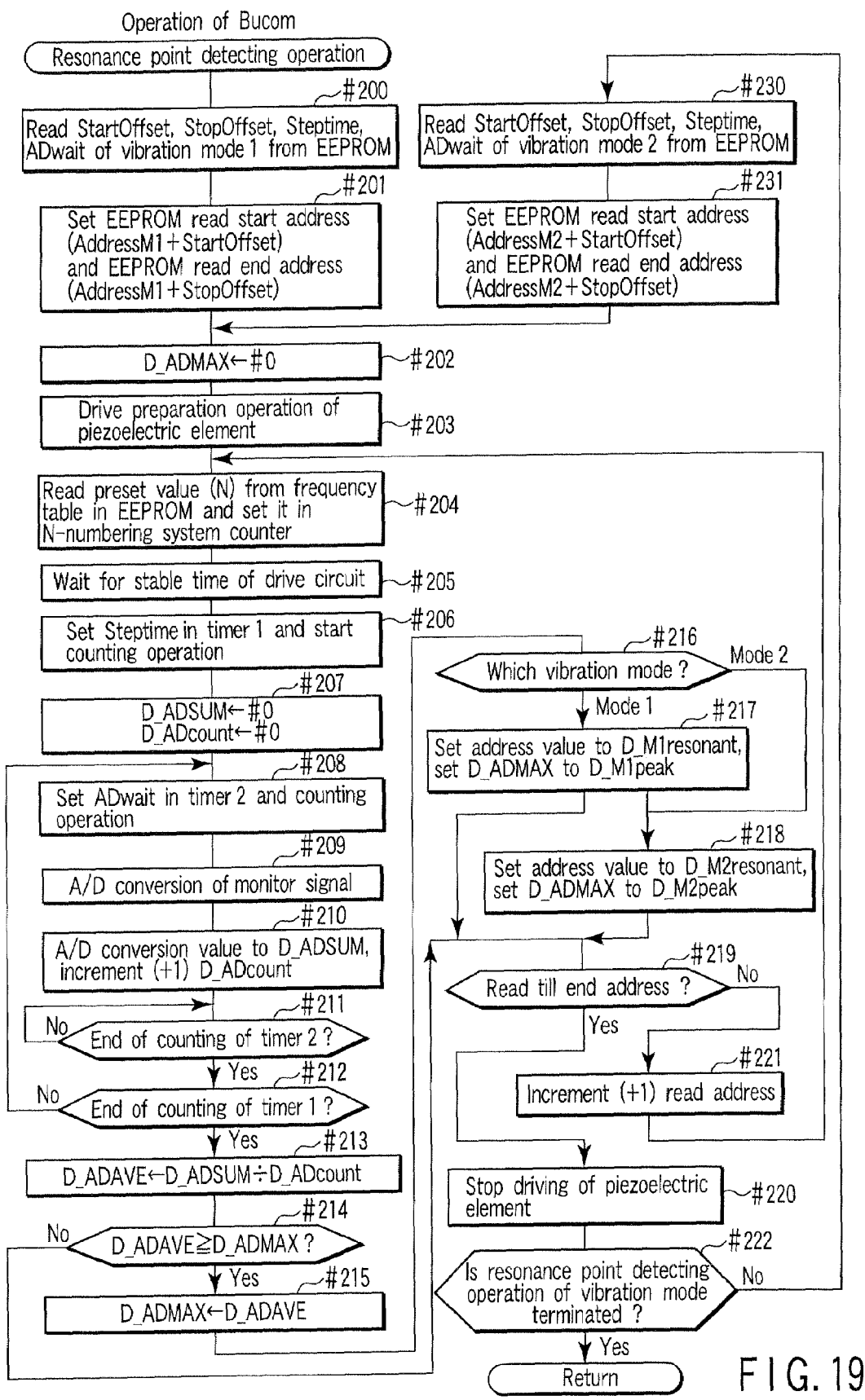
FIG. 19 is a flowchart showing a detailed procedure of a routine "resonance point detecting operation" in the flowchart of FIG. 18.

Therefore, in the sub-routine "resonance point detection operation" shown in FIG. 19, the detection operation of the resonance frequency in the two types of vibration modes, i.e., the vibration mode 1 and the vibration mode 2 is first carried out.

Since a range in which the resonance frequency exists can be expected by the characteristics (e.g., a shape, a composition, a support method and others) of the glass, the resonance point should be detected by applying the vibration to the glass plate in this range. Or else, the detection operation would require the time more than necessary. Additionally, if the detection range is not assumed, a resonance frequency in a higher-order resonance mode other than an intended vibration mode may be possibly detected.

Figures 23, 24A, 24B:
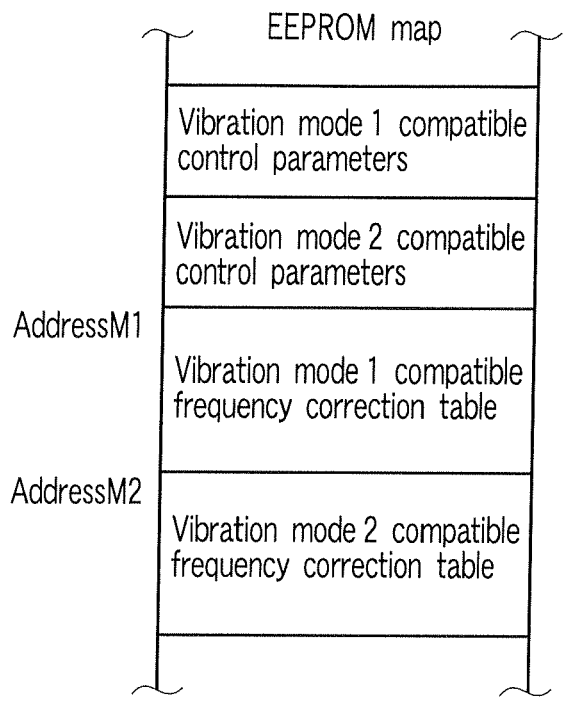

Thus, in this embodiment, parameters required for the resonance frequency detection operation are previously stored in the EEPROM 29 having a plurality of areas indicated by a memory map in FIG. 23, and they are provided as, e.g., "vibration mode 1 compatible control parameters". The detailed values of the control parameters corresponding to the vibration mode 1 are stored as values shown in FIG. 24A. For example, StartOffset indicates a read start position of this table.

Further, likewise, the detailed values of the control parameters corresponding to the vibration mode 1 are stored as values shown in FIG. 25A as a "vibration mode 1 compatible frequency correction table". Such a data table show values set in the N-numbering system counter 41 when driving the glass in the vibration mode 1. This table is calculated on the assumption that a clock generator 55 outputs a pulse signal having a frequency 40 (MHz). The drive frequency can be calculated by using the (Expression 1) which has been already explained.

StopOffset indicates a read end position of this vibration mode 1 compatible frequency correction table. When the drive frequency is transferred in a range from StartOffset to StopOffset, the glass plate vibrates with any value in the table in the vibration mode 1.

StepTime indicates a time in which driving should be carried out at one frequency when causing transition of the drive frequency. It is determined by taking a stable time of the anti-dust filter drive circuit 48 into consideration. The vibration of the glass plate does not immediately follow a change in the drive frequency. If follow-up is not carried out, output of the monitor signal cannot be counted.

ADwait is a parameter which determines a frequency at which the monitor signal is subjected to A/D conversion. It is determined as an appropriate value in accordance with a resonance frequency of the glass. M1OscTime indicates a time in which the anti-filter 21 is excited at a detected frequency. This is required in the sub-routine "dust removing operation".

The above parameters are the control parameters in the vibration mode 1.

FIG. 24B shows the detail of the control parameters corresponding to the vibration mode 2. Further, FIG. 25B shows the detail of the vibration mode 2 compatible frequency correction table, these are parameters having the same structures in the vibration mode 1 and they are basically the same, thereby omitting their explanation.

Furthermore, description will now be given as to the procedure of the "resonance point detection operation" with reference to a flowchart of FIG. 19 and FIGS. 23 to 26.

At #200, four control parameters (StartOffset, StopOffset, StepTime, ADwait) are read from the EEPROM 29. Then, at #201, AddressM1+StartOffset is set as a read start address of the EEPROM 29, and AddresM1+StopOffset is set as a read end address. AddressM1 indicates a top address in the vibration mode 1 compatible frequency correction table.

Assuming that a read start position (StartOffset) is "3" and a read end position (StopOffset) is "9", the preset values "N" in an area indicated by *1 to *2 in FIG. 25A are set to the N-numbering system counter 41. That is, a frequency with which the output of the monitor signal becomes maximum is detected from the frequencies f1, f2, f3, ..., f7.

At #202, #0 which is a minimum value of the monitor signal is set to a memory D_ADMAX assured to temporarily store a maximum value of the monitor signal for the sake of convenience. At #203, the preparation operation is carried out in order to drive the piezoelectric element 22. A transistor Q00 is set in the ON state by controlling the IO port P_Pw-Cont. Further, output of a pulse signal from the clock generator 55 is started. When data taken out from the table is set in the N-numbering system counter 41 in this state, the piezoelectric element 22 can be driven at a desired frequency.

At #204, a presser value (N) is read from the set address in the EEPROM 29. Then, the read preset value is set in the N-numbering system counter 41 from the IO port D_NCnt.

Then, at #205, the standby mode is effected for only a predetermined time until the frequency drive circuit is stabilized. At #206, Steptime is set in a timer counter 1, and a counting operation of the time is started. For example, as shown in FIG. 24A, when Steptime is stored, 2 (msec) is set in the timer counter 1.

At #207, #0 is set in a memory area D_ADSUM assured to temporarily store addition data of the A/D converter 60. Furthermore, #0 is set to a D_ADcount assured to count the number of times of operation of the A/D converter 60.

At #208, ADwait is set in the timer counter 2, and the counting operation is started. For example, as shown in FIG. 24A, if ADwait is stored, 80 (μsec) is set in the timer counter 2.

Moreover, at #209, an A/D conversion value of the monitor signal is acquired by using the A/D converter 60.

At #210, the A/D conversion value of the monitor signal is added in a memory area D_ADSUM. Additionally, the memory area D_ADcount is incremented (1 is added). At #211, the standby mode is continued until the counting operation of the timer counter 2 is completed.

At #212, a judgment is made upon whether the counting operation of the timer counter 1 is terminated. If it is yet to be completed, the processing advances to #208 in order to again measure the monitor signal. If it is completed, the processing proceeds to #213.

At #213, an average value of the AD conversion values is obtained from the memory areas D_ADSUM and D_ADcount. Then, the average value is stored in a memory area D_ADAVE assured to record the average value. D_ADAVE indicates a level of the monitor signal at the current drive frequency.

At #214, contents of D_ADAVE and D_ADMAX are compared with each other. If the content of D_ADAVE is larger than the content of D_ADMAX, the processing advances to #215. If it is smaller, the processing proceeds to #219.

At #215, the content of D_ADAVE is transferred into D_ADMAX. The old maximum value is written off, and the currently measured value is stored as a maximum value of the monitor signal. Moreover, if the monitor signal is currently measured in the vibration mode 1, the processing advances from #216 to #217. If the monitor signal is currently measured in the vibration mode 2, the processing proceeds from #216 to #218.

At #217, the current address of the EEPROM 29 is stored in D_M1resonant. D_M1resonant is an area assured in the memory in order to store an address for the vibration mode 1.

Additionally, at #218, the current address of the EEPROM 29 is stored in D_M2resonant. D_M2resonant is an area assured in the memory in order to store an address for the vibration mode 2.

These values of D_M1resonant and D_M2resonant are used in the later-described sub-routine "dust removing operation".

At #219, a judgment is made upon whether measurement of the monitor signal is terminated till the drive frequency indicated by the read end address in the EEPROM 29. If measurement is yet to be finished, the processing advances to #221. If it is finished, the processing proceeds to the next step #220.

At #220, processing to stop the drive operation is carried out. The transistor Q00 is turned off, and the operation of the clock generator 55 is stopped. At #221, the read address in the EEPROM 29 is incremented, and the processing advances to #204.

At #222, a judgment is made upon whether the detection operation of the resonance point is terminated in the vibration mode 1 and the vibration mode 2. If the detection operation is terminated in the both modes, the processing returns to the main routine.

If the detection operation is terminated only in the vibration mode 1, the processing advances to #230 in order to detect the resonance frequency inn the vibration mode 2. It is to be noted that the operations in #230 and #231 are basically the same as those in #200 and #201, thereby eliminating their explanation. Additionally, the processing again advances to #202 in order to detect the resonance frequency.

It is to be noted that the preset values are read from the frequency correction table in a range stipulated by the two parameters (StartOffset, StopOffset) in this sub-routine. Further, all the preset values are utilize in order to drive the glass plate and measure a level of the monitor signal.

Figure 26:
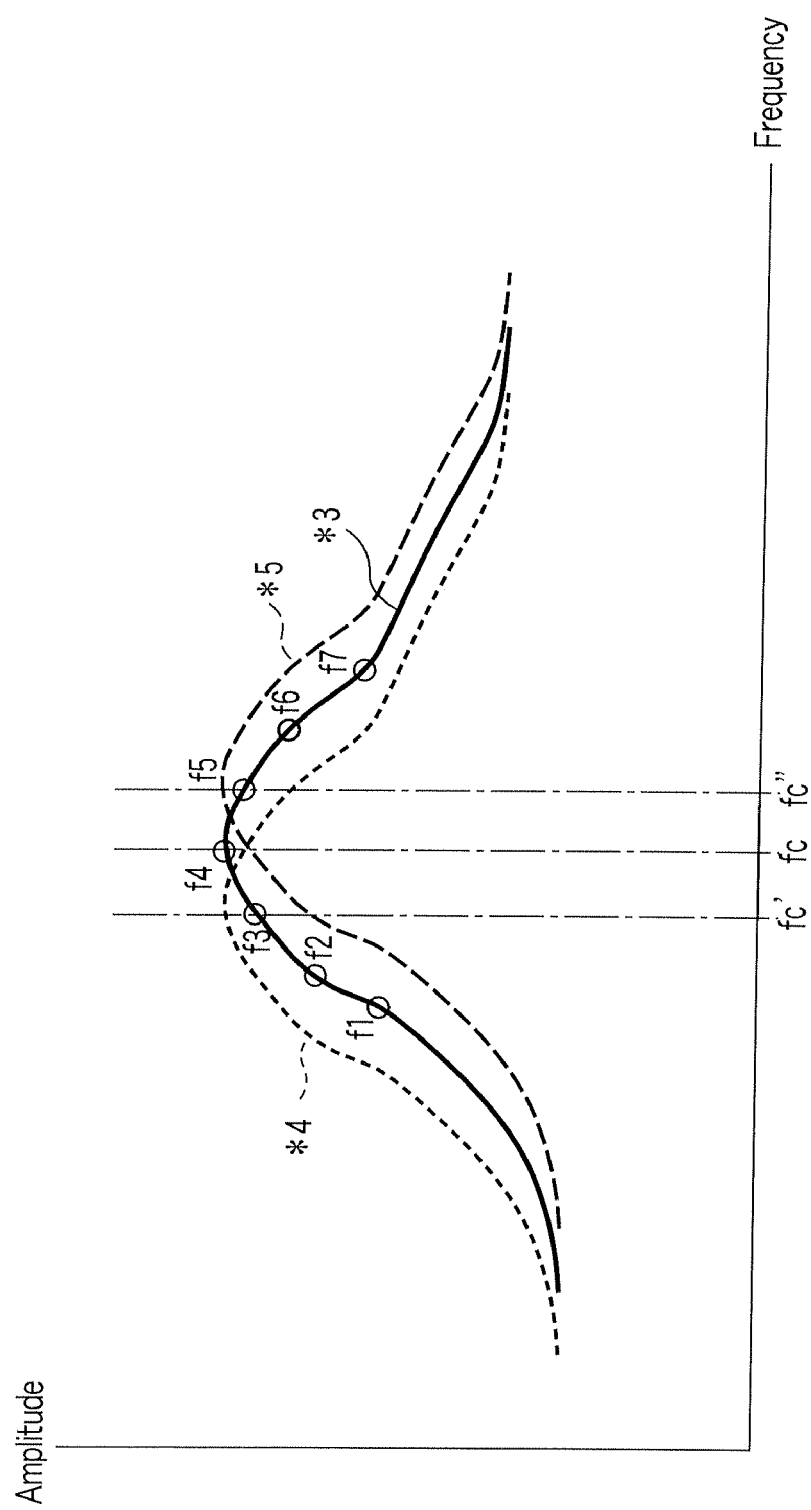
FIG. 26 is a characteristic graph showing the relationship between a drive frequency and an amplitude of vibrations of the glass plate.

FIG. 26 shows the relationship between a frequency and an amplitude of the glass plate. Furthermore, it is assumed that *3 indicates the characteristic of the resonance mode 1.

In this main routine, the monitor signal level is measured at frequencies (preset values) f1, f2, f3, . . . , f7 shown in FIG. 25A. The resonance frequency in the characteristic of *3 is fc. fc corresponds to f4. In this main routine, measurement of the monitor signal is executed while sequentially changing the drive frequencies from f1 to f2, f3 and f4. Moreover, even if the resonance frequency is passed, driving is sequentially continues in the order of f5, f6 and f7. At f1 to f4, the monitor signal tends to be increased. Additionally, the monitor signal changes to be decreased from f5. Therefore, by detecting a change from an increasing trend to a decreasing trend of the monitor signal, driving at the frequencies f6 and f7 is not necessary. It is to be noted that, if a range in which the frequency is changed is wide, it is desirable to create the illustrated control program in order to shorten the detection time of the resonance frequency.

Figure 20:
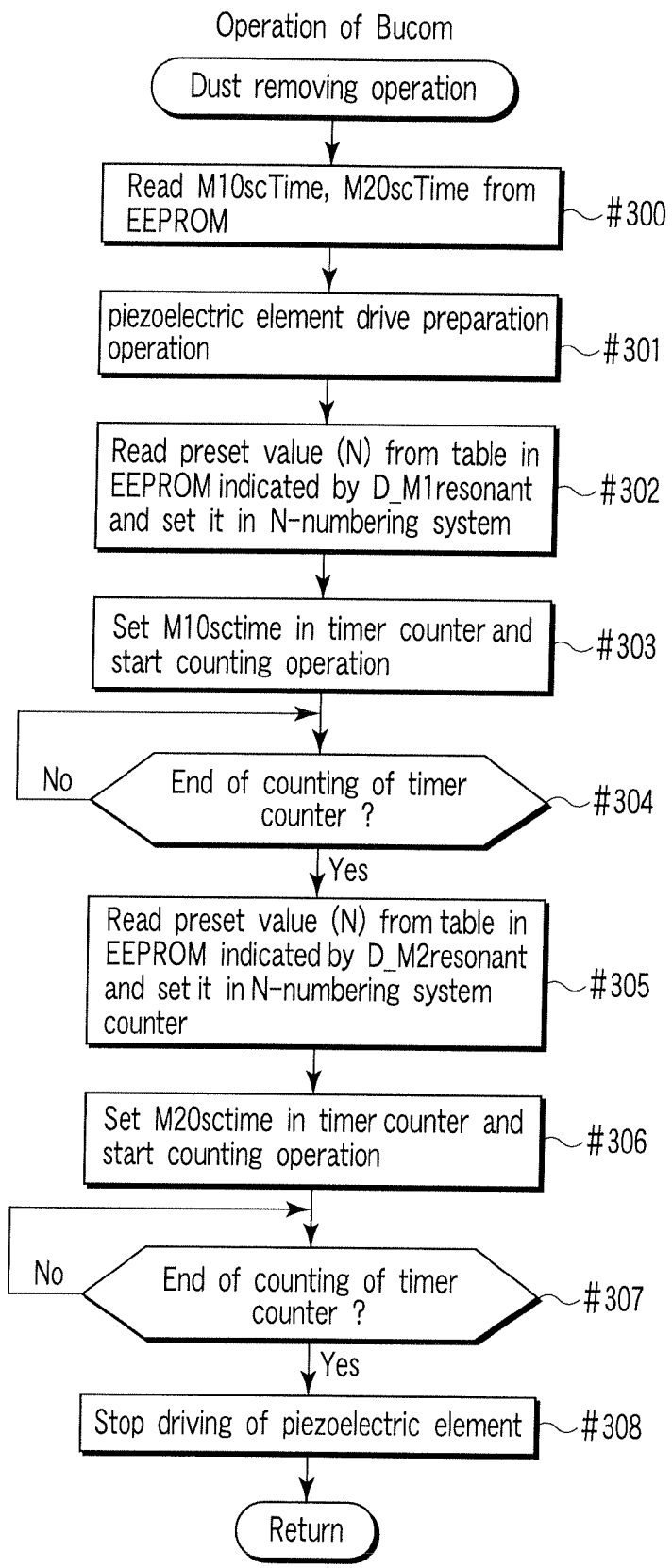
FIG. 20 is a flowchart showing a detailed procedure of a routine "dust removing operation" in the flowchart of FIG. 18.

Here, description will be given as to the sub-routine "dust removing operation" shown in FIG. 20.

In this sub-routine, the setting is made in order to drive the piezoelectric element 22 in such a manner that the anti-dust filter 21 is subjected to resonance in the two modes, i.e., the vibration mode 1 and the vibration mode 2 mentioned above. Generally, a frequency or an amplitude which facilitates removal of the dust varies depending on the characteristics of the dust (e.g., a weight, a shape, a material and others). Thus, in order to assuredly remove the dust, it is good enough to subject the glass plate to resonance in these two vibration modes. Of course, it may be subjected to resonance in more vibration modes. However, since the dust removing operation may need more time in some cases, the appropriate number of the vibration modes should be set by appropriately taking a level of the dust removal effect and a required time into consideration.

Thus, at #300, M1OSCtime is read from the vibration mode 1 compatible control parameters and M2OSCtime is read from the vibration mode 2 compatible control parameters in the EEPROM 29. At #301, the preparation operation is executed in order to drive the piezoelectric element 22. The transistor Q00 is turned on by controlling the IO port P_Pw- Cont. Further, output of the pulse signal from the clock generator 55 is started. By setting the data taken out from the table of the EEPROM 29 into the N-numbering system counter 41, the piezoelectric element 22 can be driven at a desired frequency.

At #302, the preset value (N) is read from the address in the EEPROM 29 indicated by D_M1resonant. This value is set in the N-numbering system counter 41. As a result, the anti-dust filter drive circuit 48 drives the glass plate at the resonance frequency in the vibration mode 1.

At #303, M1OscTime is set in the timer counter 1, and the counting operation is started. For example, when M1OscTime is stored as shown in FIG. 24A, 200 (msec) is set in the timer counter 1. At #304, the standby mode is continued until the counting operation of the timer counter 1 is terminated.

Then, the dust removing operation is completed in the vibration mode 1. Further, in order to further assuredly perform the dust removal, the glass plate is vibrated in the vibration mode 2.

At #305, the present value (N) is read from an address in the EEPROM 29 indicated by D_M2resonant. This value is set in the N-numbering system counter 41. As a result, the anti-dust filter drive circuit 48 drives the glass plate at the resonance frequency in the vibration mode 2.

At #306, M2OscTime is set in the timer counter 2, and the counting operation is started. For example, when M2OscTime is stored as shown in FIG. 24B, 100 (msec) is set in the timer counter 2. At #307, the standby mode is continued until the counting operation of the timer counter 2 is completed. Then, at #308, processing to stop the drive operation is carried out. The transistor Q00 is turned off, and the operation of the clock generator 55 is stopped. Thereafter, the processing advances to the main routine.

It is to be noted that predicting irregularities in resonance frequency of the glass plate is very difficult on the design stage of the camera system. Therefore, after completion of the camera system, the control parameters which determine the drive frequency of the piezoelectric element 22 should be able to be set. Therefore, all the necessary parameters are stored in the EEPROM 29 so as to be capable of being selected in the present invention.

Further, this sub-routine "dust removing operation" drives the glass plate at only the resonance frequency detected by the sub-routine "resonance point detection operation".

FIG. 26 shows the relationship between a frequency and an amplitude of the glass plate. It is assumed that *3 indicates the characteristic when the sub-routine "resonance point detection operation" is executed. It is assumed that the resonance frequency fc corresponds to f4 in FIG. 25A. However, the characteristic of the resonance frequency may possibly fluctuate like *4 or *5 due to an unexpected factor. In order to cope with generation of such a fluctuation, data of f3 and f5 as well as f4 may be read from the table in the EEPROM 29, and the sub-routine may be executed.

Furthermore, since the resonance frequency fluctuates in a given range due to a temperature, the glass plate may be driven at a most appropriate resonance frequency at a temperature during the operation by adequately setting the temperature correction table created by a predetermined experiment and holding it so as to be cable of being referred. Accordingly, in order to read parameters corresponding to a temperature at that time from the temperature correction table according to the vibration mode, it is good enough to detect temperature information (t) by a temperature sensor (not shown) of a temperature measurement circuit 33 before executing the sub-routine.

As described above, according to the electronic imaging apparatus with an anti-dust function (e.g., a camera) of this embodiment, accessories such as the recording medium 39, the external power supply 70 or the strobe unit 80 as well as the lens unit 12 can be attached/detached, and the apparatus is constituted to include the constituent member (the anti-dust filter 21) arranged between the imaging lens 12a and the imaging element 27 and the dust removing means (the piezoelectric element 22 and the anti-dust filter drive circuit 48) which vibrate the glass at a plurality of types of the frequencies and remove the attached dust. Therefore, it is possible to perform the dust removing operation by the resonance operation using the piezoelectric element 22 at an effective timing according to attachment of any of the accessories.

In particular, the anti-dust function in this example has the resonance frequency detection mode in which the exciting means (piezoelectric element 22) is driven in order to detect the resonance frequency of the optical element (anti-dust filter 21) and the dust removing mode in which the piezoelectric element 22 is driven in order to remove the dust which has adhered to the optical element, and the resonance frequency detection mode and the dust removing mode are basically continuously executed at a timing that the accessory device is attached. Further, the resonance frequency detection operation is eliminated before imaging so as not to give a time lag due to a time required for the resonance frequency detection during imaging. Therefore, the efficient and assured dust removal is enabled without adversely affecting the imaging timing.

(Modification)

Although the above has described the embodiment in a protection glass (anti-dust filter) by exemplifying the camera system as the electronic imaging apparatus, the advantages equivalent to those in the foregoing embodiment can be obtained in any other electronic imaging apparatus which must avoid the grime or dust and in constituent members other than the anti-dust filter or any other portion by likewise applying the present invention.

Further, an optical element member other than the glass with which a resonance frequency cannot be specified can be also applied. In this case, adjustment to an inherent resonance frequency caused due to irregularities in individual products is no longer required, and the equivalent effects can be expected.

Besides, various modifications can be carried out without departing from the scope of the present invention.

Third Embodiment

Figure 27:
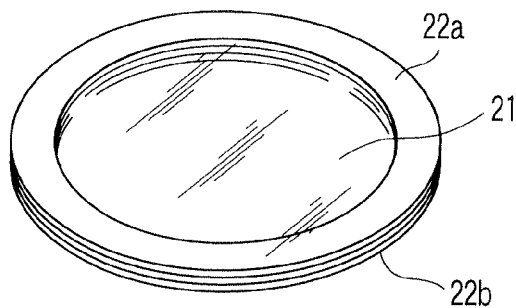
FIG. 27 is a perspective view showing only the anti-dust filter and the piezoelectric element in the imaging unit in the camera according to the present invention.

A third embodiment according to the present invention will now be described. In this case, reference is made to the drawings used in the first embodiment. On the both surfaces of the anti-dust filter 21 at the peripheral edge portion, piezoelectric elements 22a and 22b each of which is a predetermined excitation member used to give vibrations to the anti-dust filter 21 and is formed into a circular shape are arranged so as to integral with the anti-dust filter 21 by means such as attachment using, e.g., an adhesive as shown in FIG. 27.

The piezoelectric elements 22a and 22b are constituted so as to be capable of generating a predetermined vibration, i.e., a progressive wave vibration to the anti-dust filter 21 by applying a drive voltage having a predetermined cycle by using an anti-dust filter drive circuit 48.

That is, when a frequency signal close to a resonance frequency of the anti-dust filter 21 is applied by using the anti-dust filter drive circuit 48, a predetermined vibration can be generated in the anti-dust filter 21, and the dust or the like which has adhered to the surface of the anti-dust filter 21 can be moved to the outside of an effective area (area through which a light flux contributing to formation of an object image is transmitted) of the anti-dust filter 21 and removed.

Furthermore, the anti-dust filter 21 is fixed and held by a pushing member 20 consisting of an elastic body such as a leaf spring so as to be air-tightly joined to an anti-dust filter receiving member 23.

An opening 23f consisting of a circular shape or a polygonal shape is provided in the vicinity of a substantially central part of the anti-dust filter receiving member 23. This opening 23f is set to have a dimension which allows passage of an object light flux which has been transmitted through the imaging optical system 12a and a photoelectric conversion surface of the imaging element 27 arranged at the rear part to be irradiated with this light flux.

A wall portion 23e (see FIGS. 4 and 5) protruding to the front surface side is formed into a substantially annular shape at the peripheral edge portion of this opening 23f, and a receiving portion 23c is formed on the end side of the wall portion 23e so as to protrude toward the front surface side. In this receiving portion 23c, a vibration absorbing member such as rubber or felt is provided at a contact surface portion with the piezoelectric element 22b, and it is constituted so as not to prevent the progressive wave vibration.

On the other hand, in the vicinity of the outer peripheral edge portion of the anti-dust filter receiving member 23 on the front surface side, a plurality of (three in this embodiment) protrusion portions 23a are formed at predetermined position so as to protrude toward the front surface side. This protrusion portion 23a is a portion formed in order to fix the pushing member 20 which fixes and holds the anti-dust filter 21, and the pushing member 20 is fixed to the end portion of the protrusion portion 23a by fastening means such a screw 20a.

The pushing member 20 is a member formed by an elastic body such as a leaf spring as described above, and it has a base end portion fixed to the protrusion portion 23a and a free end portion coming into contact with the outer peripheral edge portion of the anti-dust filter 21 or a part of the piezoelectric element 22a. As a result, it pushes the anti-dust filter 21 toward the side of the anti-dust filter receiving member 23, i.e., the optical axis direction.

In this case, when a predetermined part of the piezoelectric element 22b provided at the outer peripheral edge portion of the anti-dust filter 21 on the rear surface side comes into contact with the receiving portion 23c, a position of the anti-dust filter 21 in the optical axis direction is restricted. Therefore, as a result, the anti-dust filter 21 is fixed and held so as to be air-tightly joined to the anti-dust filter receiving member 23 through the piezoelectric element 22b.

In other words, the anti-dust filter receiving member 23 is constituted so as to be air-tightly joined to the anti-dust filter 21 through the piezoelectric elements 22a and 22b by an impetus by the pushing member 20.

Meanwhile, the anti-dust filter receiving member 23 and the CCD case 24 are configured in such a manner that a circumferential groove 24d and an annular convex portion 23d (see FIGS. 4 and 5) are substantially air-tightly fitted to each other and, at the same time, the anti-dust filter receiving member 23 and the anti-dust filter 21 are air-tightly joined through the piezoelectric element 22b by an impetus of the pushing member 20. Moreover, an optical LPF 25 arrange in the CCD case 24 is substantially air-tightly arranged between the peripheral edge portion of the optical LPF 25 on the front surface side and the step portion 24a of the CCD case 24. Additionally, an imaging element 27 is arranged on the rear surface side of the optical LPF 25 through a low pass filter receiving member 26, and air-tightness is also held between the optical LPF 25 and the imaging element 27.

Therefore, as a result, a predetermined air gap portion 51a is formed in a space in which the optical LPF 25 and the anti-dust filter 21a are opposed to each other. Further, a space portion 51b is formed by the peripheral edge side of the optical LPF 25, i.e., the CCD case 24, the anti-dust filter receiving member 23 and the anti-dust filter 21. This space portion 51b is a sealed space formed so as to protrude toward the outer side of the optical LPF 25 (see FIGS. 4 and 5). Furthermore, the space portion 51b is provided so as to be a wider space than the air gap portion 51a. Furthermore, the space consisting of the air gap portion 51a and the space portion 51b is a sealed space 51 which is substantially air-tightly sealed by the CCD case 24, the anti-dust filter receiving member 23, the anti-dust filter 21 and the optical LPF 25.

As described above, in the imaging unit 15 in the camera according to this embodiment, there is constituted a sealed structure portion which forms a substantially hermetically sealed space 51 including the air gap portion 51a formed at the peripheral edges of the optical LPF 25 and the anti-dust filter 21. Moreover, this sealed structure portion is provided at a position extending from the peripheral edge of the optical LPF 25 or its vicinity to the outer side.

Additionally, in this embodiment, the sealed structure portion is constituted by the anti-dust filter receiving member 23 which hermetically supports the anti-dust filter 21 at its peripheral edge portion or its near part, the CCD case 24 which hermetically supports the optical LPF 25 at its peripheral edge portion or its near part and is arranged so as to be closely in contact with the anti-dust filter receiving member 23 at a predetermined position thereof, and others.

In the camera according to this embodiment having the above-described structure as mentioned above, the anti-dust filter 21 is oppositely arranged at a predetermined position on the front surface side of the imaging element 27, and the sealed space 51 formed at the peripheral edges of the photoelectric conversion surface of the imaging element 27 and the anti-dust filter 21 is configured so as to be sealed, thereby preventing the dust or the like from adhering to the photoelectric conversion surface of the imaging element 27.

Further, in this case, the dust or the like adhering to the exposure surface of the anti-dust filter 21 on the front surface side can be removed by applying a cyclic voltage to the piezoelectric elements 22 and 22b which are arranged so as to be integral with the peripheral edge of the anti-dust filter 21 and then giving a predetermined vibration to the anti-dust filter 21.

Figure 28:
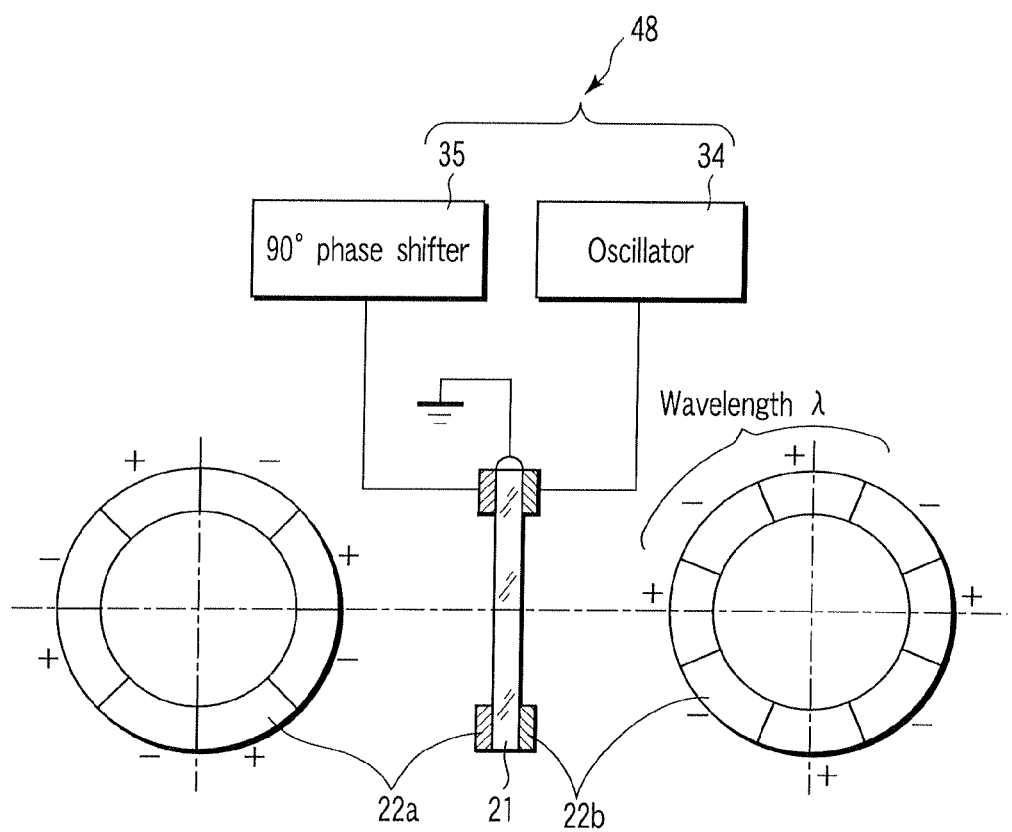
FIG. 28 is a view conceptually showing a structure of exciting means for giving vibrations to the anti-dust filter in the imaging unit in the camera.

Furthermore, FIG. 28 is a view conceptually showing a structure of exciting means which give the vibration to the anti-dust filter in the imaging unit in this electronic imaging apparatus.

As shown in FIG. 28, the piezoelectric elements 22a and 22b are polarized. In this case, in areas which are separated into eight in the circumferential direction, the piezoelectric elements 22a and 22b each having an annular shape are polarized in the plate thickness direction, the polarization directions are represented by plus (+) and minus (−), and the arrears having the inverse polarization directions are alternately arranged. Moreover, one piezoelectric element 22b as first exciting means is arranged at a position shifted from the other piezoelectric element 22a as second exciting means by a ¼ wavelength (¼λ) of a wavelength of the vibration (in this example, one wavelength corresponds to a length of polarized areas of plus (+)/minus (−)).

A voltage having a predetermined frequency is applied to the thus configured piezoelectric elements 22a and 22b in each plate thickness direction by the anti-dust filter drive circuit 48.

In this case, a frequency signal (first cyclic voltage signal) outputted from an oscillator 34 of the anti-dust filter drive circuit 48 is applied to the piezoelectric element 22b as it is and, on the other hand, a signal (second cyclic voltage signal) whose phase is shifted by 90° by a 90° phase shifter of the anti-dust filter drive circuit 48 is applied to the piezoelectric element 22a.

Figure 29:
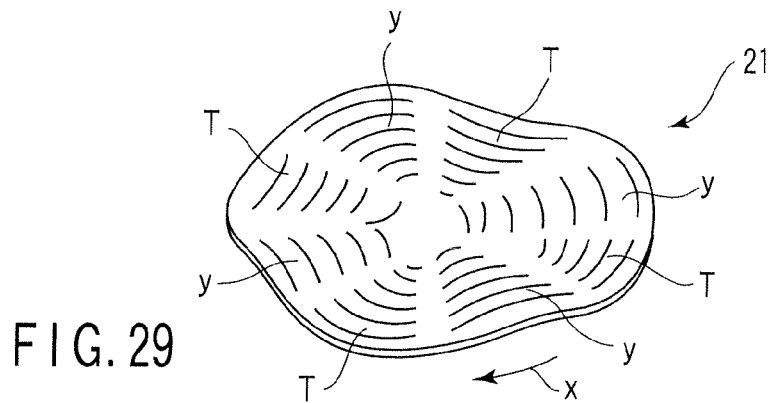
FIG. 29 is a conceptual view showing the state of flexural progressive wave vibrations generated when vibrations are given to the anti-dust filter in FIG. 27 by the exciting means.

Applying such a signal to each of the piezoelectric elements 22a and 22b can generate a flexural progressive wave vibration (vibration that a peak Y and a trough T are alternately generated with an equal amplitude at equal intervals) which advances toward the rotational direction X with a central portion of the anti-dust filter 21 as an axis as shown in FIG. 29 (only the anti-dust filter 21 is shown).

It is to be noted that the flexural progressive wave has a substantially symmetrical shape with respect to the central part (optical axis) of the anti-dust filter 21 when seeing the flexural progressive wave generated by the piezoelectric elements 22a and 22b at an arbitrary time.

Additionally, in a usual case, a temperature affects the anti-dust filter and an elastic coefficient of each of the excitation members 22a and 22b and it is one factor which changes the inherent vibration frequency. Therefore, when vibrating and operating the anti-dust filter 21, its temperature must be measured, and a change in inherent vibration frequency in the environment at that time must be taken into consideration. In particular, the imaging element 27 in the camera 1 has a tendency that an increase in temperature is prominent during its operation, and the inherent vibration frequency at that time can be expected by measuring a change in temperature of the anti-dust filter 21 provided in the vicinity of the imaging element 27.

Thus, this camera 1 is constituted so as to comprise a temperature measurement circuit 33 including a sensor (not shown) used to measure a circumferential temperature of the imaging element 27. Further, an arrangement position of the sensor, i.e., a temperature measurement point in this case is set, e.g., in the vicinity of the vibration surface of the anti-dust filter 21.

An anti-dust filter drive circuit 48 in this camera 1 will now be described hereinafter.

FIG. 30 is a circuit diagram schematically showing a structure of the anti-dust filter drive circuit 48 in this camera 1. FIG. 31 is a time chart showing each signal conformation outputted from each constituent member in the anti-dust filter drive circuit 48 illustrated in FIG. 30.

A clock generator 55 included in the Bucom 50 outputs a pulse signal (basic clock) with a frequency sufficiently faster than a signal frequency which should be applied to the piezoelectric elements 22a and 22b (see Sig1 in FIG. 31). This basic clock signal is inputted to an N-numbering system counter 41 of the anti-dust filter drive circuit 48.

The N-numbering system counter 41 counts the pulse signal, and outputs a count end pulse signal every time it reaches a predetermined value=N. That is, the basic clock signal is divided by 1/N (see Sig2 shown in FIG. 31).

Since the divided pulse signal does not have a duty ratio of High and Low being 1:1, the duty ratio is converted into 1:1 through a first ½ divider circuit 42a. At this time, the frequency becomes half (see Sig3 shown in FIG. 31).

An output signal of the first ½ divider circuit 42a is outputted to a second ½ divider circuit 42b and an exclusive OR (ExOR) circuit 500.

A pulse signal inputted to the second ½ divider circuit 42b has a frequency further halved and then it is outputted (see Sig4 shown in FIG. 31).

Here, in the High state of the pulse signal Sig4, an Mos transistor Q01 (44b) enters the ON state.

On the other hand, the pulse signal is applied to an Mos transistor Q02 (44c). Therefore, in the Low state of this pulse signal, the Mos transistor Q02 enters the ON state.

When the transistors Q01 (44b) and Q02 (44c) connected to the primary side of a transformer A (45a) alternately enter the ON state, a signal Sig5 shown in FIG. 31 is generated on the secondary side of the transformer A (45a). In this case, a winding ratio of the transformer A (45a) is determined by an output voltage of the power supply circuit 53a and a voltage required to drive one piezoelectric element 22a.

It is to be noted that a resistance R00 (46a) is provided in order to restrict an excessive current from flowing through the transformer A (45a).

When driving the piezoelectric element 22a, the transistor Q00 (44a) must be in the ON state, and a voltage must be applied to a center tap of the transformer A (45a) from the power supply circuit 53a. Further, in this case, ON/OFF of the transistor Q00 (44a) is controlled from P_PwContA f the Bucom 50.

Furthermore, a set value=N of the N-numbering system counter 41 is set from a port=D_NCnt of the Bucom 50. That is, the Bucom 50 can arbitrarily change a drive frequency of each of the piezoelectric elements 22a and 22b by controlling the set value=N.

The frequency is calculated by using the following expression (1). That is, $$fdrv = fpls/4N \qquad (1)$$

fpls: a frequency of an output pulse of the clock generator fdrv: a frequency of a signal applied to the piezoelectric element In this manner, the drive signal (Sig5) having a predetermined voltage is applied to the piezoelectric element 22a.

On the other hand, an output signal Sig3 from the first ½ divider circuit 42a is outputted to a third ½ divider circuit 42c through an exclusive OR (ExOR) circuit 500. In this case, when a port P_θCont is in the High state, the pulse signal Sig3 is inverted. Then, it is outputted to a third ½ divider circuit 42c.

Moreover, when the port P_θCont is in the Low state, the pulse signal Sig3 is outputted to the third ½ divider circuit 42c as it is (see Sig6 shown in FIG. 31).

This pulse signal Sig6 is caused to have a half frequency by the third ½ divider circuit 42c, and then it is outputted (see Sig7 shown in FIG. 31). As a result, a second inverter 43b, transistors Q11 (44e), Q12 (44f) and a transformer B (45b) are driven, and a drive signal (Sig8) having a predetermined voltage is applied to the piezoelectric element 22b.

It is to be noted that respective functions of the second inverter 43b, the transistors Q11 (44e) and Q12 (44f), the transformer B (45b) and the resistance R10 (46b) are substantially equal to those of the first inverter 43a, the transistors Q01 (44b) and Q02 (44c), the transformer A (45a) and the resistance R00 (46a) mentioned above.

Additionally, the frequency division operation is carried out in response to a leading edge of the pulse signal inputted in any of the first to third ½ divider circuits 42a to 42c.

Further, even if the frequencies of the pulse signals are the same, when the signal are inverted, a difference in phase is generated in the pulse signals outputted from the second ½ divider circuit 42b and the third divider circuit 42c, respectively. A difference in phase in this case is 90°.

Therefore, a phase difference of 90° is generated between the signal Sig5 applied to the piezoelectric element 22a and the signal Sig8 applied to the piezoelectric element 22b. Then, this phase difference can be controlled by the port P_θCont of the Bucom 50. For example, a phase difference of 90° is generated if the port P_θCont is in the High state, and no phase difference is generated if the same is in the Low state. That is, the vibrations in different conformations can be applied to the anti-dust filter 21 by controlling the port P_θCont.

Description will now be given as to the operation to remove the dust and the like carried out in this camera 1 having such a structure.

Figure 32:
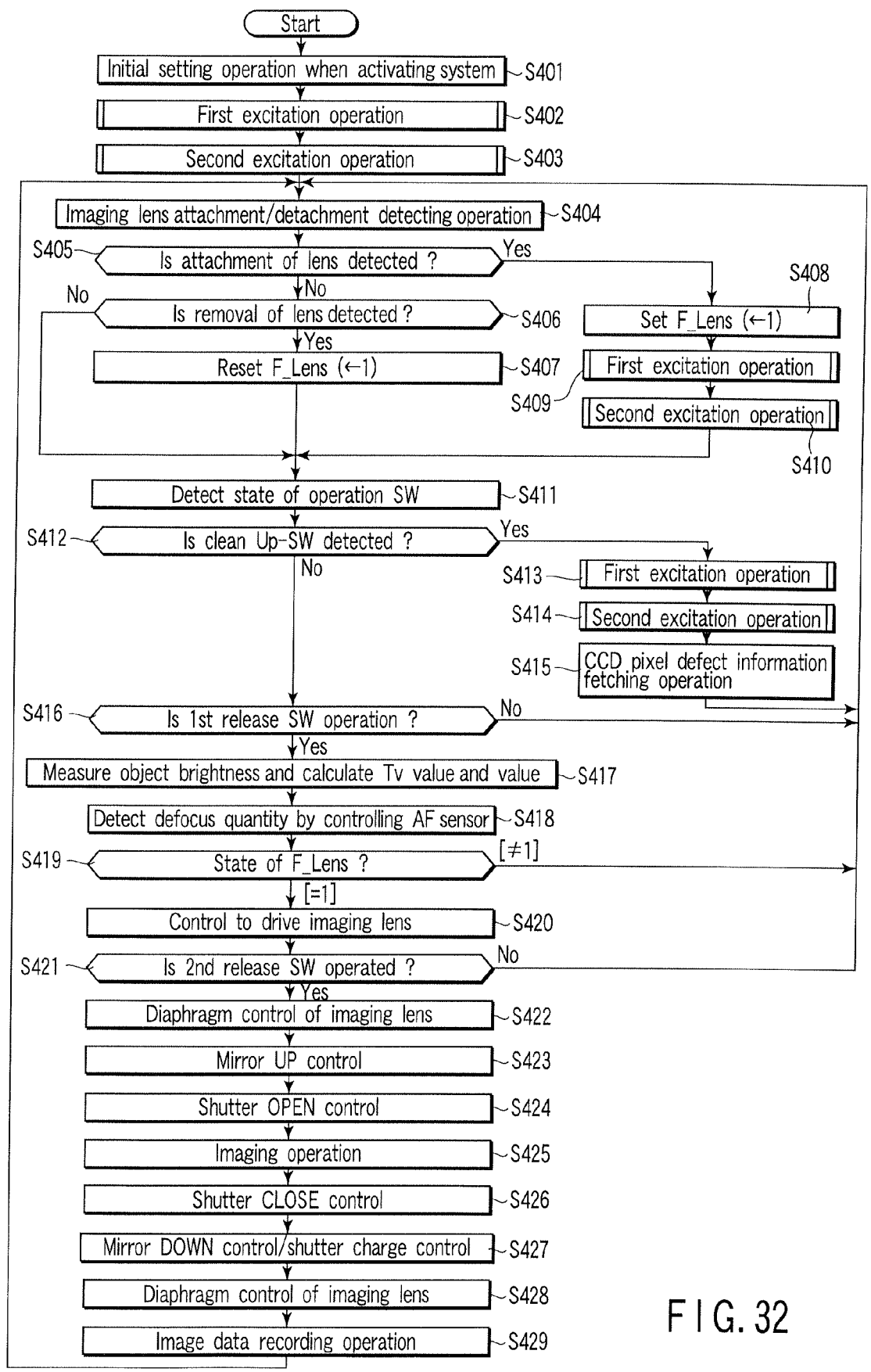
FIG. 32 is a flowchart showing an effect of a body control microcomputer in the camera.

FIG. 32 is a flowchart showing the effect of the Bucom 50 in the camera 1 according to this embodiment.

First, when an instruction signal is generated from a power supply switch (not shown) of the camera 1, the Bucom 50 starts the operation upon generation of this signal.

At a step S401, processing to activate the system of this camera 1 is executed. This processing is, e.g., processing to supply the power to each circuit unit of the camera 1 by controlling the power supply circuit 53a and to perform the initial setting of each circuit. Thereafter, the control advances to processing at a step S402.

At the step S402, the Bucom 50 executes second excitation operation processing which is a predetermined sub-routine. In this second excitation operation processing, the operation to remove the dust or the like is carried out by generating a standing wave in the anti-dust filter 21 (see FIG. 34 for more detail). Thereafter, the control proceeds to processing at a step S404.

At the step S404, the Bucom 50 performs communication with the Lucom 5, and execute attachment/detachment detection operation processing of the imaging lens in order to detect an attachment/detachment state of the lens unit 12. This processing is a processing step which is cyclically executed.

At a step S405, the Bucom 50 confirms whether the lens unit 12 is attached to the body unit 100. Here, when it is detected that the lens unit 12 is attached to the body unit 100, the control advances to processing at a step S408. Furthermore, in any other case, the control advances to processing at a next step S406.

At the step S406, the Bucom 50 confirms whether the lens unit 12 is removed from the body unit 100. Here, when it is detected that the lens unit 12 is removed from the body unit 100, the control advances to processing at a step S407. Moreover, in any other case, the control proceeds to processing at a next step S411.

When it is detected that the lens unit 12 is removed from the body unit 100 and the control advance to the processing at the step S407 as described above, the Bucom 50 initializes a control flag F_Lens (reset; ←0) at the step S407. Then, the control advances to processing at a step S411.

On the other hand, when it is detected that the lens unit 12 is attached to the body unit 100 and the control advances to processing at a step S408, the Bucom 50 sets the control flag F_Lens (set; ←1) at this step 408. Then, the control advances to processing at a step S409.

It is to be noted that the control flag F_Lens indicates "1" when the lens unit 12 is attached to a lens body tube portion 11a of the body unit 10 and indicates "0" when the lens unit 12 is detached from the lens body tube portion 11a of the body unit 100.

At a step S409, the Bucom 50 executes first excitation operation processing. Thereafter, the control advances to processing at a step S410. At the step S410, the Bucom 50 executes second excitation operation processing. Then, the control advances to processing at a step S411.

At a step S411, the Bucom 50 executes processing to detect the state of camera operation switches 52. At a step S412, the Bucom 50 confirms whether an instruction signal is generated from a cleanup switch (CleanUpSW; not shown) in the camera operation switches 52. Here, when generation of the instruction signal from the cleanup switch is confirmed, the control proceeds to processing at a step S413.

At the step S413, the Bucom 50 executes the first excitation operation processing. Thereafter, the control proceeds to processing at a step S414.

At the step S414, the Bucom 50 executes the second excitation operation processing. Then, the control advances to processing at a step S415.

At the step S415, the Bucom 50 executes operation processing to fetch pixel defect information of the imaging element 27. The pixel defect information fetched at this step is recorded in a flash ROM 38b. This information is used when performing correction processing to image data acquired by the imaging element 27. Therefore, for example, if the image data acquired by the imaging element is affected by the dust or the like, the correct pixel defect information cannot be obtained. Thus, in the camera 1 according to this embodiment, a series of the operations to remove the dust and the like is carried out immediately before acquiring the pixel defect information. As a result, the correct pixel defect information can be acquired.

Thereafter, the control returns to processing at the step S404, and the subsequent processing is repeated.

On the other hand, if generation of the instruction signal from the cleanup switch is not confirmed at the step S412 described above, the control advances to processing at a step S416. As to processing at the step S416 and subsequent steps, processing concerning the regular imaging operation is executed. That is, at the step S416, the Bucom 50 confirms whether a first release switch (SW) in the camera operation switches 52 is operated. Here, when the instruction signal from the first release switch (SW) is not confirmed, the control returns to processing at the step S404 mentioned above, and the subsequent processing is repeated. Furthermore, when the instruction signal from the first release switch (SW) is confirmed, the control advances to processing at a next step S417.

At the step S417, the Bucom 50 measures an object brightness by controlling a photometric circuit 32, and executes processing to calculate a shutter speed value (Tv value) and a diaphragm value (Av value) which become optimum in accordance with a brightness of the object at that time. Thereafter, the control advances to processing at a step S418.

At a step S418, the Bucom 50 carries out processing to detect a defocus quantity of the object at that time by controlling an AF sensor unit 30a through an AF sensor drive circuit 30b. Then, the control advances to processing at a step S419.

At the step S419, the Bucom 50 confirms a state of the control flag F_Lens. Here, when the control flag F_Lens≠1, the lens unit 30a is detached. That is, in this state, the proper imaging operation cannot be carried out. Therefore, in this case, the control returns to the processing at the step S404, and the subsequent processing is repeated.

When the Bucom 50 confirms that the control flag F_Lens=1 at the step S419 mentioned above, the control advances to processing at a next step S420.

At the step S420, the Bucom 50 issues an instruction to drive and control the lens unit 12 by performing communication with the Lucom 5 through the communication connector 6. In response to this, the Lucom 5 controls the lens drive mechanism 2 and moves the imaging optical system 12a of the lens unit 12 to a predetermined position. A position to which the imaging optical system to be moved is set based on a detection result at the step S418. Thereafter, the control advances to processing at a step S421.

At the step S421, the Bucom 50 confirms whether a second release switch (SW) in the camera operation switches 52 is operated. Here, when an instruction signal from the second release switch (SW) is not confirmed, the control returns to the processing at the step S404, and the subsequent processing is repeated. Moreover, when an instruction signal from the second release switch (SW) is confirmed, the control advances to processing at a second step S422.

At the step S422, the Bucom 50 performs communication with the Lucom 5 through the communication connector 6, and issues an instruction to perform diaphragm control of the diaphragm 3. In response to this, the Lucom 5 controls the diaphragm drive mechanism 4, and sets the diaphragm 3 of the lens unit 12 to have a predetermined diaphragm value. Setting of the diaphragm is carried out based on an arithmetic operation result (calculated Av value) at the step S417. Thereafter, the control advances to processing at a step S423.

At the step S423, the Bucom 50 controls a mirror drive mechanism and executes processing to move a pentaprism 13b to a predetermined retired position, i.e., mirror up (UP) control processing. Then, the control advances to processing at a step S424.

At the step S424, the Bucom 50 performs an open (OPEN) control to causes a front curtain of the shutter portion 14 to travel by controlling a shutter control circuit 31. Then, the control advances to processing at a step S425.

At the step S425, the Bucom 50 executes driving and control of the imaging element 27 through a CCD interface circuit 34, and executes a predetermined imaging operation, i.e., a series of drive processing to acquire image data. An exposure time concerning the imaging at this time is set based on an arithmetic operation result (calculated Tv value) at the step S417. Then, the control proceeds to processing at a step S426.

At the step S426, the Bucom 50 performs a close (CLOSE) control to the shutter portion 14 to cause a back curtain to travel by controlling the shutter control circuit 31. Thereafter, the control advances to processing at a step S427.

At the step S427, the Bucom 50 executes processing to move the quick return mirror 13b to a predetermined position on the optical axis by controlling the mirror drive mechanism, i.e., mirror down (DOWN) control processing. At the same time, the Bucom 50 also performs a shutter charge control in the shutter portion 14 through a shutter charge mechanism 19. Then, the control advances to processing at a step S428.

At the step S428, the Bucom 50 issues an instruction to perform a closing control of the diaphragm to a set position 3 by performing communication with the Lucom 5 through the communication connector 6. In response to this, the Lucom 5 controls the diaphragm drive mechanism 4, and returns the diaphragm 3 of the lens unit 12 to an initial state, i.e., a release position. Then, the control advances to processing at a step S429.

At the step S429, the Bucom 50 controls the image processing controller 40a or the like, and executes data recording operation to convert an image signal acquired by the imaging element 27 into image data in an optimum conformation and record a result in the recording medium 39. Thereafter, the control returns to the processing at the step S404, and the subsequent processing is carried out.

Figure 33:
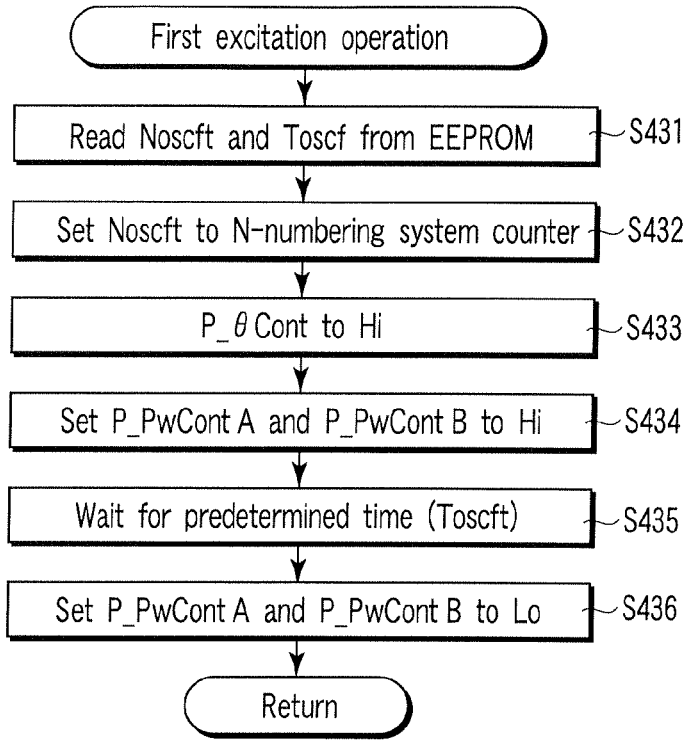
FIG. 33 is a flowchart showing the detail of first exciting operation processing of the body control microcomputer in the camera.

FIG. 33 is a flowchart showing the detail of first excitation operation processing which is a sub-routine of the Bucom 50. This first excitation operation processing is an operation flowchart when generating a flexural progressive wave to the anti-dust filter 21 as described above, and corresponds to processing at the steps S402, S409 and S413 in FIG. 32.

At a step S431, the Bucom 50 reads a predetermined count value Noscft and a time value Toscft in information previously recorded in the EEPROM 29, and then the control advances to processing at a next step S432.

At the step S432, the count value Noscft read at the above-described step S431 is set in the N-numbering system counter 41. Thereafter, the control advances to processing at a step S433. At the step S433, P_θCont of the Bucom 50 is set to High. Thereafter, the control advances to processing at a step S434.

At the step S434, P_PwContA and P_PwContB of the Bucom 50 are set to High. Then, the control advances to processing at a step S435.

At the step S435, the standby mode is effected for a predetermined time Toscft read at the step S431 mentioned above. Then, when this predetermined time Toscft elapses, the control advances to processing at a next step S436.

At the step S436, P_PwContA and P_PwContB of the Bucom 50 to set to Low. Thereafter, the first excitation operation processing is terminated, and the control returns to a predetermined processing step in FIG. 32 (return).

Figure 34:
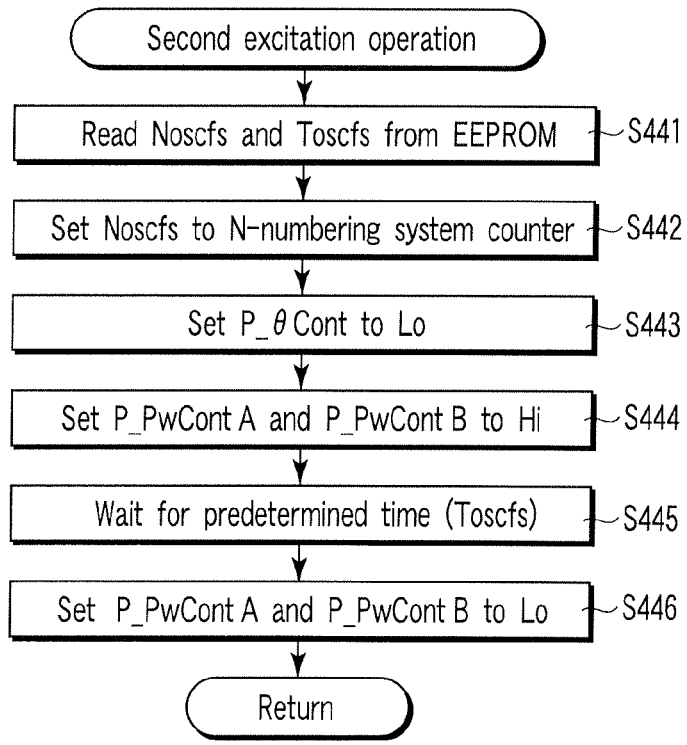
FIG. 34 is a flowchart showing the detail of second exciting operation processing of the body control microcomputer in the camera.

FIG. 34 is a flowchart showing the detail of second excitation operation processing which is a sub-routine of the Bucom 50 in this camera 1. This second excitation operation processing is an operation flowchart when generating a standing wave in the anti-dust filter 21 as described above, and corresponds to processing at the steps S403, S410 and S414 in FIG. 32.

At a step S441, the Bucom 50 reads a predetermined count value Noscft and a time value Toscft in information previously recorded in the EEPROM 29, and thereafter the control proceeds to processing at a next step S442.

At the step S442, the count value Noscft read at the step S441 mentioned above is set in the N-numbering system counter 41. Then, the control advances to processing at a step S443. At the step S443, P_θCont of the Bucom 50 is set to Low. Thereafter, the control proceeds to processing at a step S444. At the step S444, P_PwContA and P_PwContB of the Bucom 50 are set to High. Thereafter, the control advances to processing at a step S445.

At the step S445, the standby mode is effected for a predetermined time Toscft read at the step S441. Then, when this predetermined time Toscft elapses, the control advances to processing at a next step S446.

At the step S446, P_PwContA and P_PwContB of the Bucom 50 are set to Low. Then, this second excitation operation processing is terminated, and the control returns to a predetermined processing step shown in FIG. 32 (return).

As described above, according to one embodiment, when performing the operation to remove the dust or the like by adding the vibration to the anti-dust filter 21, the anti-dust filter 21 can vibrate in the different vibration conformations, i.e., the flexural progressive wave and the standing wave, and these vibration conformations can be arbitrarily switched. Therefore, the dust or the like which has adhered to the surface of the anti-dust filter 21 can be further assuredly removed.

It is to be noted that the standing wave is generated after producing the flexural progressive wave in the above-described embodiment, but the standing wave may be generated first. Further, the both waves may be alternately produced. The advantages obtained in such a case are the same as those in the foregoing embodiments.

In the above-described embodiment, although the piezoelectric elements 22a and 22b are attached on the both sides of the anti-dust filter 21 at the outer peripheral edge portion thereof, the same advantages can be obtained even if these elements are configured in a conformation different from this example.

Figure 35:
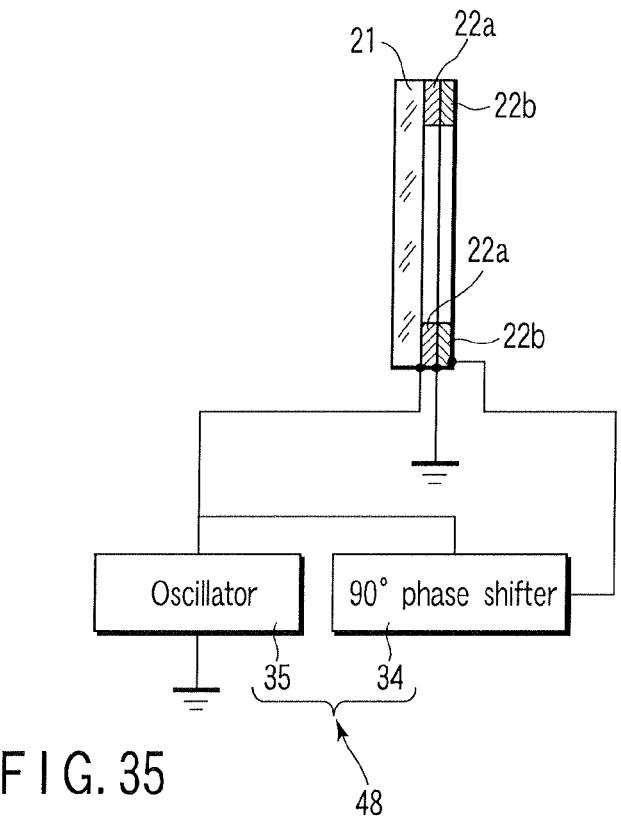
FIG. 35 is a view showing an arrangement of an anti-dust filter and a piezoelectric element according to a first modification of a third embodiment of the present invention.

For example, in a first modification shown in FIG. 35, the piezoelectric elements 22a and 22b are provided on only one side of the anti-dust filter 21 at the outer peripheral edge portion. In this case, only difference is that the piezoelectric elements 22a and 22b are arranged in the laminated state. Any other structure is the same as that in the foregoing embodiments.

Even if such a structure is adopted, completely the same advantages as those in the above embodiments can be obtained. In addition to this, since the piezoelectric elements 22a and 22b are provided on one surface of the anti-dust filter 21 which is a surface opposed to the light receiving surface of the imaging element 27, the internal space can be efficiently utilized. Consequently, the entire apparatus can be prevented from being large in size.

Figure 37:
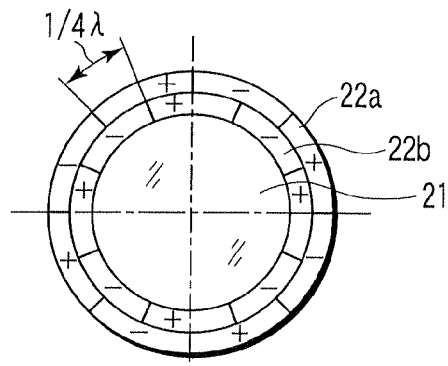
FIG. 37 is a view showing an arrangement and polarization of the piezoelectric element depicted in FIG. 36.
Figure 36:
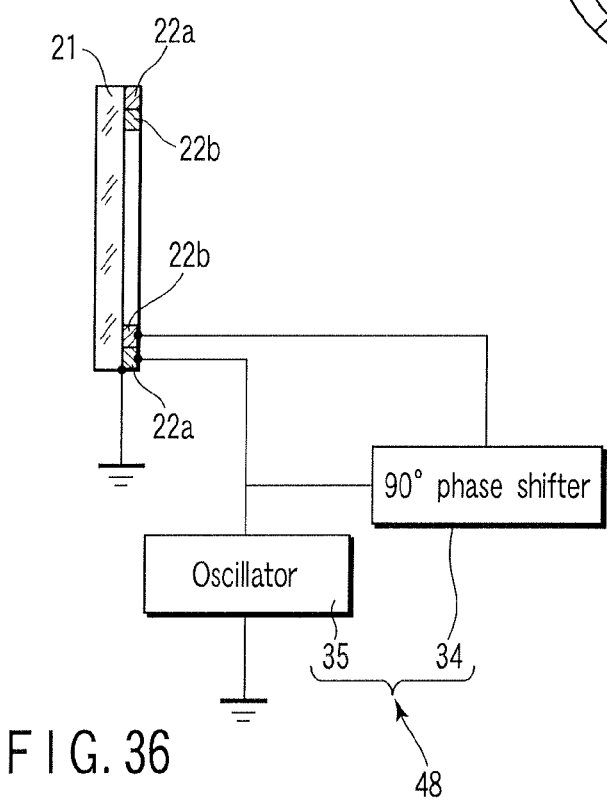
FIG. 36 is a view showing an arrangement of an anti-dust filter and a piezoelectric element according to a second modification of the third embodiment of the present invention.

Furthermore, for example, in a second modification shown in FIGS. 36 and 37, although the piezoelectric elements 22a and 22b are provided on only one side of the anti-dust filter 21 at the outer peripheral edge portion thereof like the first modification, a difference of this example lies in that the piezoelectric element 22a is provided at the outer peripheral edge portion of the anti-dust filter 21 and the piezoelectric element 22b is arranged at an adjacent position on the inner peripheral side away from the piezoelectric element 22a.

In this case, the piezoelectric element 22b arranged on the inner peripheral side is arranged by shifting a polarity position in such a manner that it deviates from the piezoelectric element 22a on the outer peripheral side by ¼ wavelength ($\lambda$). Any other structure is the same as that in the foregoing embodiments.

Even if such a structure is adopted, completely the same advantages as those in the foregoing embodiments can be obtained. Moreover, like the first embodiment, the internal space can be efficiently utilized, and the entire apparatus can be prevented from being increased in size.

Additionally, for example, in a third modification shown in FIGS. 38 and 39, the piezoelectric elements 22a and 22b are provided on only one side of the anti-dust filter 21 at the outer peripheral edge thereof like the first modification and the second modification mentioned above, and a difference of this example lies in that the piezoelectric element 22a is provided at the outer peripheral edge portion of the anti-dust filter 21 and the piezoelectric element 22b is arranged at a position which is on the inner peripheral side away from the piezoelectric element 22a and shifted by ¼ wavelength ($\lambda$). Further, each of the piezoelectric elements 22a and 22b is formed in such a manner that one surface thereof has the same polarity. Any other structure is the same as the above-described embodiment.

Furthermore, in this case, a concentric flexural vibration is generated to the anti-dust filter 21.

Even if such a structure is adopted, completely the same advantages as those in the above-described embodiment can be obtained. Moreover, like the first modification and the second modification, the internal space can be efficiently utilized, and the entire apparatus can be prevented from being increased in size.

Fourth Embodiment

Figure 40:
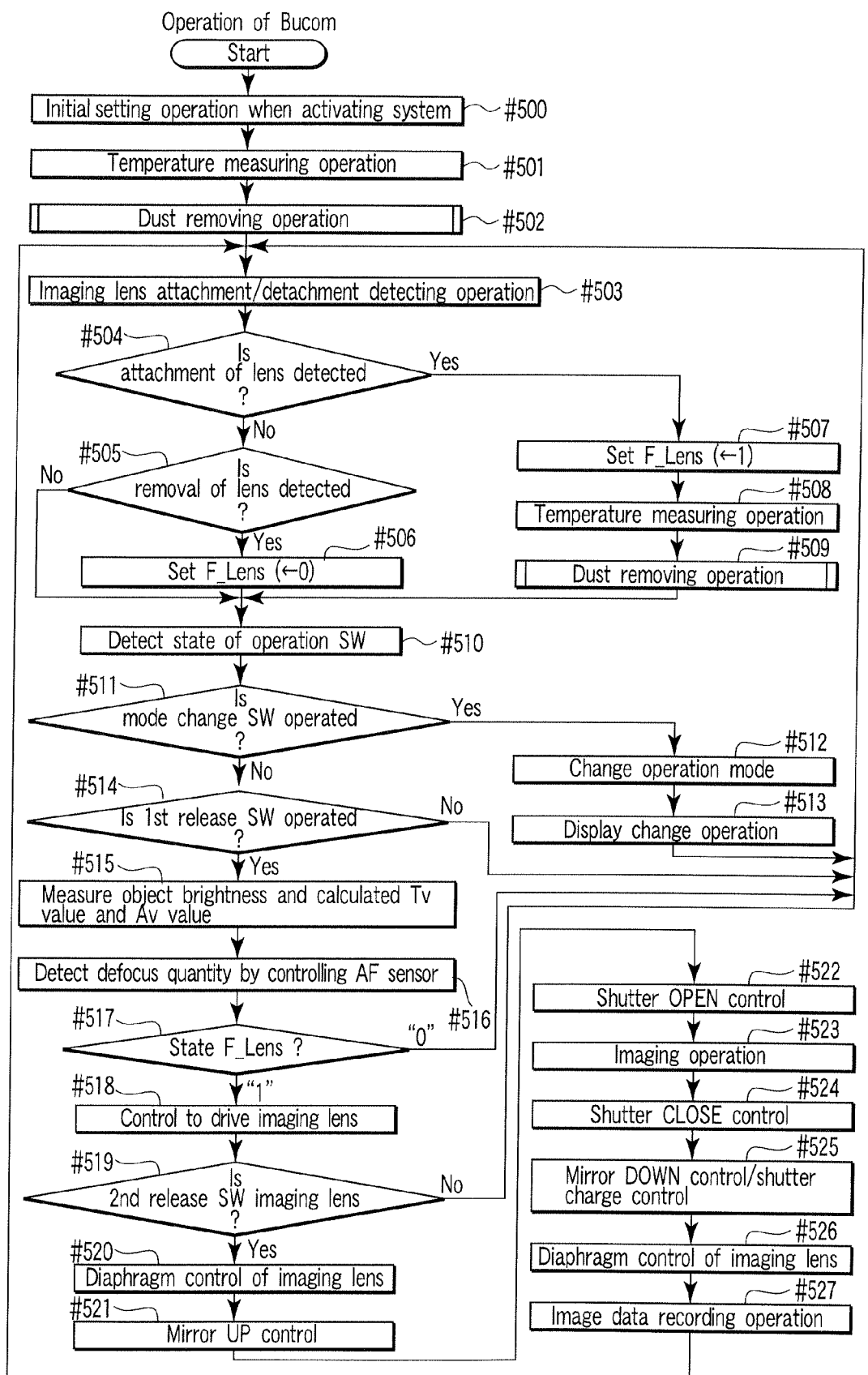
FIG. 40 is a flowchart showing a main routine of a control program executed by a body control microcomputer (Bucom) in a fourth embodiment.

A fourth embodiment according to the present invention will now be described hereinafter. In this case, reference is appropriately made to the drawings used in the first embodiment. Here, description will be given as to the control executed by the Bucom 50 in the fourth embodiment according to the present invention. FIG. 40 shows a main routine of a control program executed in the Bucom 50. First, when a power supply SW (not shown) of the camera is turned on, the Bucom 50 starts the operation, and processing to activate the camera system is executed at #500. The power is supplied to each circuit unit constituting the camera system by controlling a power supply circuit 53a. Moreover, the initial setting of each circuit is effected.

At #501, current temperature data is fetched from the temperature measurement circuit 33. This temperature data is information used in an operation routine at #502 which follows according to needs. At #502, the sub-routine "dust removing operation" is called and executed. In this sub-routine, the dust removing operation is executed by vibrating the anti-dust filter 21. By executing this operation when activating the power supply, the dust which has adhered to the glass (anti-dust filter 21) can be unintentionally removed in a period that this camera is not used for imaging. It is to be noted that the detailed operation of this sub-routine "dust removing operation" will be described later.

503 is a step which is cyclically executed and is an operation step used to detect a state of the lens unit 12 by performing the communication operation with the Lucom 5.

When it is detected that the lens unit 12 is attached to the body unit 100 at #504, the processing advance to #507. On the other than, when it is detected that the lens unit 12 is removed from the body unit 100, the processing advances from #505 to #506. Then, the control flag F_Lens is set to "0" at #506. It is to be noted that this control flag indicates "1" in a period that the lens unit 12 is attached to the body unit 100 of the camera, and indicates "0" in a period that the lens unit 12 is removed.

At #507, the control flag F_Lens is set to "1". The operation to measure a temperature is carried out at #508, and the sub-routine "dust removing operation" to remove the dust of the anti-dust filter 21 is called and executed at #509 immediately after #508. Then, the processing advances to #510.

Usually, in a period that the lens unit 12 is not attached to the body unit 100, a possibility that the dust may adhere to the lens, the anti-dust filter 21 or the like is high. Therefore, it is desirable to execute the operation to remove the dust with a timing that attachment of the lens unit 12 is detected. Thus, although cyclic execution of the operations at #508 and #509 can be considered, it is often the case that the anti-dust filter 21 is vibrated in a state that no dust is attached, which lead to a high possibility that power is wastefully consumed. Therefore, in this embodiment, the operation to remove the dust depending on presence/absence of attachment of the lens is executed.

At #510, a state of the camera operation SWs 52 is detected. Further, when the ON state of the mode change SW (not shown) which is one of the camera operation SWs 52 is detected at #511, the processing advances to #512.

The operation mode of the camera is changed in cooperation with the operation of the mode change SW at #512, and information according to the operation mode is displayed and outputted in an operation display LCD 57. Then, the processing returns to #503.

On the other hand, when the ON state of the camera operation SW 52 is detected at #510, the processing advances to #514. At #514, a judgment is made upon whether a 1st release SW (not shown) which is one of the camera operation SWs 52 is operated. If the 1st release SW is in the ON state, the processing advances to #515. If it is in the OFF state, the processing returns to #503.

At #515, the brightness information of the object is obtained from the photometric circuit 32. Furthermore, an exposure time (Tv value) of the imaging element 27 and a diaphragm set value (Av value) of the imaging optical system 12a are calculated from this information.

At #516, detection data of the AF sensor unit 30a is obtained through the AF sensor drive circuit 30b. A defocus quantity is calculated based on this data.

Here, at #517, a state of the control flag F_Lens is judged. If F_Lens is "0", this means that the lens unit 12 is not attached. Therefore, the imaging operation at #518 and subsequent steps cannot be executed. Therefore, in this case, the processing returns to #503.

On the other hand, if F_Lens is "1", the defocus quantity calculated at #516 is transmitted to the Lucom 5 and driving of the imaging optical system 12a based on this defocus quantity is instructed at #518.

At #519, a judgment is made upon whether a 2nd release SW (not shown) which is one of the camera operation SWs 52 is operated. When this 2nd release SW is in the ON state, the processing advances to #520, and a predetermined imaging operation is carried out. On the other hand, if it is in the OFF state, the processing returns to #503.

At #520, the Av value is transmitted to the Lucom 5, and driving of the diaphragm 3 is instructed. Then, at #521, the quick return mirror 13b is moved to the UP position. Subsequently, traveling of a front curtain of the shutter portion 14 is started at #522, and execution of the imaging operation is instructed to the image processing controller 40 at #523. When a time indicated by the Tv value and exposure to the imaging element 27 are completed, traveling of the back curtain of the shutter portion 14 is started at #514, and the quick return mirror 13b is driven to the Down position at #525. Furthermore, at the same time, the charge operation of the shutter portion 14 is carried out.

Then, at #526, an instruction is issued to the Lucom 5 to return the diaphragm 3 to the fully open position. At #527, an instruction is issued to the image processing controller 40 to record the picked-up image data to the recording medium 39. Upon completion of recording of the image data, the processing returns to #503.

Figure 41:
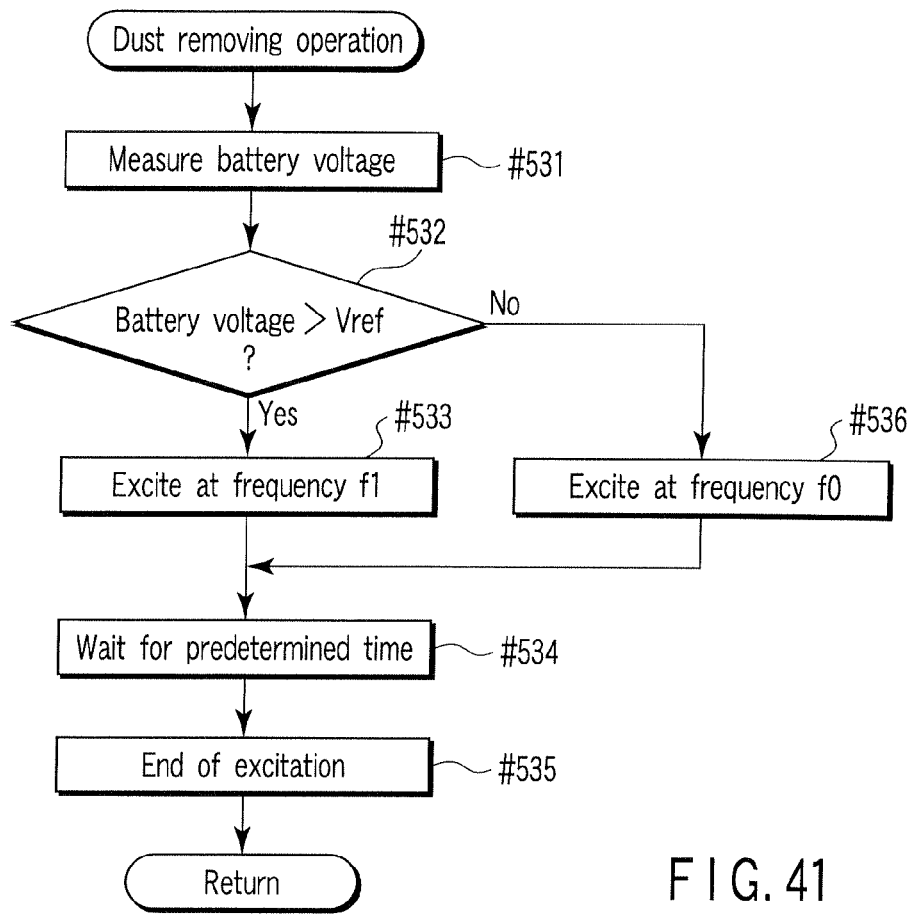
FIG. 41 is a flowchart illustrating a dust removing sub-routine.

FIG. 41 is a flowchart for illustrating the dust removing sub-routine. In this sub-routine, there is exercise the ingenuity to avoid an accident that the anti-dust filter 21 is destroyed because of a too high battery voltage and an increase in amplitude of the anti-dust filter 21. Moreover, FIG. 42 is a distribution map showing a relationship between an excitation frequency and an vibration amplitude of the anti-dust filter 21 when vibrating the anti-dust filter 21 in order to explain the concept.

Figure 42:
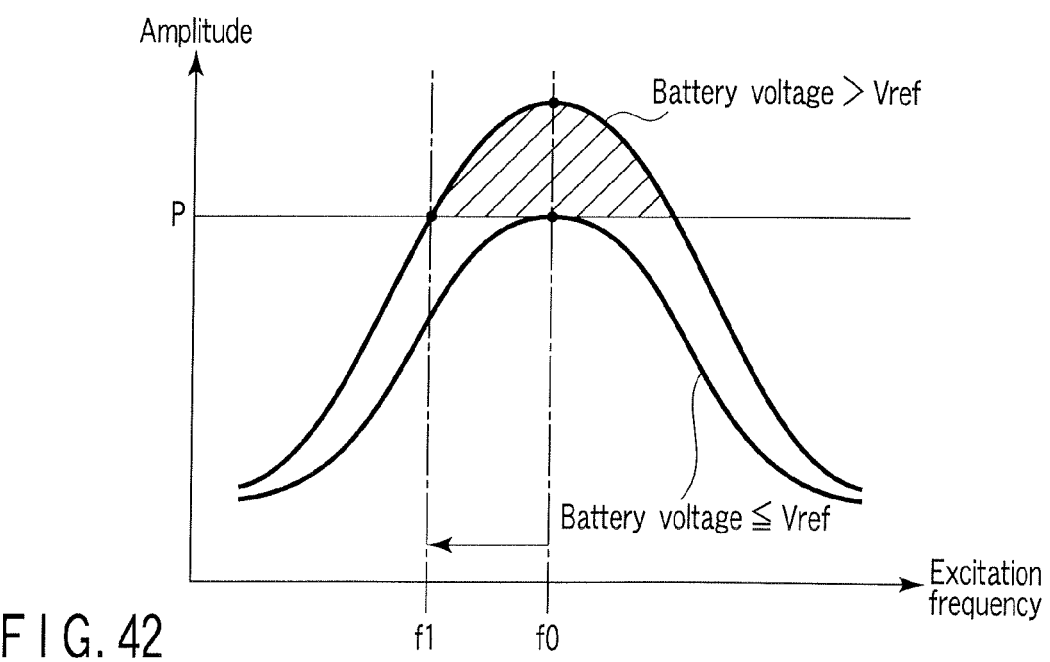
FIG. 42 is a distribution map showing a relationship between an exciting frequency and an oscillation amplitude of the anti-dust filter when vibrating the anti-dust filter.

In FIG. 42, a horizontal axis indicates a frequency (excitation frequency) with which the anti-dust filter 21 is vibrated, and a vertical axis indicates an amplitude of the anti-dust filter 21. As described above, the anti-dust filter 21 has a maximum amplitude around the resonance frequency (denoted by f0 in the drawing). However, when the battery voltage is higher than a given level (Vref), the anti-dust filter 21 exceeds an amplitude limit value P, and it vibrates in an area where destruction may possibly occur (in the drawing, this area is indicated by slant lines, and this will be referred to as a "dangerous area" hereinafter). A width of the dangerous area relative to the excitation frequency spreads with the resonant point in the center as the battery voltage becomes higher. On the other hand, when the battery voltage is not more than Vref, the maximum amplitude does not reach the dangerous area even if the filter vibrates with the resonance frequency. Thus, this Vref is defined as a "voltage that the anti-dust filter 21 may be possibly destroyed when the anti-dust filter 21 is vibrated at the resonance frequency".

In order to avoid the above-described "accident that the anti-dust filter 21 is destroyed because of the too high battery voltage", providing a voltage reducing circuit such as a regulator can suffice, but this leads to a complicated circuit configuration in this case. Therefore, it cannot be said that this is a good countermeasure.

Accordingly, in this embodiment, only when the battery voltage is higher than Vref, the excitation frequency is shifted from the resonance frequency f0 of the anti-dust filter 21, and the anti-dust filter 21 is set to be vibrated with a frequency f1 that the amplitude does not exceed a limit value P. This frequency f1 is referred to as a "safe frequency" or a "non-destruction frequency" for the sake of convenience.

The dust removing operation will now be described with reference to FIG. 41. First, at #531, a battery voltage is measured. This is carried out by performing A/D conversion to the battery voltage by using the ADC included in the Bucom 50.

Subsequently, a judgment is made upon whether the measured battery voltage is higher than Vref at #532. Moreover, if the battery voltage is higher than Vref, the processing advances to #533. On the other hand, if it is not higher, the processing proceeds to #536.

If the battery voltage is not more than Vref, the anti-dust filter 21 is not destroyed even if it is vibrated at the resonance frequency. Therefore, the excitation frequency is set to the resonance frequency f0 and the excitation operation is then started. Thereafter, the processing advances to #534. It is to be noted that the resonance frequency corresponds to a first frequency described in the claims.

On the other hand, when the battery voltage is higher than Vref, since it is dangerous to vibrate the filter at the resonance frequency, the excitation frequency is set to f1 (safe frequency) at #533, and the processing advances to #534. It is to be noted that the safe frequency correspond to a second frequency described in the claims.

A standby mode is effected for a predetermined time, e.g., approximately 100 ms at #534, and the excitation operation of 100 ms is thereby carried out. Thereafter, the excitation operation is terminated at #535. Then, the processing returns to the main routine.

It is to be noted that two types of frequencies used in this example vary depending on irregularities or assembling states of components used in the dust removing mechanism including the anti-dust filter 21, and they are frequencies inherent to the anti-dust filter 521. Therefore, these frequency values are measured when assembling the anti-dust mechanism and stored in the EEPROM 29 in accordance with each camera, and they are read and used when executing the dust removing operation. Additionally, as described above, since these frequencies may vary due to a change in temperature, a temperature is measured by the temperature measurement circuit 33, and these frequencies are corrected in accordance with the measured temperature.

As described above, according to the fourth embodiment of the present invention, when the battery voltage is higher than a predetermined voltage, the excitation frequency is shifted from the resonance frequency f0 of the anti-dust filter, and the anti-dust filter is vibrated in a range that the anti-dust filter cannot be destroyed. Therefore, the anti-dust filter is not destroyed even if the battery voltage is high.

(Modification)

This modification will now be described with reference to FIG. 43. It is to be noted that constituent parts of the imaging apparatus according to this modification are equal to those in the first embodiment, thereby omitting their explanation. Further, the operation in the main routine of the control program executed by the Bucom 50 is the same as that in the first embodiment, thereby eliminating its explanation.

Figure 43:
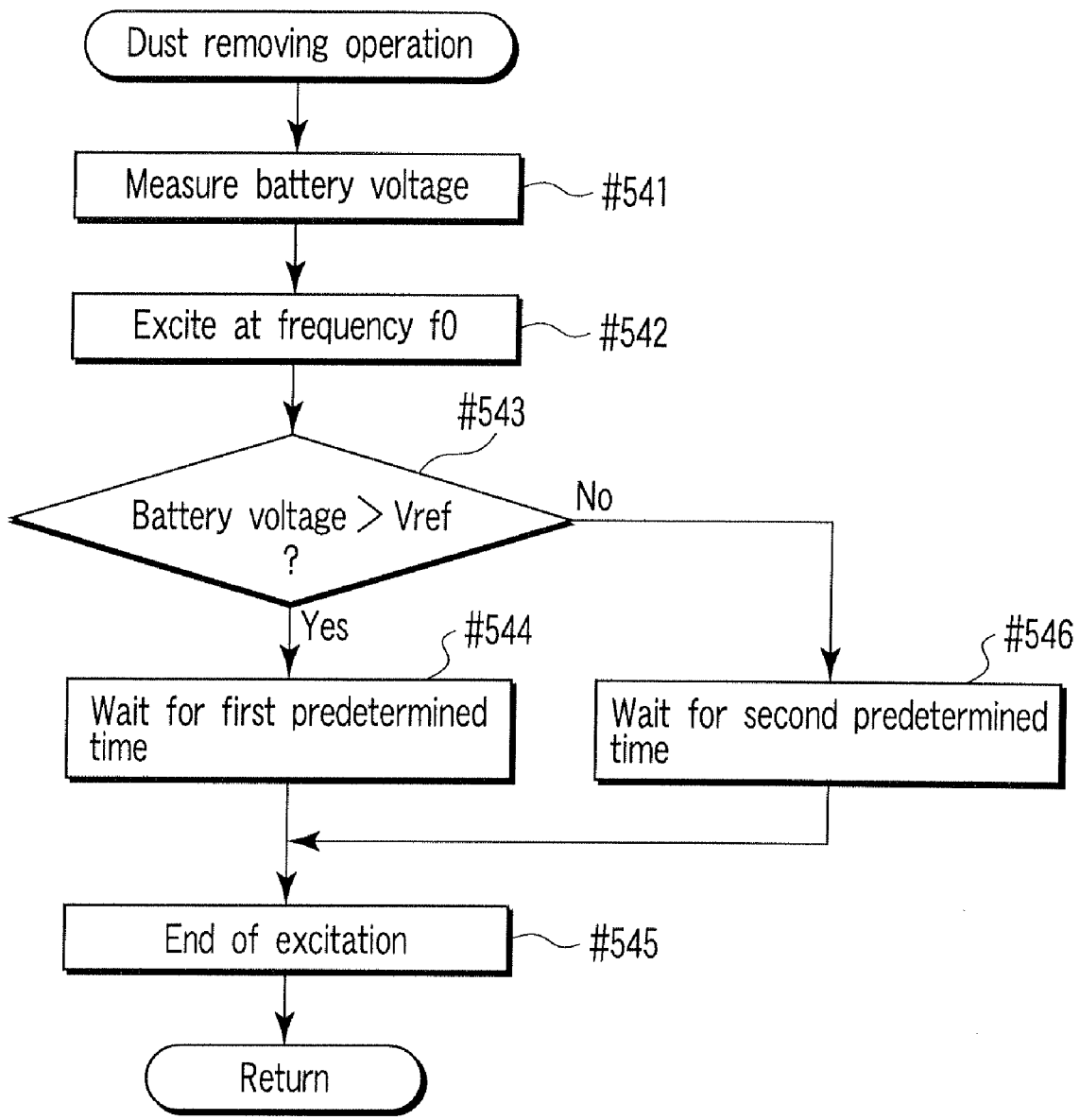
FIG. 43 is a flowchart for illustrating a dust removing sub-routine in a modification of the fourth embodiment according to the present invention.

FIG. 43 is a flowchart showing the dust removing sub-routine of the imaging apparatus according to this modification. Although destruction of the anti-dust filter 21 is avoided by changing the excitation frequency in the fourth embodiment, a drive time is adjusted in accordance with a battery voltage in this modification. This is based on an idea that the risk of destruction may be lowered if the time in which the filter is vibrated is short even though the battery voltage is higher than Vref.

First, at #541, a battery voltage is measured. This is the same #531 in FIG. 41. Then, at #542, vibration at the frequency f0 (resonance frequency( ) is started.

Thereafter, at #543, a judgment is made upon whether the battery voltage is higher than Vref. The processing advances to #544 and the standby mode is effected until a first predetermined time elapses if it is higher. On the other hand, if it is not higher, the processing advances to #546, the standby mode is effected until a second predetermined time elapses. Here, it is determined that the first predetermined time is set shorter than the second predetermined time. Then, the processing advances to #545, the excitation operation is terminated, and the control returns to the main routine.

Meanwhile, the above-described two predetermined times vary depending on irregularities of components used in the dust removing mechanism including the anti-dust filter 21, assembling situations or others like the resonance frequency f0 in the first embodiment or the safe frequency f1. Therefore, it is good enough to perform measurement during assembling or the like of the dust removing mechanism and store the result in a non-volatile memory such as the EEPROM 29 in accordance with an electronic imaging apparatus.

As described above, in this modification, when a battery voltage is higher than a given predetermined voltage, the excitation time is shortened and the excitation operation is terminated before the anti-dust filter is destroyed. Therefore, the anti-dust filter is not destroyed even if the battery voltage is high.

Although the present invention has been described based on the foregoing embodiments, the present invention is not restricted thereto, and it is needless to say that various kinds of modifications or applications are possible within the scope of the present invention.

Fifth Embodiment

A fifth embodiment according to the present invention will now be described hereinafter. Here, description will be given as to a concrete control operation executed by the Bucom 50 according to the fifth embodiment with reference to FIGS. 44 to 46.

Figure 44:
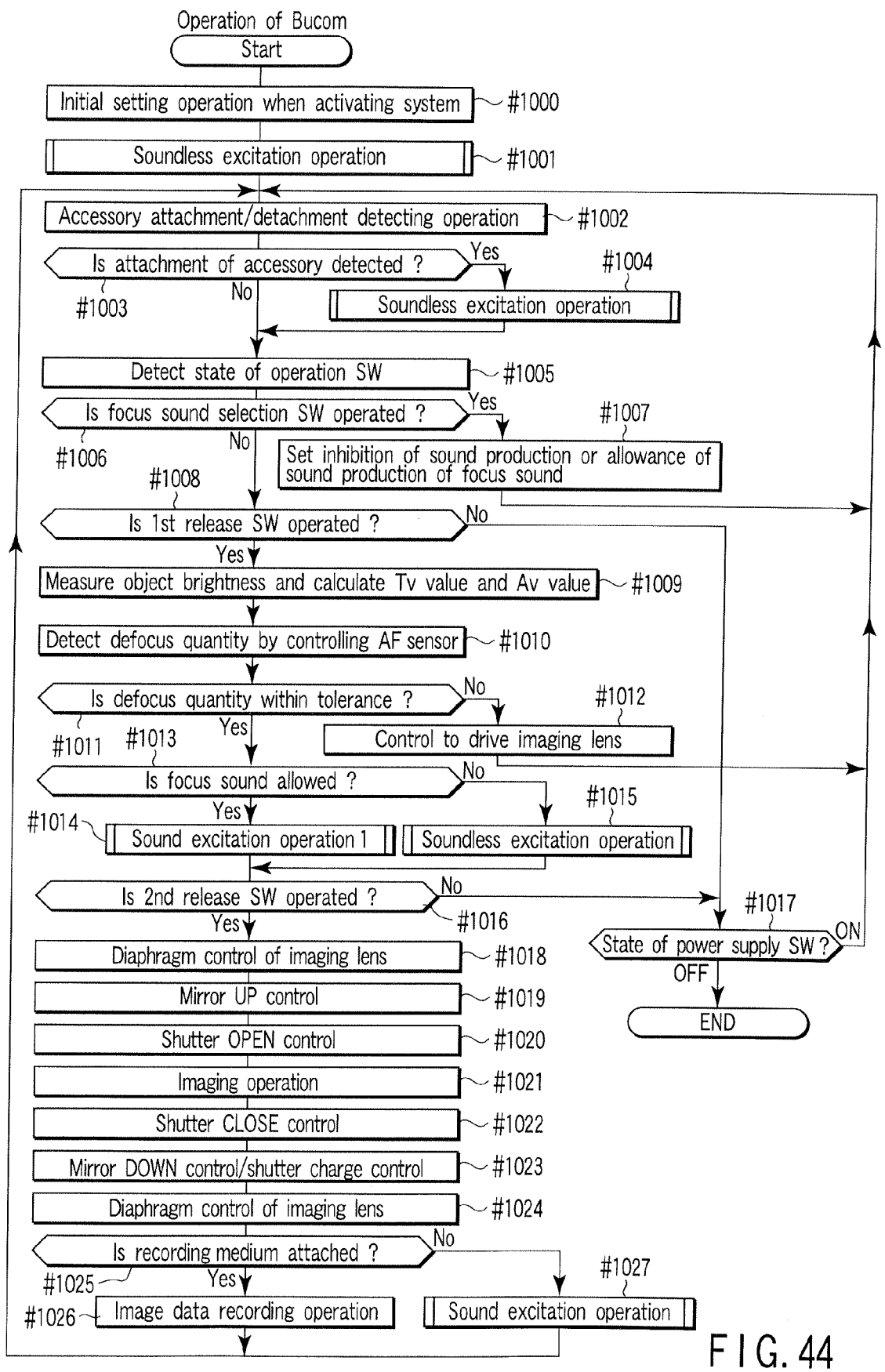
FIG. 44 is a flowchart showing an operation control in a camera sequence (main routine) executed by a control microcomputer of an electronic camera.
Figure 45:
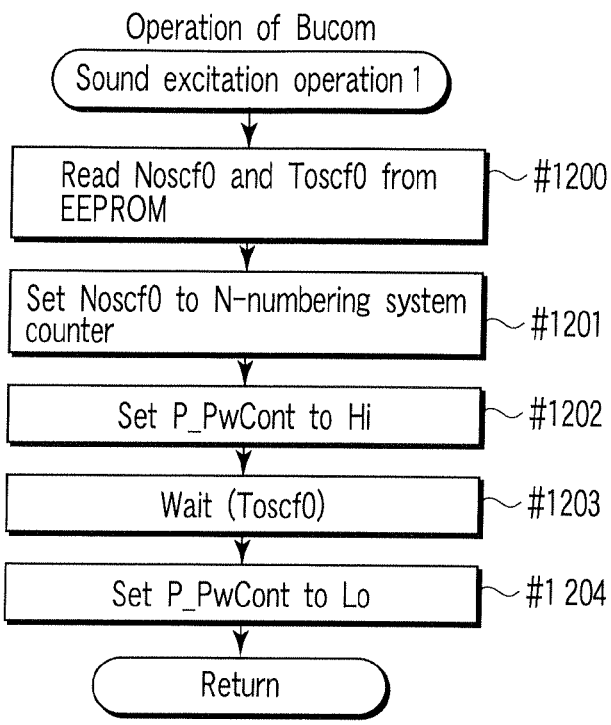
FIG. 45 is a flowchart showing an operation procedure of a sub-routine "soundless exciting operation"
Figure 46:
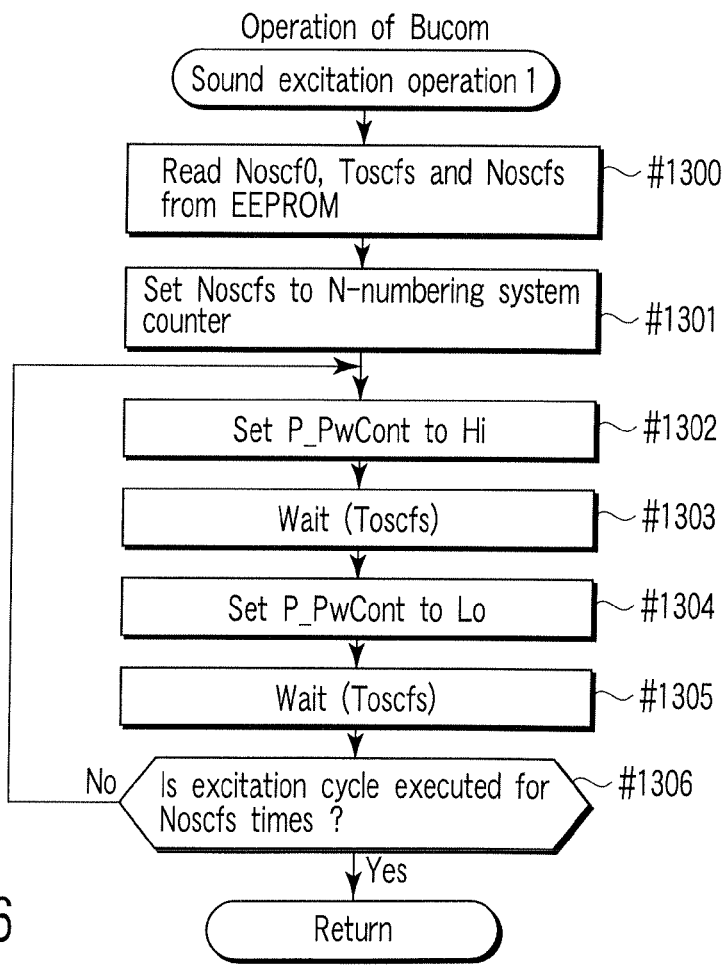
FIG. 46 is a flowchart showing an operation procedure of a sub-routine "sound exciting operation 1"
Figure 47:
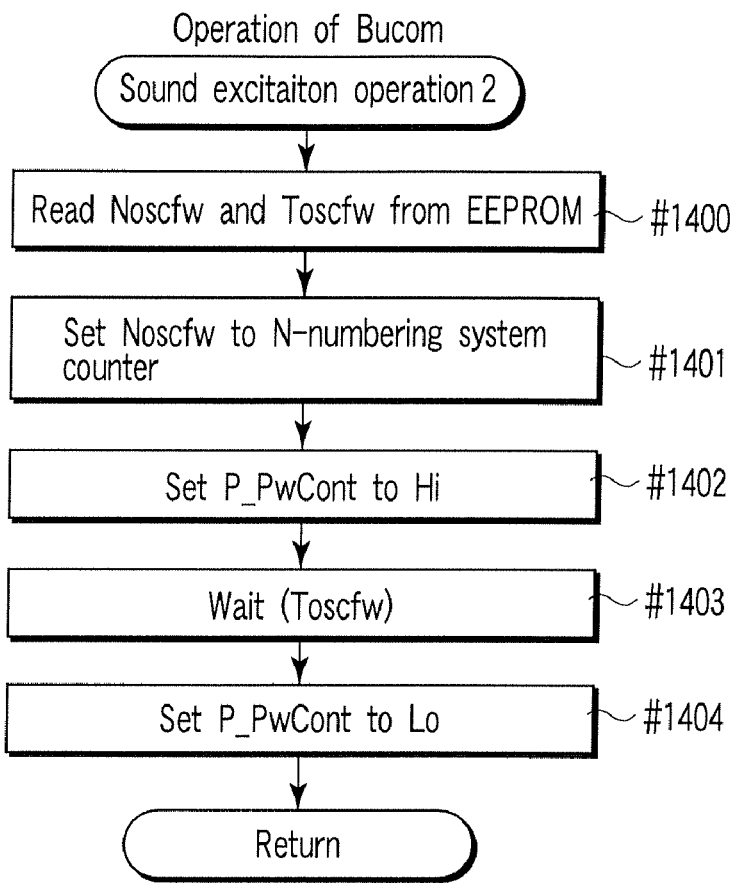
FIG. 47 is a flowchart showing an operation procedure of a sub-routine "sound exciting operation 2"

FIG. 44 shows an operation control of the camera according to this embodiment in the form of a flowchart, and exemplifies a procedure of a camera sequence (main routine) performed by the Bucom 50. Further, FIG. 45 shows a procedure of a sub-routine "soundless excitation operation" in the form of a flowchart, and FIGS. 46 and 47 show procedures of sub-routines "sound excitation operation 1" and "sound excitation operation 2" in the form of flowcharts.

A control program according to the flowchart illustrated in FIG. 44 which can be executed by the Bucom 50 starts its operation when a power supply SW (not shown) of the camera 1 is turned on.

First, at #1000, processing to activate the camera system is executed. The power is supplied to each circuit unit constituting the camera system by controlling a power supply circuit 53a. Further, the initial setting of each circuit is performed.

At #1001, an anti-dust filter 21 is vibrated soundlessly (that is, out of an audible range) by calling the later-described "soundless excitation operation" (see FIG. 45). It is to be noted that the audible range used herein is determined as falling within a range of approximately 20 Hz to 20000 Hz with the audibility of a commoner being used as a reference.

The subsequent #1002 to #1027 are a step group which is cyclically executed. That is, #1002 is a step to detect attachment/detachment of an accessory with respect to the camera (e.g., the attachment/detachment detection operation to detect that a lens unit 12 as one of accessories is attached to a body unit 100 checks the attachment/detachment state of the lens unit 12 by performing communication with the Lucom 5).

If it is detected that a predetermined accessory is attached to the camera main body at #1003, the anti-dust filter 21 is vibrated soundlessly by calling the sub-routine "soundless excitation operation" at #1004.

As described above, since a possibility that the dust adheres to each lens, the anti-dust filter 21 or the like is particularly high in a period that the an accessory, especially the lens unit 12 is not attached to the body unit 100 which is the camera main body, it is effective to execute the operation to remove the dust with a timing that attachment of the lens unit 12 is detected as described above. Further, since a possibility that the outside air circulates in the camera when replacing the lens and the dust enters and adheres is high, it is significant to remove the dust when replacing the lens. Furthermore, the state is regarded as immediately before imaging, and the processing advances to #1005.

On the other hand, if it is detected that the lens unit 12 is removed from the body unit 100 at #1003, the processing advances to the next #1005 directly.

At #1005, the state of a predetermined operation switch included in the camera is detected. At #1006, whether a focus sound selection SW (not shown) which is one of the operation switches is operated is judged based on the ON/OFF state of that SW. When that state is read and if this focus sound selection SW is operated, setting of a mode corresponding to either a "sound inhibiting" mode or a "sound allowing" mode selected by a user is set. Thereafter, the processing returns to #1001, the same processing step is again carried out.

At #1008, whether a 1st. release SW (not shown) forming a release SW is operated is judged based on the ON/OFF state of that SW. When this state is read and if the 1st. release SW is not turned on for a predetermined time or more, the processing advances to the later-described #1017, thereby performing end processing (sleep and the like).

On the other hand, if the 1st. release SW is turned on, brightness information of an object is obtained from a photometric circuit 32 at #1009. Furthermore, an exposure time (Tv value) of the imaging element 27 and a diaphragm set value (Av value) of the lens unit 12 are calculated from this information.

Then, at #1010, detection data of the AF sensor unit 30a is obtained through an AF sensor drive circuit 30b. A defocus quantity is calculated based on this data. At #1011, a judgment is made upon whether the calculated defocus quantity falls within an allowed range. If it is out of the range, the drive control of the imaging lens is carried out at #1012, and the processing returns to #1002.

On the other hand, if the defocus quantity falls within the allowed range, a judgment is made upon whether a focus sound is allowed at #1013. If it does not fall within that range, the sub-routine "soundless excitation operation" is called and the anti-dust filter 21 is vibrated at #1015. However, if it is allowed, the sub-routine "sound excitation operation" (see FIG. 46) is called and the anti-dust filter 21 is vibrated with sound (that is, within the audible range) at #1014 (that is, the fact that the focusing is achieved is notified as a confirmation sound and the dust removal is carried out at this step).

Moreover, at #1016, a judgment is made upon whether a 2nd. release SW (not shown) forming a release SW is turned on. When the 2nd. release SW is in the ON state, the processing advances to the subsequent #1018, and a predetermined imaging operation (detail will be described later) is started. However, when it is in the OFF state, the processing proceeds to #1017, and end processing is executed.

It is to be noted that an electronic imaging operation in a time corresponding to a second time (exposure second time) preset for exposure is controlled as usual in the imaging operation.

As the above-described imaging operation, from #1018 to #1024, imaging of the object is effected in a predetermined order. First, the Av value is transmitted to the Lucom 5, driving of the diaphragm 3 is instructed (#1018), and a quick return mirror 13b is moved to an UP position (#1020). Then, traveling of a front curtain of the shutter portion 14 is started and the OPEN control is carried out (#1020), and execution of the "imaging operation" is instructed to an image processing controller 40 (#1021). Upon completion of exposure (imaging) to the imaging element 27 for a time indicated by the Tv value, traveling of a back curtain of the shutter portion 14 is started, and the CLOSE control is executed (#1022). Then, the quick return mirror 13b is driven to a Down position, and the charge operation of the shutter portion 14 is carried out (#1023).

Thereafter, the Lucom 5 is instructed to return the diaphragm 3 to the fully open position (#1024), and a series of the imaging operations is terminated. Subsequently, at #1025, whether the recording medium is attached to the camera main body is detected. If it is not attached, the sub-routine "sound excitation operation 2" (see FIG. 47) is called and the anti-dust filter 21 is excited with sound at #1027 (that is, the fact that attachment of the recording medium is not attached is notified as a warning sound and the dust removal is carried out at this step). Then, the processing returns to #1002, and the same series of operations is repeated. On the other hand, if the recording medium 39 is attached, the image processing controller 40 is instructed to record the picked-up image data in the recording medium 39 at #1026. When the recording operation of the image data is terminated, the processing returns to #1002, and the same series of processing is repeated.

A detailed relationship between the vibration conformation and the sound will now be described with reference to waveform graphs shown in FIGS. 48 to 50 while explaining the control procedures of the above-mentioned three sub-routines based on FIGS. 45 to 47. It is to be noted that this "vibration conformation" is a conformation of the vibration provoked by the exciting means, but this collectively means a phenomenon that a predetermined sound occurs in a plurality of conformations as a result of the excitation and the vibration.

FIG. 45 is a flowchart showing the operation procedure of the sub-routine "soundless excitation operation". FIG. 48 is a graph showing a waveform of a resonance frequency continuously supplied to the exciting means in this soundless excitation operation.

FIG. 46 is a flowchart showing the operation procedure of the sub-routine "sound excitation operation 1". FIG. 49 is a graph showing a waveform of a resonance frequency intermittently supplied to the exciting means and its intermittent cycle in the sound excitation operation 1.

Additionally, FIG. 47 is a flowchart showing the operation procedure of a sub-routine "sound excitation operation 2", and FIG. 50 is a graph showing a waveform of a frequency (2 kHz to 4 kHz) of a warning sound produced in the sound excitation operation 2.

Since the sub-routine "soundless excitation operation" shown in FIG. 45 is a routine which aims at the excitation operation only for the dust removal of the anti-dust filter 21, a vibration frequency f0 is set to a resonance frequency of the anti-dust filter 21. For example, in this case, since it is the vibration of 40 kHz or at least not less than 20 kHz, it is soundless to a user.

First, at #1200, data concerning a drive time (Toscf0) and a drive frequency (resonance frequency: Noscf0) used to vibrate the anti-dust filter 21 is read from information stored in a predetermined area in the EEPROM 29.

At #1201, the drive frequency Noscf0 is outputted from an output port D_NCnt of the Bucom 50 to an N-numbering system counter 41 of the anti-dust filter drive circuit 48.

At subsequent #1202 to #1204, the anti-dust removing operation is carried out as follows. That is, the dust removing operation is first started and executed. In order to perform this, when a control flag P_pwCont is set to Hi (High value) (#1202), a piezoelectric element 22 vibrates the anti-dust filter 21 at a predetermined drive frequency (Noscf0) and shakes off the dust which has adhered to the filter surface. In detail, when the dust which has adhered to the anti-dust filter surface is shaken off by the anti-dust removing operation, the air vibration simultaneously occurs, and the ultrasonic sound is generated (however, even if driving is carried out at the drive frequency Noscf0, a sound does not fall in an audible range of a commoner, and he/she cannot hear it). This is a "first vibration mode" described in claim 1. In this mode, a user can unintentionally remove the attached dust soundlessly in a period that the camera 1 is yet to be used for imaging.

The standby mode is effected for a predetermined drive time (Toscf0) in a state that the anti-dust filter 21 is vibrated (#1203). After elapse of the predetermined drive time (Toscf0), setting the control flag P_pwCont to Lo (Low value) stops the dust removing operation (#1204). (In detail, when the dust removing operation is stopped, the air vibration is simultaneously stopped and sound is ceased.) Then, the processing returns to a step followed by the called step.

Figure 48:
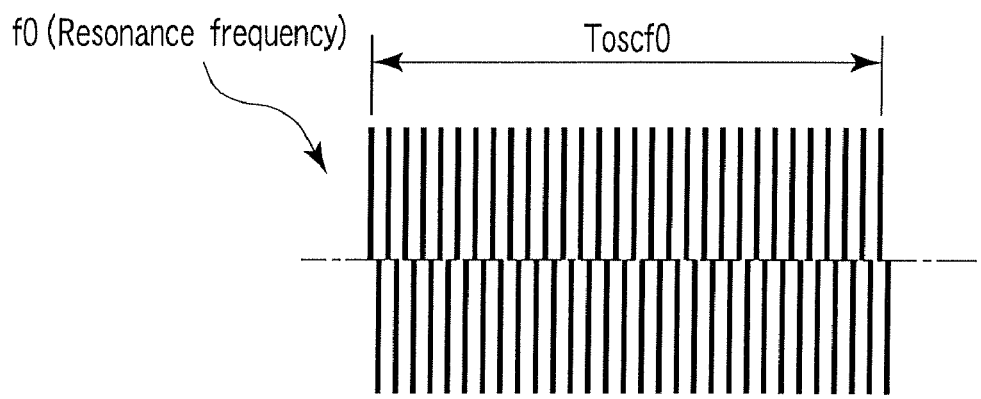
FIG. 48 is a graph showing a waveform of a resonance frequency continuously supplied to the exciting means.

The vibration frequency f0 (resonance frequency (Noscf0)) and the drive time (Toscf0) applied in this sub-routine demonstrate waveforms as shown in the graph of FIG. 48. That is, a fixed vibration (f0=40 kHz) has a continuous waveform which last for a time (Toscf0) sufficient for the dust removal.

That is, this vibration conformation adjusts and controls the resonance frequency supplied to the exciting means.

On the other hand, the sub-routine "sound excitation operation 1" shown in FIG. 46 is a routine intended to remove the dust of the anti-dust filter 21 and perform the excitation operation with sound in order to notify a user.

Therefore, here, although the vibration frequency f0 is set to the resonance frequency 40 kHz of the anti-dust filter 21 like the above, a frequency of the envelope is modulated to fall within at least an audible range (within 20 kHz) by intermittently performing the ON/OFF control to this vibration, thereby obtaining a frequency (fs) with the sound for a user.

At #1300, data concerning a drive time (Toscfs) and a drive frequency (resonance frequency: Noscfs) used to vibrate the anti-dust filter 21 is read from information stored in a predetermined area in the EEPROM 29.

At #1301, the drive frequency Noscfs is outputted to the N-numbering system counter 41 of the anti-dust filter drive circuit 48 from an output port D_NCnt of the Bucom 50.

At subsequent #1302 to #1306, the dust removing operation and the sound production operation are carried out as follows. It is to be noted that this corresponds to controlling the "second sound vibration state" described in claim 47.

That is, when the control flag P_pwCont is set to Hi (High value), the dust removing operation is started and executed. The piezoelectric element 22 vibrates the anti-dust filter 21 at a predetermined frequency (Noscfs), and shakes off the dust which has adhered to the filter surface (#1302). (however, when driving at the drive frequency Noscfs is performed, sound (frequency: fs) in an audible range of a commoner is produced, and he/she can hear it.) This is a "second vibration mode" described in claim 49.

The standby mode is effected in a state that the anti-dust filter 21 is vibrated for a predetermined drive time (Toscfs) (#1303). After elapse of the predetermined drive time (Toscfs), setting the control flag P_pwCont to Lo (Low value) stops the dust removing operation (#1304). The standby mode is again effected in a state that the dust removing operation is stopped for a predetermined drive time (Toscfs) (#1305).

Here, a judgment is made upon whether the excitation cycle is executed for the number of times of Noscfs (#1306). If it is not executed, the processing returns to #1302, and the same excitation cycle is executed.

If the number of times reaches the number of times of Noscfs, the processing returns to the step followed by the called step.

The above-described excitation cycle becomes an intermittent vibration conformation of the resonance frequency (f0), and it can be heard as a substantial sound of the frequency (fs).

The resonance frequency (f0) and the drive time (Toscf0) applied to this sub-routine show intermittent waveforms as shown in the graph of FIG. 49. That is the intermittent time interval is determined as an equal interval of Toscfs. Furthermore, a frequency (fs) of the envelope of the intermittent resonance frequency (f0) is represented by the following expression.

*fs*(frequency of the envelope indicated by a broken line)=½·*Toscfs*   (Expression)

Here, the intermittent time interval Toscfs is set to, e.g., 250 μsec. in such a manner that the frequency fs of the envelope falls within an audible range of, e.g., 2 kHz to 4 kHz. As described above, the vibration conformation adjusts and controls the ON/OFF timing of a signal power supplied to the exciting means. It is to be noted that the vibration state of the filter which can be used in this sub-routine is the primary vibration shown in FIGS. 6, 7 and 8. The secondary vibration shown in FIGS. 9, 10 and 11 has the vibration phases being shifted 180° at the peripheral portion and the central portion of the filter, and it cannot be used since acoustic fields are canceled out.

The sub-routine "sound excitation operation 2" represented in the flowchart of FIG. 47 is a routine which excites the anti-dust filter 21 in order to only produce a warning sound, for example. Therefore, the dust removing effect is secondary. In this case, a frequency of the warning sound is set to an audible sound (sound) of 2 kHz to 4 kHz.

At #1400, data concerning the drive time (Toscfw) and a drive frequency (resonance frequency: Noscfw) used to vibrate the anti-dust filter 21 are read from information stored in a predetermined area in the EEPROM 29.

At #1401, a drive frequency Noscfw is outputted to the N-numbering system counter 41 of the anti-dust filter drive circuit 48 from the output port D_NCnt of the Bucom 50.

At subsequent #1402 to #1404, the dust removing operation is carried out as follows. It is to be noted that this corresponds to controlling the "first sound vibration state" described in claim 46. That is, the dust removing operation is started and executed. In order to realize this, when the control flag P_pwCont is set to Hi (High value) (#1402), the piezoelectric element 22 vibrates the anti-dust filter 21 at a predetermined drive frequency (Noscfw), and shakes off the dust which has adhered to the filter surface. (However, driving is carried out at the drive frequency Noscfw, a sound in the audible range is produced, and it can be heard as a sound different from the confirmation sound of AF focusing mentioned above.)

As a result, in this period that the camera 1 is yet to be used for imaging, a user can unintentionally remove the attached dust.

The standby mode is effected in a state that the anti-dust filter 21 is vibrated for a predetermined drive time (Toscfw) (#1403). After elapse of the predetermined drive time (Toscfw), setting the control flag P_pwCont to Lo (Low value) stops the dust removing operation (#1404). Then, the processing returns to the step followed by the called step.

The frequency (fw) and the drive time (Toscfw) as the warning sound applied in this sub-routine demonstrate such waveforms as shown in the graph of FIG. 50. That is, the frequency (fw) has a continuous waveform which lasts for the drive time (Toscfw). Furthermore, it is likewise set to, e.g., 2 kHz to 4 kHz as mentioned above.

A difference between the "sound excitation operation 2" and the "sound excitation operation 1" is modes in which the vibration conformation are different to produce the sound. That is, as opposed to the mode that a signal having a predetermined frequency is supplied to the exciting means, there is adopted the mode that the ON/OFF timing of the signal power supplied to the exciting means is adjusted and controlled. Further, as exemplified in FIGS. 47 and 50, any sound is appropriately controlled within a range of 2 kHz to 4 kHz which is substantially the same, and sound production is realized. However, there is a difference as a sound from these different vibration conformation because at least acoustic pressures or directivities are different. Therefore, a user can recognize this difference and distinguish what that sound means.

As described above, the camera 1 (electronic imaging apparatus) according to the present invention is an electronic camera having a structure that the anti-dust filter 21 is arranged in front of the imaging means (imaging element) so as to be capable of being vibrated by the piezoelectric element 22 (exciting means) and an irradiation time of the object light flux onto the photoelectric element surface is adjusted by the diaphragm 3 of the diaphragm mechanism and the shutter portion 14 (shutter means). Based on the control of the Bucom 50 (controlling means) of the camera 1, when an accessory is attached or focusing is carried out as described above or even when the recording medium is not attached immediately before the recording operation, the appropriate control is executed in such a manner that the dust which has adhered to the anti-dust filter 21 is removed and notification using a sound is simultaneously performed according to needs by driving the piezoelectric element 22 in a predetermined vibration conformation (executed in any of the three sub-routines). Further, as described above, according to the camera 1, as a characteristic of the present invention, a user is notified of a predetermined situation by production of two types of sound as described above according to needs concurrently with the dust removing operation performed to remove the dust. Since the sounds produced at that time (a pitch, a tone or a volume of sounds) are different from each other, a user can recognize if that sound is a warning sound or a confirmation sound of an operation based on the differences.

Thus, according to this embodiment, it is possible to realize the electronic camera which can perform notification (state notification) using a sound according to needs without providing a conventional dedicated sound production element (sounder: PCV or the like) and also remove the grime or the dust which has adhered to a vibration target member.

As to this state notification, in case of, e.g., an AF focus confirmation sound (focus sound), since it can be assured that it is often the case that a cameraman is keeping his/her eye close to the camera main body or he/she is observing in front of the display screen, a position where that sound is heard is restricted. Therefore, the sound having the narrow directivity and the relatively small volume (small acoustic pressure) can suffice. However, this varies depending on preferences of a user, sounds can be used according to situations.

That is, since the sounds produced in accordance with the different vibration conformations have different acoustic pressures or directivities, selectively applying the vibration conformation (appropriately executing any of the three sub-routines) enables further effective notification using the sound.

When applying the vibration conformations, preferably, it is desirable to apply the vibration conformation which can effectively perform the dust removing operation by priority immediately before imaging and apply an optimum vibration conformation to the sound production operation by taking a sound production timing or how that sound is heard into consideration.

Since the above-described operations are carried out in this embodiment, it is possible to obtain an advantage that the dust removing operation or the dust removing mechanism can be organically combined with any other operation or mechanism in the electronic imaging apparatus.

(Modification)

The above-described embodiment can be modified as follows. For example, a target to be excited is not restricted to the exemplified anti-dust filter 21, and a member or the like which exists in the optical path and has the permeability of the light (e.g., a cover glass or a half mirror) may be adopted. However, it is determined that this member shakes off the dust which has adhered to the surface by vibration and produces a sound within an audible range by this vibration and resonance. Further, a frequency or a drive time concerning the vibration are set to values corresponding to that member.

It is to be noted that the electronic imaging apparatus to which the present invention is applied is not restricted to the exemplified electronic camera (digital camera), and an apparatus which requires the anti-dust function and the sound production function can suffice, and this can be put into practical use by realizing a modification according to needs.

Besides, various kinds of modification can be carried out without departing from the scope of the present invention.

Sixth Embodiment

Figure 51:
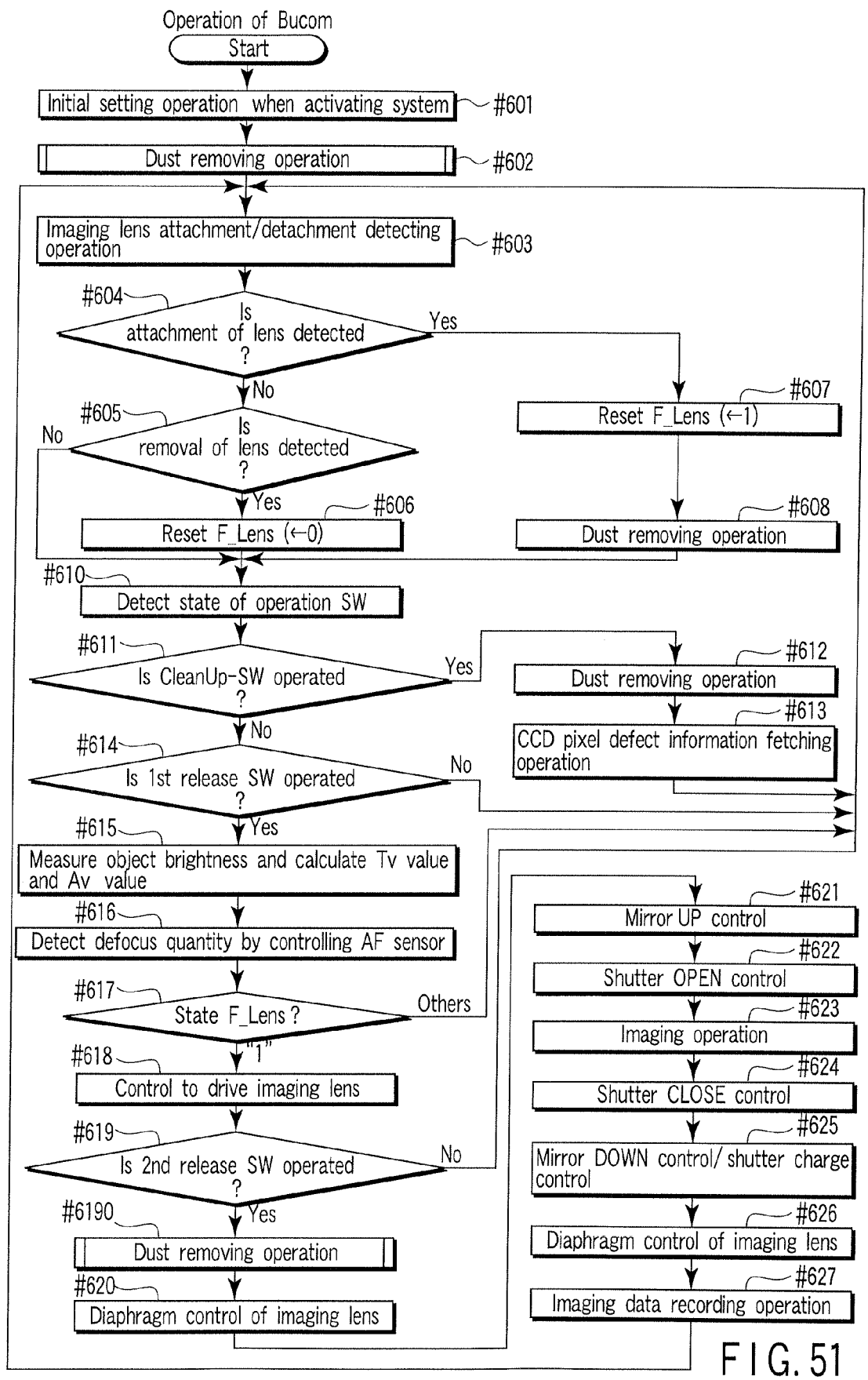
FIG. 51 is a view showing a main routine of a control program executed in the Bucom in the sixth embodiment according to the present invention.

A sixth embodiment according to the present invention will now be described hereinafter. In this case, reference is appropriately made to the drawings used in the first embodiment. Here, description will be given as to the control executed by the Bucom 50 in the sixth embodiment according to the present invention. FIG. 51 shows a main routine of the control program performed in the Bucom 50. First, when a power supply SW (not shown) of the camera is turned on, the Bucom 50 starts the operation. At a step #601, processing to activate the camera system is executed. The power is supplied to each circuit unit constituting the camera system by controlling the power supply circuit 53*a*. Further, the initial setting of each circuit is carried out.

At a step #602, the sub-routine "dust removing operation" is called and executed. In this sub-routine, the anti-dust filter 21 is excited while changing a drive frequency in the vicinity of a resonance frequency, and the dust which has adhered to the glass surface is shaken off. As a result, in a period that this camera is not used for imaging, a user can unintentionally remove the attached dust.

A step #603 is a step which can be cyclically executed, and it is an operation step used to detect an attachment/detachment state of a lens unit 12 by performing communication with the Lucom 5. Then, at a step #604, a judgment is made upon whether the lens unit 12 is attached to a body unit 100. If the answer is YES, the processing advances to a step #607. If the answer is NO, the processing proceeds to a step #605. At the step #605, a judgment is made upon whether the lens unit 12 is removed from the body unit 100. Here, if the answer is YES, the processing advances to a step #606, and a control flag F_Lens is reset. Thereafter, the processing proceeds to a step #610. If a result of the judgment at the step #605 is NO, the processing immediately advances to a step #610.

On the other hand, at a step #607, the control flag F_lens is set. This control flag indicates "1" in a period that the lens unit 12 is attached to the body unit 100, and indicates "0" in a period that the lens unit 12 is removed.

Then, at a step #608, a sub-routine "dust removing operation" to remove the dust of the anti-dust filter 21 is called and executed. Thereafter, the processing advances to a step #610.

At the step #610, a state of camera operation SWs 52 is detected. Further, a judgment is made upon whether a CleanUp-SW (not shown) which is one of the camera operation SWs 52 is operated based on whether a change in state of the CleanUP-SW is detected. In case of YES, the processing advances to a step #612. In case of NO, the processing proceeds to a step #614.

At the step #612, the operation to remove the dust of the anti-dust filter 21 is executed. Together with the operation at the step #612, an operation to fetch pixel defect information of the imaging element 27 is executed at a step #613. Information of the defect pixel is stored in a flash ROM 38*b*, and used for correction of image data. Defect information cannot be correctly obtained when the dust is attached. Thus, the operation at a step #612 is executed like the above before the operation at the step #613.

On the other hand, at the step #614, a judgment is made upon whether a 1st. release SW (not shown) which is one of the camera operation SWs 52 is operated. If the 1st. release SW is ON, the processing advances to a step #615. If it is OFF, the processing returns to the step #603.

At the step #615, brightness information of an object is obtained from a photometric circuit 32. Furthermore, an exposure time (Tv value) of an imaging element 27 and a diaphragm set value (Av value) of an imaging lens are calculated from this information.

At a step #616, detection data of an AF sensor unit 30a is obtained through an AF sensor drive circuit 30b. A defocus quantity is calculated based on this data.

Then, at a step #617, a state of F_Lens is judged. If it is "0", this means that the lens unit 12 does not exist, and hence the imaging operation at the next step #618 and the subsequent steps cannot be executed. Therefore, in this case, the processing returns to the step #603. Furthermore, if the state of F_Lens is "1", the processing advances to a step #618. At the step #618, a defocus quantity is transmitted to the Lucom 5, and driving of the imaging optical system 12a based on the defocus quantity is instructed.

At a step #619, a judgment is made upon whether a 2nd. release SW (not shown) which is one of the camera operation SWs is operated. When this 2nd. release SW is ON, the processing proceeds to a step #6190, and a predetermined imaging operation is carried out. However, if it is OFF, the processing returns to the step #603.

At the step #6190, the routine "dust removing operation" is executed in order to remove the dust before the imaging operation.

At a next step #620, the Av value is transmitted to the Lucom 5, driving of the diaphragm 3 is instructed, and a quick return mirror 13b is moved to an UP position at a step #621. At a step #622, traveling of a front curtain of a shutter portion 14 is started at a step #622, and execution of the imaging operation is instructed to an image processing controller 40 at a step #623. Upon completion of exposure to the imaging element 27 for a time indicated by the Tv value, traveling of a back curtain of the shutter portion 14 is started at a step #624, and the quick return mirror 13b is driven to a Down position at a step #625.

Moreover, concurrently with this, the charge operation of the shutter portion 14 is performed. Then, at a step #626, the Lucom 5 is instructed to return the diaphragm to a fully open position. At a step #627, the image processing controller 40 is instructed to record picked-up image data to a recording medium 39. When recording of the image data is terminated, the processing returns to the step #603.

Figures 52, 53:
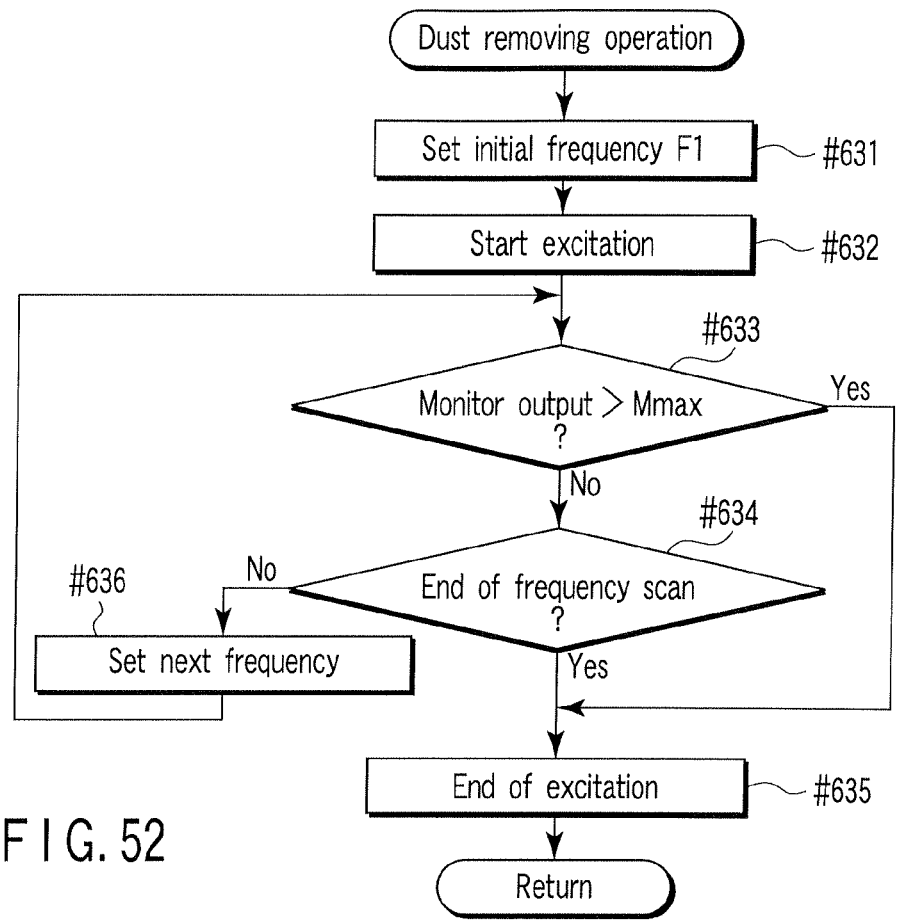
FIG. 52 is a flowchart of a sub-routine to perform a dust removing operation.
FIG. 53 is a view showing a relationship between preset values set in an N-numbering system counter in case of scanning a frequency of vibrations from F1 to F15 and a drive frequency applied to the piezoelectric element.

Although FIG. 52 is a flowchart of a sub-routine to perform the dust removing operation, a characteristic part of the present invention will first be described.

Like the camera according to this embodiment, in a camera having an anti-dust mechanism which removes the dust which has adhered to the surface of the anti-dust filter by shaking the anti-dust filter arranged on the front surface of the imaging element, vibration must be carried out at a resonance frequency inherent to the anti-dust filter in order to increase an amplitude of the vibration. However, although an approximate value of this resonance frequency can be obtained in design, it cannot be actually a fixed value due to various factors such as irregularities in the anti-dust filters, an aged change, an ambient temperature or the like.

Therefore, in this embodiment, in a predetermined frequency range including a resonance frequency in design, a frequency at which the anti-dust filter is vibrated is sequentially changed (frequency is scanned). As a result, even if the resonance point deviates from a design value, vibration can be necessarily carried out at a resonance frequency within that range.

FIG. 53 is a view showing a relationship between preset values set in an N-numbering system counter when scanning frequencies for vibration from F1 to F15 and drive frequencies applied to the piezoelectric element 22. In this case, assuming that a resonance frequency in design is 40 Hz and that resonance frequency is shifted for some reason, vibration at the resonance frequency is enabled within a range of approximately ±0.5 Hz.

Additionally, FIG. 54 is a view showing a change in a monitor output relative to the frequency scanning operation. A frequency Fk at which the monitor output becomes maximum corresponds to the resonance frequency at that time.

Meanwhile, an amplitude of vibration of the anti-dust filter varies due to a power supply voltage. For example, when a battery is used as a drive power supply, an amplitude is large in case of a new battery, and an amplitude is small as a residual capacity is reduced. Therefore, the sufficient anti-dust function cannot be obtained unless the large amplitude can be obtained with a relative low voltage. However, in case of a new battery, the amplitude of the anti-dust filter becomes too large, and the anti-dust filter itself may be destroyed in some cases. In order to avoid such an accident, providing a circuit such as a voltage regulator can suffice, but an entire circuit configuration becomes complicated, and this results in an increase in size of the camera or in cost, which is not a good countermeasure.

Thus, in this embodiment, as shown in FIG. 55, a monitor output that "a probability of destruction of the anti-dust filter becomes high if the operation is continued for a long time with an amplitude exceeding a current amplitude", i.e., an upper limit value Mmax which enables safe vibration, a frequency domain (Fh1 to Fh2) that destruction may be possibly occur due to a frequency at that time and a frequency domain (F1 to Fh1, and Fh2 to F15) with no such a possibility are stipulated, and the amplitude state is controlled depending on whether the monitor output exceeds the above-described Mmax during the dust removing operation.

The detail will now be described with reference to FIG. 52. At a step #631, a preset value corresponding to F1 in FIG. 53 is set in the N-numbering system counter 41. At a step #632, the anti-dust filter drive circuit 48 is controlled, and the excitation operation is started. At a step #633, a judgment is made upon whether the monitor output exceeds Mmax. If it does not exceeds, the processing advances to a step #634. If it exceeds, the processing proceeds to a step #635.

At the step #634, a judgment is made upon whether the frequency scanning is terminated, i.e., whether a final frequency F15 is reached by sequentially changing the frequencies from the initial frequency F1. If the final frequency F15 is not reached, the processing advances to a step #636. If it is reached, the processing advances to a step #635.

At the step #636, a frequency following the current set frequency is set, and the processing returns to a step #633. Further, when it is judged that the monitor output exceeds Mmax at a step #635, or when it is judged that the final frequency F15 is reached at the step #634, the excitation operation is terminated (stopped), and the processing returns.

As described above, in this embodiment, since the excitation operation is immediately stopped when the monitor output exceeds Mmax, an accident that the too large amplitude of the anti-dust filter leads to destruction does not occur.

Meanwhile, if the battery voltage is very high, after start of the excitation operation, the monitor output may immediately exceed Mmax in some cases. In order to assuredly remove the dust or the like which has adhered to the anti-dust filter, since an excitation continuation time to some degree is required, the dust removing operation may possibly becomes insufficient when the excitation operation is stopped immediately after the monitor output exceeds Mmax like this embodiment.

Figure 56:
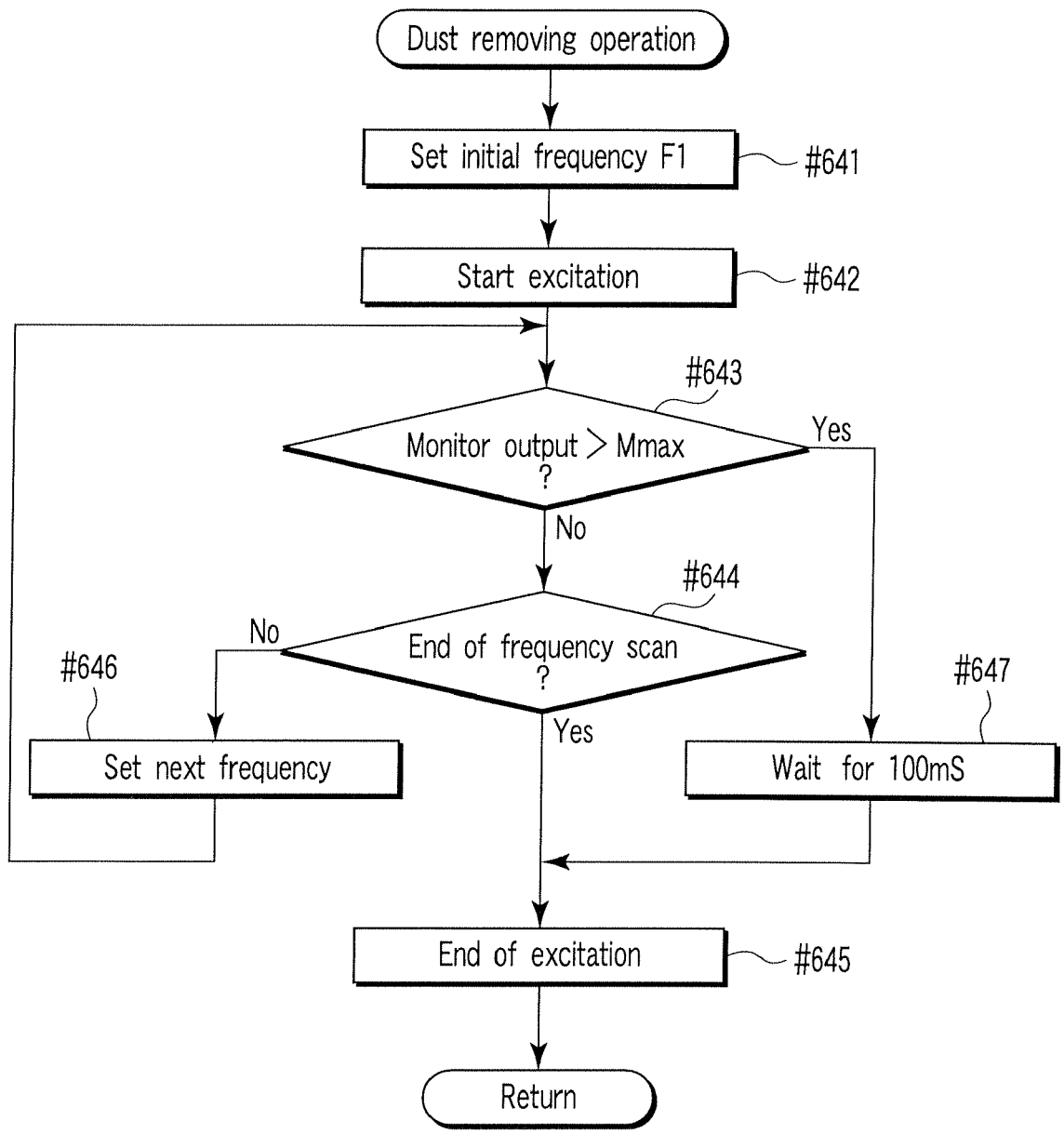
FIG. 56 is a flowchart illustrating a method according to a modification of the sixth embodiment of the present invention which does not immediately stop the exciting operation even if the monitor output exceeds Mmax.

Thus, in a modification of this embodiment, as shown in FIG. 56, the standby mode is effected for 100 mS as indicated at a step #647 without immediately stopping the excitation operation even if the monitor output exceeds Mmax as shown in FIG. 56. As a result, the dust can be assuredly removed.

It is to be noted that the time 100 mS is a value which is determined by a characteristic of the anti-dust mechanism including the anti-dust filter, and the present invention is not restricted thereto.

Since steps #641 to #646 are the same as the steps #631 to #636, their explanation is eliminated here.

Seventh Embodiment

A seventh embodiment according to the present invention will now be described. In this case, reference is appropriately made to the drawings used in the first embodiment. Here, description will be given as to the control executed by the Bucom 50 in the seventh embodiment according to the present invention.

Figure 57:
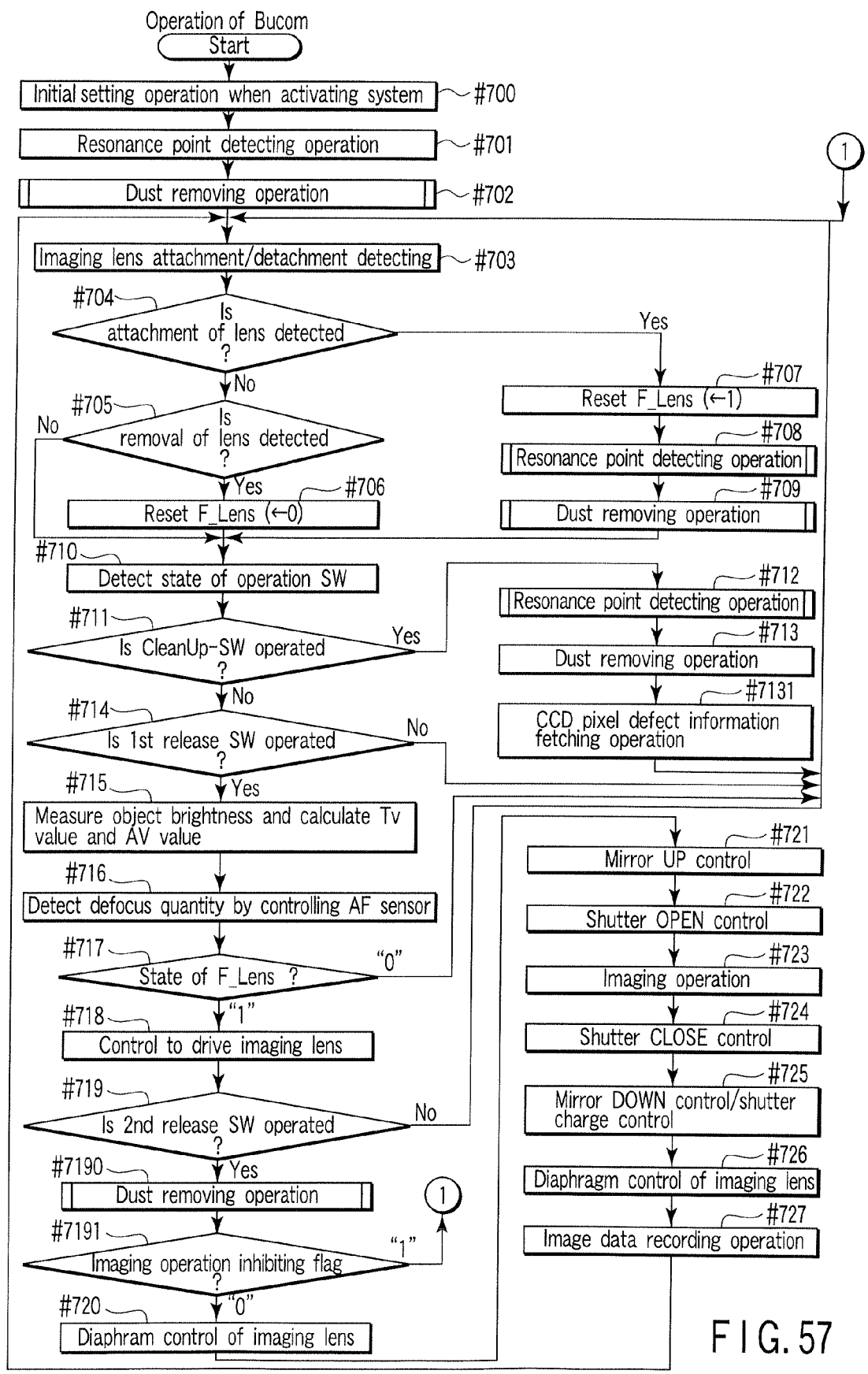
FIG. 57 is a flowchart showing an example of a main routine of a control program executed in the Bucom in a camera according to a seventh embodiment of the present invention.

FIG. 57 is a flowchart showing a main routine of a control program executed in the Bucom 50. First, when a power supply SW (not shown) of the camera is turned on, the Bucom 50 starts the operation, and processing to activate the camera system is executed at a step #700. That is, at this step #700, the power supply circuit 53a is controlled, the power is supplied to each circuit unit constituting this camera system, and the initial setting of each circuit is performed.

Then, at a step #701, a sub-routine "resonance point detection operation" is called and executed. In this sub-routine "resonance point detection operation", a drive frequency (resonance frequency) suitable to efficiently vibrate the anti-dust filter 21 is detected (detail will be described later). This frequency data is stored in a memory area at a predetermined address of the Bucom 50.

Then, at a step #702, a sub-routine "dust removing operation" is called and executed. In this sub-routine "dust removing operation", the anti-dust filter 21 is excited at the resonance frequency detected at the step #701, and the dust which has adhered to the glass surface of the piezoelectric element 22 is shaken off. As a result, in a period that this camera is not used for imaging, a user can unintentionally removed the attached dust.

The next step #703 is a step which is cyclically executed, and it is an operation step to detect a state of the lens unit 12 by performing the communication operation between the Bucom 5 and the Lucom 5. Further, when it is detected that the lens unit 12 is attached to the body unit 100 at a step #704, the processing advances to a step #707.

On the other hand, when it is detected that the lens unit 12 is removed from the body unit 100, the processing advances from the step #705 to a step #706, and a control flag FLens is rest. Thereafter, the processing advances to a step #710.

Then, when it is not detected that the lens unit 12 is attached to the body unit 100 at a step #704, the control flag F_lens is set at a step #707.

This control flag F_Lens indicates "1" in a period that the lens unit 12 is attached to the body unit 100, and indicates "0" in a period that the lens unit 12 is removed.

Then, at a step #708, a sub-routine "resonance point detection operation" is called and executed like the above. At a step #709 immediately after that step, a sub-routine "dust removing operation" to remove the dust of the anti-dust filter 21 is called and executed.

Usually, in a period that the lens unit 12 is not attached to the body unit 100 as the camera main body, a possibility that the dust adheres to the anti-dust filter is high. Therefore, it is desirable to execute the operation to remove the dust at a timing that attachment of the lens unit 12 is detected.

Furthermore, when the lens is replaced, the outside air circulate in the camera, a temperature in the camera varies, and the resonance frequency of the glass of the piezoelectric element 22 is also changed due to this temperature variation. Thus, at the step #708, the sub-routine "resonance point detection operation" to determine a new drive frequency (resonance frequency) is executed.

Subsequently, at a step #709 immediately after that step, the sub-routine "dust removing operation" is executed at a frequency determined at the step #708. Subsequently, at a step #710, a state of the camera operation SW 52 is detected. When a change in state of a CleanUP SW (not shown) which is one f the camera operation SWs 52 is detected at a next step #711, the processing advances to a step #712.

Subsequently, after the operation to detect a resonance point is executed at the step #712, an operation to remove the dust of the anti-dust filter 21 is executed at a step #713. In this case, together with the operation at the step #712, an operation to fetch pixel defect information of the imaging element 27 is executed at the step #713.

This defective pixel information is stored in a flash ROM 38b and used to correct image data, but the correct defect information cannot be obtained when the dust adheres. Thus, before the operation at the step #7131, a series of the operations at the steps #712 and #713 are executed like the above.

Then, at a step #714, a judgment is made upon whether a 1st. release SW (not shown) which is one of the camera operation SWs is operated. If the 1st. release SW is ON, the processing advances to a step #715. If it is OFF, the processing returns to the step #703.

Then, at a step #715, when brightness information of an object is obtained from a photometric circuit 32, an exposure time (Tv value) of an imaging element 27 and a diaphragm set value (AV value) of an imaging lens are calculated from this brightness information.

Subsequently, at a step #716, when detection data of an AF sensor unit 30a is obtained through an AF sensor drive circuit 30b, a defocus quantity is calculated based on this detection data.

Here, at a step #717, a state of a control flag F_Lens is judged. If it is "0", this means that the lens unit 12 does not exists, and hence the imaging operation at the next step #718 and the subsequent steps cannot be executed. Thus, in this case, the processing returns to the step #703.

Then, at a step #718, a defocus quantity is transmitted to the Lucom 5, and driving of the imaging optical system 12 based on this defocus quantity is instructed. Subsequently, at a step #719, whether a 2nd. release SW (not shown) which is one of the camera operation SWs 52 is operated is judged.

Here, when this 2nd. release SW is ON, the processing advances to a step #7190 and a predetermined imaging operation is carried out. However, when it is OFF, the processing returns to the step #703.

Further, at a next step #7190, the routine "dust removing operation" is executed in order to remove the dust in advance of the imaging operation. However, in order to avoid occurrence of a time lag due to execution of the dust removing operation, the routine "resonance point detecting operation" is not executed here.

It is to be noted that simultaneously executing these routines is desirable to assuredly remove the dust, but the routine "resonance point detection operation" may be eliminated if there is no possibility that the resonance frequency varies. However, the present invention is not restricted to this at the time of activating power supply of the camera system, replacing the lens, and the pixel defect detection operation of the CCD (imaging element).

Then, at a step #7191, a judgment is made upon whether an imaging operation inhibiting flag is set to 1. In this "dust removing operation" routine, if the imaging operation inhibiting flag is set to 1, it is detected that a foreign particle larger than the dust has adhered to the anti-dust filter 21, and hence the processing returns to the step #703. As a result, the imaging operation is inhibited. It is to be noted that setting of the imaging operation inhibiting flag will be described later.

At a next step #720, the Av value is first transmitted to the Lucom 5, driving of the diaphragm 3 is instructed, and a quick return mirror 13b is moved to an UP position at a step #721.

Then, after starting traveling of a front curtain of the shutter portion 14 at a step #722, execution of the imaging operation is instructed to the image processing controller 40 at a step #723.

Then, when exposure to the imaging element 27 for a time indicated by the Tv value is terminated, traveling of a back curtain of the shutter portion 14 is started at a step #724, and thereafter the quick return mirror 13b is driven to a Down position and at the same time the charge operation of the shutter portion 14 is performed at a step #725.

Furthermore, at a step #726, the Lucom 5 is instructed to return the diaphragm 3 to a fully open position. At a step #727, the image processing controller 40 is instructed to record the picked-up image data in the recording medium 39, and the processing returns to the step #703 upon termination of recording of the image data.

The detail of the sub-routine "resonance point detecting operation" will now be described with reference to a flowchart shown in FIG. 58. Usually, the resonance frequency of the anti-dust filter 21 varies depending on a shape, a material, a support method of a glass plate and a vibration mode (vibration conformation).

Moreover, when the glass plate is produced on a large scale as a protection glass, the resonance frequency also varies because of irregularities in the processing accuracy. Therefore, such irregularities can be canceled out by measuring the resonance frequency of each anti-dust filter 21 and appropriately adjusting a frequency of an oscillator which applies a voltage to the piezoelectric element 22 in the operation. In this sub-routine, there is executed an operation to detect a resonance frequency (resonance point) when performing the anti-dust operation.

Additionally, in this sub-routine "resonance point detection operation", it is also possible to detect an abnormal condition of the anti-dust mechanism including the anti-dust filter 21.

Figures 63, 64:
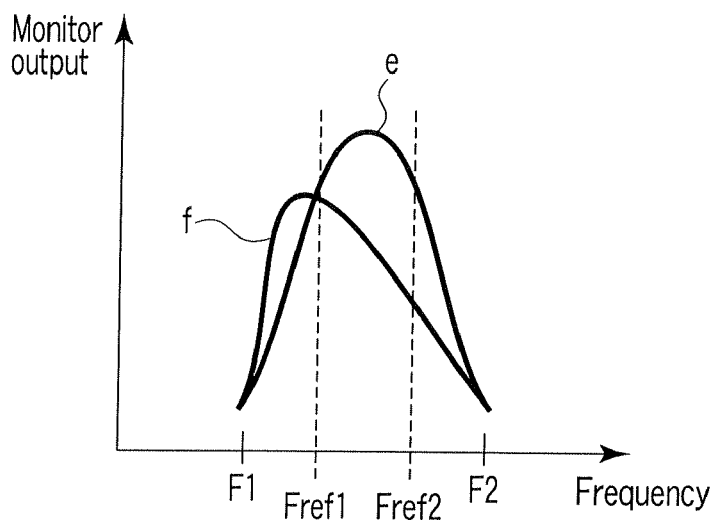
FIG. 63 is a view showing an example of verification performed in order to avoid a possibility that correct vibrations cannot be given due to occurrence of any failure in the anti-dust mechanism in a camera according to a seventh embodiment of the present invention.
FIG. 64 is a view showing present values set in the N-numbering system counter in the camera according to the seventh embodiment of the present invention.

First, at a step #801, while sequentially changing a drive frequency of the piezoelectric element 22, i.e., changing a minimum value 493 to a maximum value 507 each of which indicates a preset value to be set in the N-numbering system counter 41 as a table form shown in FIG. 64 every predetermined time, a monitor signal Mout in each drive frequency is detected in an A/D converter 60 (FIG. 16), and its data is sequentially stored in a predetermined memory area.

It is to be noted that a drive frequency 40.57 Hz corresponding to a minimum preset value 493 indicated as a table format in FIG. 64 is referred to as F1 and a drive frequency corresponding to a maximum preset value 507 is referred to as F2 for the sake of convenience.

Then, at a step #802, a maximum value of the data of the monitor signal stored in a predetermined memory area is detected and stored (this stored value is determined as Mmem). Generally, if there is no problem in the anti-dust mechanism, the monitor signal reaches a peak in the vicinity of a resonance frequency of the anti-dust filter 21. However, if the anti-dust mechanism has a defect at any part thereof, the peak may not be found even if the drive frequency is sequentially shifted from F1 to F2 in some cases.

Figure 60:
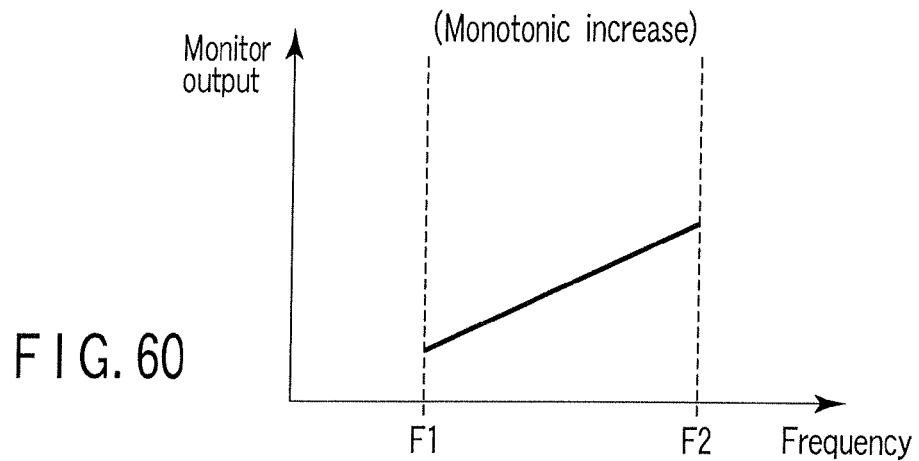
FIG. 60 is a view showing a case that a monotonous increase pattern is obtained in a graph having a horizontal axis representing a drive frequency and a vertical axis representing a level of a monitor output signal in the camera according to the embodiment of the present invention.
Figure 61:
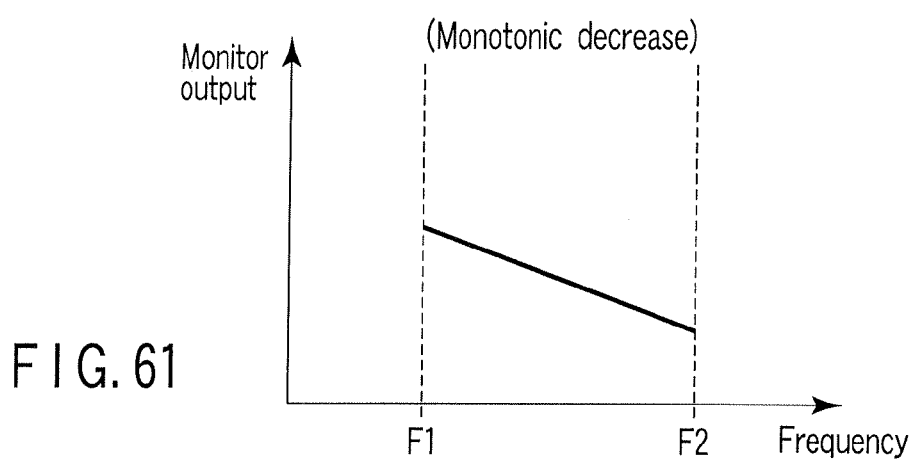
FIG. 61 is a view showing a case that a decrease pattern is obtained in a graph having a horizontal axis representing a drive frequency and a vertical axis representing a level of a monitor output signal in the camera according to the embodiment of the present invention.

For example, in a graph having a horizontal axis representing a drive frequency and a vertical axis representing a level of a monitor output signal, a monotonic increase pattern such as shown in FIG. 60 or a monotonic decrease pattern such as shown in FIG. 61 corresponds to this case.

Therefore, at a step #802, if the monotonic increase tendency or the monotonic decrease tendency is demonstrated as a whole when comparing the monitor output signal levels in the respective drive frequencies, it is possible to determine that the anti-dust mechanism has a defect based on demonstration of the monotonic increase tendency or the monotonic decrease tendency as a whole.

Then, at a step #803, a judgment is made upon whether the monitor output signal level demonstrate the monotonic increase. In case of the monotonic increase, the control advances to defect processing at a step #809 and subsequent steps.

Further, at a step #804, a judgment is made upon whether the monitor output signal demonstrates the monotonic decrease. In case of the monotonic decrease, the control likewise advances to defect processing at a step #809 and subsequent steps.

Furthermore, if the monitor output signal level does not demonstrate the monotonic increase nor the monotonic decrease, i.e., if the monitor output signal has a peak (resonance point) between the frequencies F1 and F2, the processing advances to a step #805, and a level of the stored value Mmem of the maximum monitor output signal Mout is judged. If the level of the stored value Mmem of the maximum monitor output signal Mout does not fall within a predetermined range, it can be considered that the anti-dust mechanism has a defect.

Figure 62:
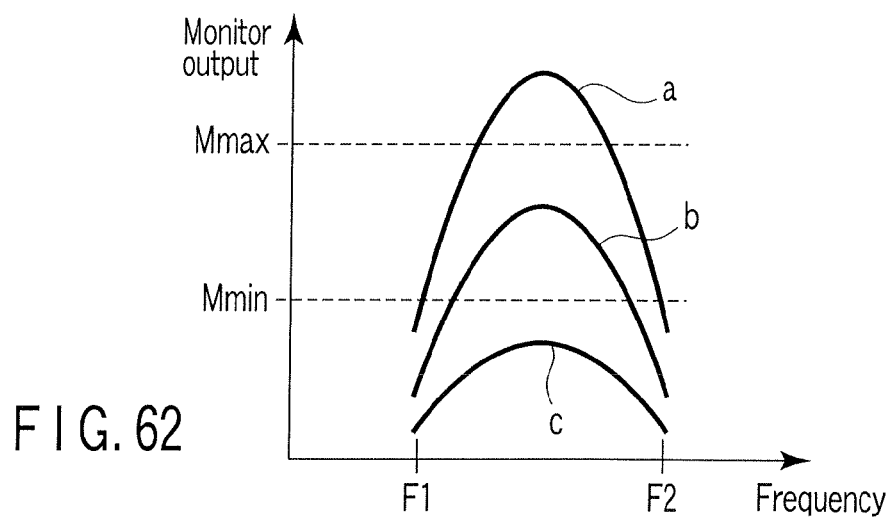
FIG. 62 is a view showing an example that it is possible to judge that any failure is generated in an anti-dust mechanism when a monitor output signal level does not fall within a predetermined range in the camera according to the embodiment of the present invention.

Taking three curves a, b and c shown in FIG. 62 as an example, since maximum values (peak values) of a and c do not fall within a range of Mmin to Mmax, it can be judged that any defect is generated in the anti-dust mechanism. Therefore, if it is determined that the maximum stored value Mmem of the monitor output signal Mout is less than Mmin at a step #805, the control advances to defect processing at a step #809 and subsequent steps.

Furthermore, even if it is judged that the maximum stored value Mmem of the monitor output signal Mout is larger than Mmax at a step #806, the control likewise proceeds to the defect processing at the step #809 and subsequent steps.

Moreover, if it is determined that the level of the stored value Mmem of the maximum monitor output signal Mout exists in a predetermined range at the steps #805 and 806, the control advances to a step #807 and a drive frequency that the monitor output signal indicates a maximum value is set as a resonance frequency F.

Incidentally, even if there is a maximum value between the drive frequencies F1 to F2, when that value greatly deviates from a design value, any defect is generated in the anti-dust mechanism, and the correct vibration may not be possibly given.

Thus, in order to avoid such a possibility, the resonance frequency F is further verified at a step #808.

Taking two curves e and f shown in FIG. 63 as an example, the curve e demonstrate the normal characteristic, whereas the curve f has a peak position extremely biased to FI, and it can be expected that there is any defect.

Therefore, at the step #808, when a frequency (resonance frequency) at a peak position does not fall within a predetermined range (Fref1 to Fref2), it is judged that there is a defect in the anti-dust mechanism, and the control advances to the defect processing at a step #809 and subsequent steps.

It is to be noted that a judgment range Mmin to Mmax of the above-described monitor output signal and a judgment range Fref1 to Fref2 of the resonance frequency are values calculated in design in accordance with a shape, a material and a support method of the anti-dust filter 21, a vibration conformation and others. Further, when no defect is found, the resonance frequency F is set and the processing returns to the main routine. However, when any defect is found, error display is carried out by using a non-illustrated sound production member or an LED in order to warn a user at the step #809.

Thereafter, an operation inhibiting flag used to inhibit the subsequent anti-dust operation is written in set in the EEPROM at a step #810, and the processing returns to the main routine.

It is to be noted that the anti-dust operation is not thereafter carried out unless troubleshooting is performed at a service center or the like when this operation inhibiting flag is written in the EEPROM 29. By doing so, it is possible to avoid an accident that the anti-dust mechanism is driven in an abnormal state and the camera itself is destroyed as well as the anti-dust mechanism.

Figure 59:
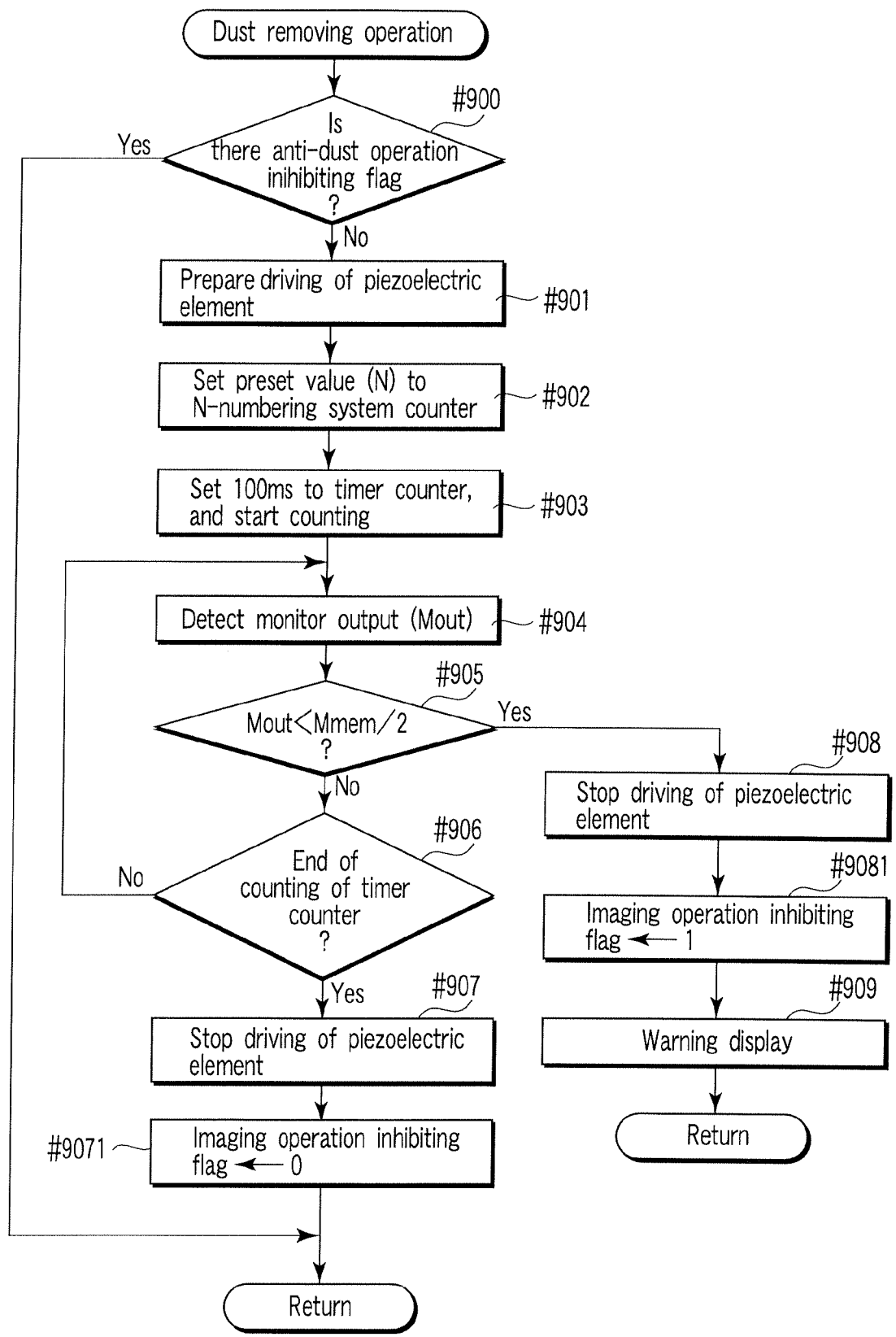
FIG. 59 is a flowchart illustrating a sub-routine "dust removing operation" depicted in FIG. 57.

The sub-routine "dust removing operation" will now be described in detail with reference to a flowchart shown in FIG. 59.

In this sub-routine "dust removing operation", the piezoelectric element 22 is driven in such a manner that the anti-dust filter 21 is subjected to resonance. First, at a step #900, a judgment is made upon whether the operation inhibiting flag is set in the EEPROM 29 as will be described later.

Figure 58:
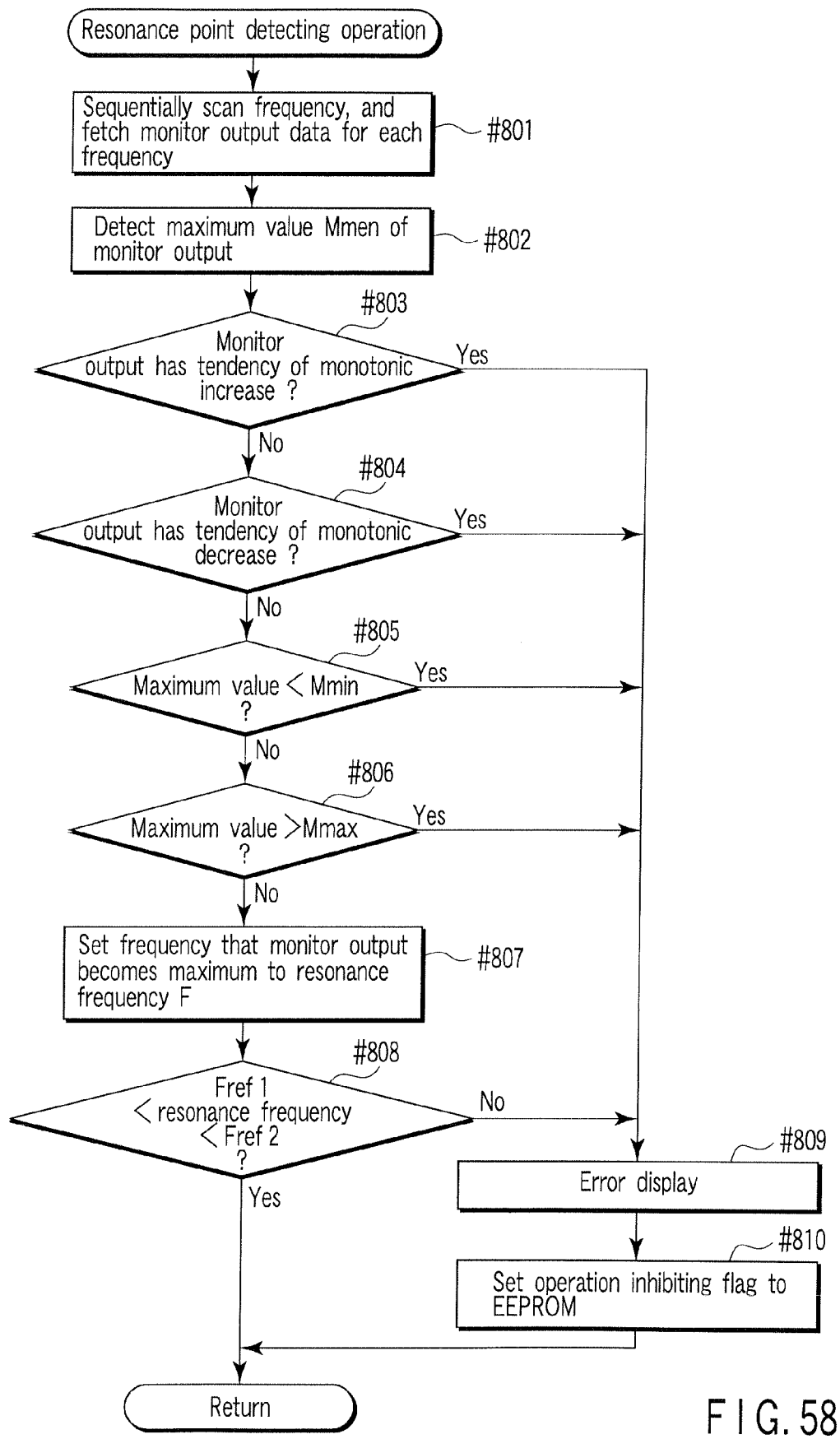
FIG. 58 is a flowchart illustrating a sub-routine "resonance point detecting operation" depicted in FIG. 57.

In the resonance point detecting operation of FIG. 58, this operation inhibiting flag is set when an adequate resonance point is detected, i.e., when there is any defect in the anti-dust mechanism.

Furthermore, when this operation inhibiting flag is set, the anti-dust operation is not executed, and the processing directly returns to the main routine. Thus, when the operation inhibiting flag is not set, a preparation operation to drive the piezoelectric element 22 is effected at a step #901.

This is the operation to turn on a transistor Q00 (44a) by controlling an IO port P PwCont and start output of a pulse signal from a clock generator 55.

Then, at a step #902, a preset value (N) concerning a resonance frequency of the anti-dust filter 21 detected in the resonance point detection operation at the step #701 in FIG. 57 is read.

When this read value is set to the N-numbering system counter 41, the anti-dust filter drive circuit 48 drives the anti-dust filter 21 at its resonance frequency. Subsequently, at a step #903, data corresponding to 100 mS is set in a timer counter 1, and a counting operation is started.

Then, at a step #904, a monitor output signal (Mout) is detected. Here, when the anti-dust filter 21 is subjected to resonance at the resonance frequency F determined by the "resonance point detection operation" shown in FIG. 58, a value of the monitor output signal (Mout) must match with a stored value (Mmem) stored in the resonance point detecting operation.

However, when a foreign particle which is not too large to be removed in the "dust removing operation" has adhered to the surface of the anti-dust filter 21, the monitor output signal (Mout) is extremely small.

Therefore, at a next step #905, a latest monitor output signal (Mout) is compared with a stored value of a maximum monitor output signal. When the value of the monitor output signal (Mout) is less than ½ of the stored value (Mmem), it is judged that the foreign particle has adhered. Driving of the piezoelectric element 22 is stopped at a step #908, and an imaging operation inhibiting flag is set to 1 at a step #9081. Thereafter, at a step #909, warning display is executed, and the processing then returns to the main routine.

On the other hand, when there is no much difference between the value of the monitor signal (Mout) and the stored value (Mmem) at the step #905, the operation of shifting to the step #904 is repeated until the counting operation of the timer counter 1 is terminated at a next step #906. Upon termination of the counting operation of the timer counter 1, processing to stop the driving operation of the piezoelectric element is executed at a next step #907. As a result, the transistor Q00 (44a) is turned off, the operation of the clock generator 55 is stopped, the imaging operation inhibiting flag is cleared at a step #9071, and then the processing returns to the main routine.

Incidentally, when the value of the monitor output signal (Mout) is less than ½ of the stored value (Mmem), it is judged that the foreign particle has adhered. However, this varies depending on a characteristic of the anti-dust mechanism including the anti-dust filter 21, and it is good enough to appropriately effect setting in accordance with the characteristic of the anti-dust mechanism.

It is to be noted that the monitor circuit which monitors the vibration state of the piezoelectric element 22 is provided in the foregoing embodiment, but the monitor circuit may be eliminated in case of a simple system which does not perform the resonance frequency detecting operation.

In case of such a simple system, it is good enough to constitute the system so as to detect a current value to be applied to the piezoelectric element 22.

In that case, it is good enough to detect, e.g., a voltage at a junction between a resistance R00 (46) and a transformer 45 shown in FIG. 12 in place of the above-described monitor output signal.

Moreover, in the foregoing embodiment, when a value of the latest monitor output signal (Mout) is less than ½ of the maximum stored value (Mmem), it is judged that the foreign particle has adhered. However, it can be determined that the foreign particle has adhered when there is an extreme difference between the value of the latest monitor output signal (Mout) and a value of a previous monitor output signal (Mout).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electronic imaging apparatus which can attach/detach an imaging lens, comprising:
    an imaging section including an imaging element which converts an optical image of an object into an electric signal via the imaging lens;

an optical element arranged on a front surface of the imaging element;

a piezoelectric element which causes an oscillating wave to generate in the optical element by vibration of the piezoelectric element;

a detection section which detects mounting of the imaging lens on the electronic imaging apparatus by a communication with an electronic circuit disposed within the imaging lens;

a driving section which supplies a cyclic driving signal to the piezoelectric element, the driving section including a clock generator which outputs a reference clock, a divider circuit which divides the reference clock, and a driver circuit which generates the driving signal based on the output of the divider circuit; and a control section which controls an operating state of the driving section, the control section causing the driving section to operate for a predetermined time when the detection section detects the mounting of the imaging lens, wherein the control section is capable of setting a frequency dividing ratio of the divider circuit, and wherein the control section sequentially changes the frequency dividing ratio of the divider circuit so that the optical element can be vibrated at a plurality of resonance frequencies of different orders.

2. An electronic imaging apparatus which can attach/detach an imaging lens, comprising:

an imaging section including an imaging element which converts an optical image of an object into an electric signal via the imaging lens;

an optical element arranged on a front surface of the imaging element;

a piezoelectric element which causes an oscillating wave to generate in the optical element by vibration of the piezoelectric element;

a detection section which electrically detects mounting of the imaging lens on the electronic imaging apparatus;

a driving section which supplies a cyclic driving signal to the piezoelectric element, the driving section including a clock generator which outputs a reference clock, a divider circuit which divides the reference clock, and a driver circuit which generates the driving signal based on the output of the divider circuit; and a control section which operates the driving section for a predetermined time when the detection section detects the mounting of the imaging lens, the control section being configured to control an operating state of the driving section, being capable of setting a frequency dividing ratio of the divider circuit, and being configured to sequentially change the frequency dividing ratio during the predetermined time, wherein the control section sequentially changes the frequency dividing ratio of the divider circuit so that the optical element can be vibrated at a plurality of resonance frequencies of different orders.

3. The electronic imaging apparatus according to claim 2, wherein the detection section detects mounting of the imaging lens on the electronic imaging apparatus by a communication with an electronic circuit disposed within the imaging lens.

4. An electronic imaging apparatus which can attach/detach an imaging lens, comprising:

an imaging section including an imaging element which converts an optical image of an object into an electric signal via the imaging lens;

an optical element arranged on a front surface of the imaging element;

a piezoelectric element which causes an oscillating wave to generate in the optical element by vibration of the piezoelectric element;

a detection section which electrically detects mounting of the imaging lens on the electronic imaging apparatus;

a driving section which supplies a cyclic driving signal to the piezoelectric element; and a control section which controls an operating state of the driving section, the control section being configured to operate the driving section for a predetermined time when the detection section detects the mounting of the imaging lens, wherein the driving section includes a clock generator which outputs a reference clock, a divider circuit which divides the reference clock, and a driver circuit which generates the driving signal based on the output of the divider circuit, wherein the control section is capable of setting a frequency dividing ratio of the divider circuit, and sequentially changes the frequency dividing ratio for the predetermined time, and wherein the control section sequentially changes the frequency dividing ratio of the divider circuit so that the optical element can be vibrated at a plurality of resonance frequencies of different orders.

5. The electronic imaging apparatus according to claim 4, wherein the detection section detects mounting of the imaging lens on the electronic imaging apparatus by a communication with an electronic circuit disposed within the imaging lens.

* * * * *